US011633795B2

(12) United States Patent
Miwa et al.

(10) Patent No.: US 11,633,795 B2
(45) Date of Patent: Apr. 25, 2023

(54) TABLETOP CUTTING MACHINE

(71) Applicant: MAKITA CORPORATION, Anjo (JP)

(72) Inventors: Yuki Miwa, Anjo (JP); Goh Yamamura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 821 days.

(21) Appl. No.: 16/582,409

(22) Filed: Sep. 25, 2019

(65) Prior Publication Data

US 2020/0130080 A1 Apr. 30, 2020

(30) Foreign Application Priority Data

Oct. 30, 2018 (JP) .............................. JP2018-204185
Aug. 6, 2019 (JP) .............................. JP2019-144806

(51) Int. Cl.
*B23D 59/00* (2006.01)
*B23D 45/02* (2006.01)

(52) U.S. Cl.
CPC ......... *B23D 59/002* (2013.01); *B23D 45/024* (2013.01)

(58) Field of Classification Search
CPC ............................ B23D 59/002; B23D 45/024
USPC ......................................................... 83/471.3
See application file for complete search history.

(56) References Cited

U.S. PATENT DOCUMENTS

| | | | | |
|---|---|---|---|---|
| 6,021,700 A | * | 2/2000 | Garuglieri ............... | B27B 27/10 83/477.1 |
| 2003/0200852 A1 | | 10/2003 | Romo | |
| 2004/0154448 A1 | | 8/2004 | Romo et al. | |
| 2005/0247177 A1 | | 11/2005 | Hetcher et al. | |
| 2005/0284276 A1 | * | 12/2005 | Talesky ............... | B23D 45/048 83/477.1 |
| 2006/0011036 A1 | | 1/2006 | Ushiwata et al. | |
| 2011/0036224 A1 | * | 2/2011 | Liu .......................... | B27B 5/29 83/471.3 |

(Continued)

FOREIGN PATENT DOCUMENTS

| | | |
|---|---|---|
| CN | 102151897 A | 8/2011 |
| JP | 2006-44220 A | 2/2006 |

(Continued)

OTHER PUBLICATIONS

Mar. 8, 2022 Office Action issued in Chinese Patent Application No. 201910888793.8.

(Continued)

*Primary Examiner* — Omar Flores Sanchez
(74) *Attorney, Agent, or Firm* — Oliff PLC

(57) ABSTRACT

An easily operable, highly durable cutting machine finely adjusts the miter angle of a turntable. A cutting machine includes a turntable supported in a manner rotatable horizontally to a base and including a substantially disk-shaped table body to receive a workpiece and a table extension protruding forward from the table body, a cutting machine body located above the turntable and connected in a manner swingable vertically to the turntable, and a fine angle adjuster that adjusts a rotation angle of the turntable with respect to the base and including a rack on the base, a pinion located in the table body within an area of the table body as viewed from above and engageable with the rack directly or indirectly, and an operation part operable to rotate the pinion.

19 Claims, 49 Drawing Sheets

(56) References Cited

U.S. PATENT DOCUMENTS

2011/0041665 A1* 2/2011 Ushiwata ............ B23D 45/048
83/477.1

FOREIGN PATENT DOCUMENTS

| JP | 2008-183816 A | 8/2008 |
| JP | 2009-66718 A | 4/2009 |
| WO | 2009/034888 A1 | 3/2009 |

OTHER PUBLICATIONS

Nov. 21, 2021 Office Action issued in Chinese Patent Application No. 201910888793.8.
Jan. 31, 2023 Office Action issued in Japanese Patent Application No. 2019-144806.

* cited by examiner

TABLETOP CUTTING MACHINE

CROSS-REFERENCE TO RELATED APPLICATIONS

This application claims the benefit of priority to Japanese Patent Application No. 2018-204185, filed on Oct. 30, 2018, and Japanese Patent Application No. 2019-144806, filed on Aug. 6, 2019, the entire contents of which are hereby incorporated by reference.

BACKGROUND

1. Technical Field

The present invention relates to a tabletop cutting machine mainly used for cutting wood. The tabletop cutting machine is, for example, a sliding circular saw or a tabletop circular saw.

2. Description of the Background

A known tabletop cutting machine includes a turntable rotatable horizontally to a base and a cutting machine body swingable vertically to the turntable (e.g., Japanese Unexamined Patent Application Publication No. 2006-44220, hereafter Patent Literature 1, and Japanese Unexamined Patent Application Publication No. 2009-66718, hereafter Patent Literature 2). A workpiece is placed on the upper surface of the turntable. A motor included in the cutting machine body rotates a circular saw blade. The cutting machine body is moved downward with respect to the turntable to cut the workpiece with the circular saw blade. The tabletop cutting machine includes a positioning unit used to adjust the rotation angle of the turntable with respect to the base and determine the position before cutting the workpiece. In one example, the workpiece can be cut at right angles with respect to an end face of the workpiece (perpendicular cutting). In another example, the workpiece can be cut at an angle (miter angle) different from a right angle with respect to the end face (diagonal cutting).

The positioning unit positions the turntable with respect to the base at any horizontal rotation angle (miter angle). The positioning unit includes, for example, a first positioning mechanism that positions the turntable at any miter angle with respect to the base and a second positioning mechanism that quickly positions the turntable at a frequently used predetermined miter angle with, for example, a protrusion and a recess engaged together. The second positioning mechanism has a plurality of positioning holes at predetermined angular intervals in the base and a positioning pin on the turntable. The positioning pin is inserted into and removed from one of the positioning holes to position the turntable with respect to the base at a predetermined miter angle. The second positioning mechanism is also referred to as a positive locking mechanism.

FIGS. 8 to 10 in Patent Literature 1 show the first positioning mechanism. A turntable includes a table extension extending forward (toward a user). The first positioning mechanism shown in FIGS. 8 to 10 in Patent Literature 1 includes a fixing handle extending further forward from the table extension, an adjustment screw extending through the right and left side surfaces of the table extension, and a member located inside the table extension. The fixing handle and the adjustment screw are substantially perpendicular to each other, and screwed with the member. The rear end of the fixing handle can abut against the outer peripheral wall of a base. The fixing handle is engaged with the base when abutting against the wall. When the adjustment screw is operated, the member moves slightly laterally to the table extension. This finely adjusts the position of the turntable in the rotational direction with the fixing handle engaged with the base. In other words, the miter angle can be finely adjusted while the turntable is being rotated with respect to the base.

In this case, the adjustment screw is located relatively far from the rotation center of the turntable. Thus, the position of the adjustment screw changes greatly as the turntable rotates. The adjustment screw is not easy to operate. Additionally, the miter angle is adjustable only within a small angle range (e.g., ±2°) around the miter angle adjusted with the fixing handle engaged with an arc portion of the base. Both the fixing handle and the adjustment screw are to be operated to finely adjust the miter angle. This causes time-consuming operations.

A fine adjuster shown in FIGS. 33 to 35 in Patent Literature 1 includes an adjustment member for fine adjustment at the basal end of the fixing handle in the first positioning mechanism. The base has a rack on its outer peripheral wall. The rear end of the adjustment member is pushed rearward to be engageable with the rack on the arc portion. After the turntable is moved to around a predetermined angle, the adjustment member is operated to finely adjust the miter angle while the turntable is being rotated. In this structure, the adjustment member in the second positioning mechanism is behind an operation handle in the first positioning mechanism and is not easy to operate.

A fine adjuster shown in FIGS. 49 and 50 in Patent Literature 1 includes a shaft extending from below and rightward from the base to the base center. The shaft includes, at a first end, an operation handle located below and rightward from the base. The shaft includes a pinion at a second end. A rack on the outer peripheral wall of the turntable is engaged with the pinion. The pinion is rotated using the operation handle to rotate the rack together with the turntable horizontally to the base. In this embodiment, the turntable for receiving a workpiece may deform, and thus the rack may deform. In other words, the pinion and the rack have low durability.

A fine adjuster shown in FIGS. 1 to 3 in Patent Literature 2 includes levers located lateral to a table extension. The table extension includes a fixing rod extending in the front-rear direction and a support pivotable in the lateral direction about the axis of the fixing rod. The support has a through-hole through which a positioning pin in a second positioning mechanism is placed. The support is integral with the levers. The levers are operated to pivot the support laterally and move the relative position of the through-hole laterally. Thus, the positioning pin in the second positioning mechanism is slightly circumferentially movable relative to the base to finely adjust the miter angle of the turntable. The fine adjuster adjusts the miter angle only within a small angle range around the miter angle determined by the second positioning mechanism. Thus, the fine adjuster cannot finely adjust the miter angle at angles other than predetermined angles used for positioning by the second positioning mechanism.

BRIEF SUMMARY

One or more aspects of the present invention are directed to an easily operable and highly durable cutting machine that finely adjusts the miter angle of a turntable.

A first aspect of the present invention provides a cutting machine, including:
a base;
a turntable supported in a manner rotatable horizontally to the base, the turntable including
a substantially disk-shaped table body to receive a workpiece, and
a table extension extending forward from the table body;
a cutting machine body located above the turntable and connected in a manner swingable vertically to the turntable; and
a fine angle adjuster configured to adjust a rotation angle of the turntable with respect to the base, the fine angle adjuster including
a rack located on the base,
a pinion located in the table body within an area of the table body as viewed from above, and engageable with the rack directly or indirectly, and
an operation part operable to rotate the pinion.

A second aspect of the present invention provides a cutting machine, including:
a base;
a turntable supported in a manner rotatable horizontally to the base;
a cutting machine body located above the turntable and connected in a manner swingable vertically to the turntable; and
a fine angle adjuster configured to adjust a rotation angle of the turntable with respect to the base, the fine angle adjuster including a clutch mechanism configured to disable transmission of power for rotating the turntable with respect to the base when receiving a predetermined torque or greater.

BRIEF DESCRIPTION OF DRAWINGS

FIG. 12 is a cross-sectional view taken along line XII-XII in FIG. 4 with a positive locking mechanism turned on.

DETAILED DESCRIPTION

First Embodiment

Figure 1:
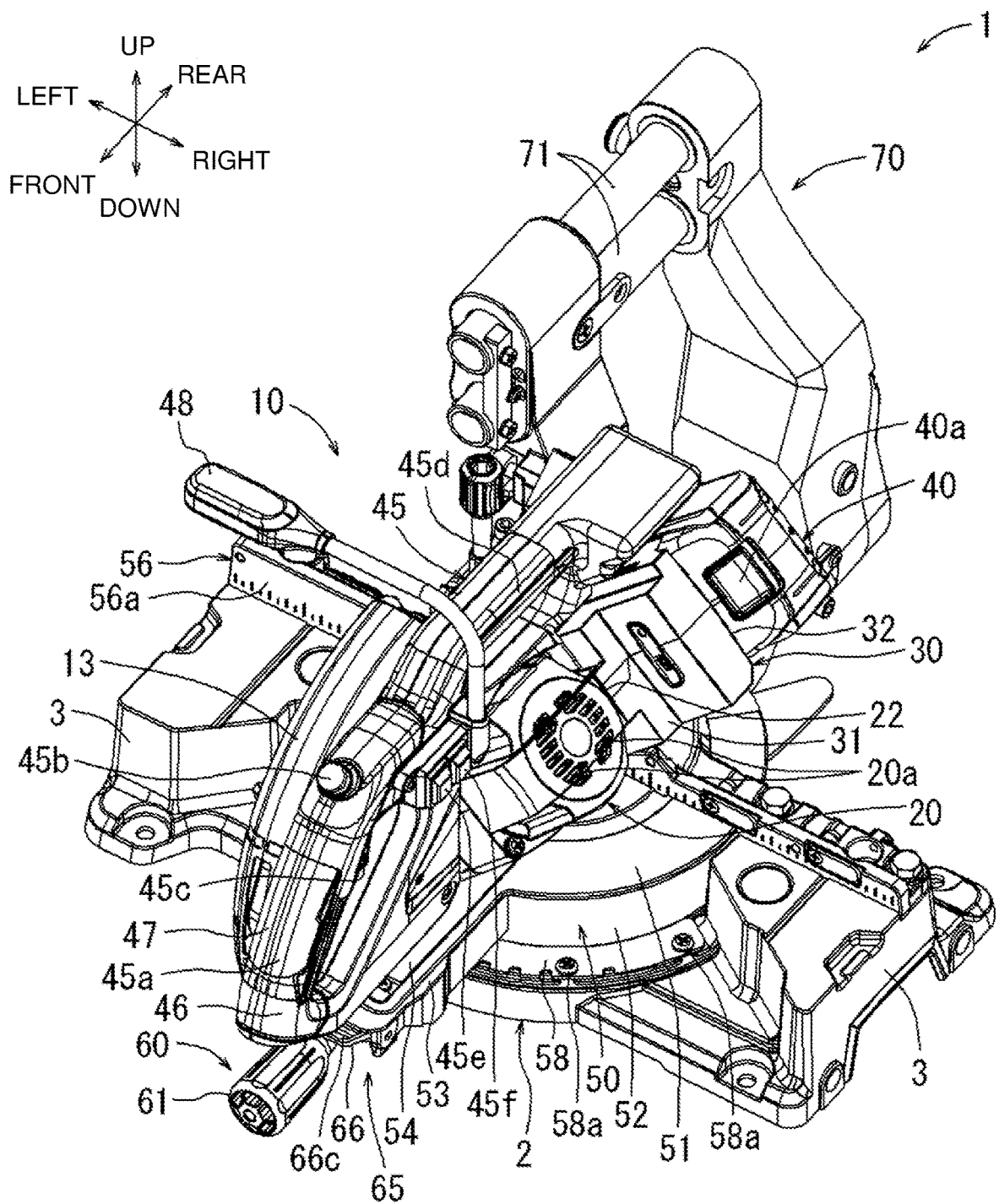
FIG. 1 is an overall perspective view of a cutting machine according to a first embodiment.

A cutting machine (tabletop cutting machine) according to a first embodiment will now be described with reference to FIGS. 1 to 37. A cutting machine 1 according to the present embodiment is a sliding circular saw. As shown in FIG. 1, the cutting machine 1 includes a cutting machine body 10, a turntable 50, and a base 2. The turntable 50 receives a workpiece. The base 2 is placed on a surface such as a table or a floor. The base 2 supports the turntable 50 in a manner rotatable horizontally. The base 2 includes auxiliary tables 3 on both the right and the left of the turntable 50. The auxiliary tables 3 have the same height at their upper surfaces as the turntable 50. For components and structures described below, the directional terms such as up, down, right, and left are defined as seen from a user. The front and the rear of the components and the structures are defined as the front being closer to the user.

Figure 2:
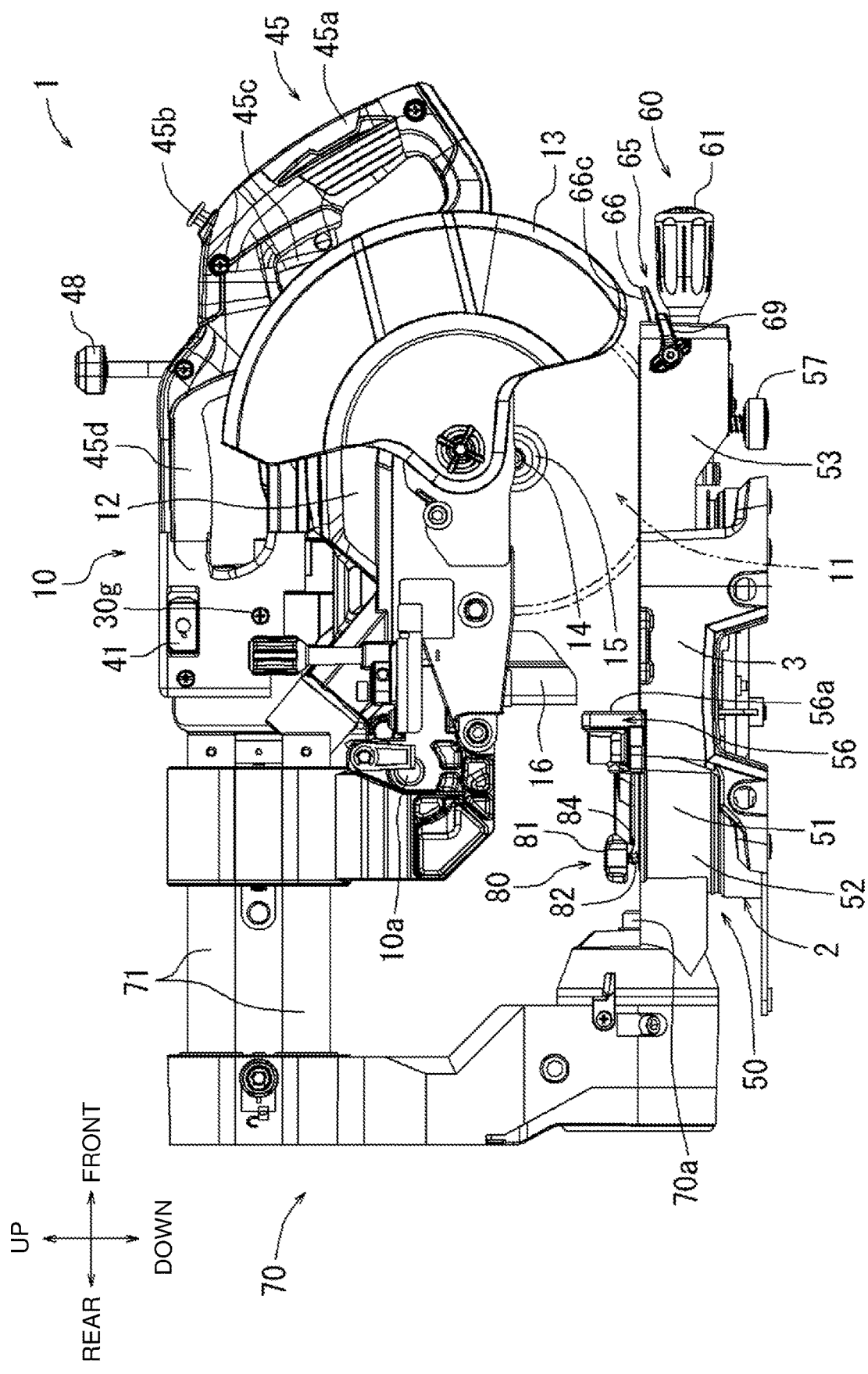
FIG. 2 is a left side view of the cutting machine according to the first embodiment.
Figure 8:
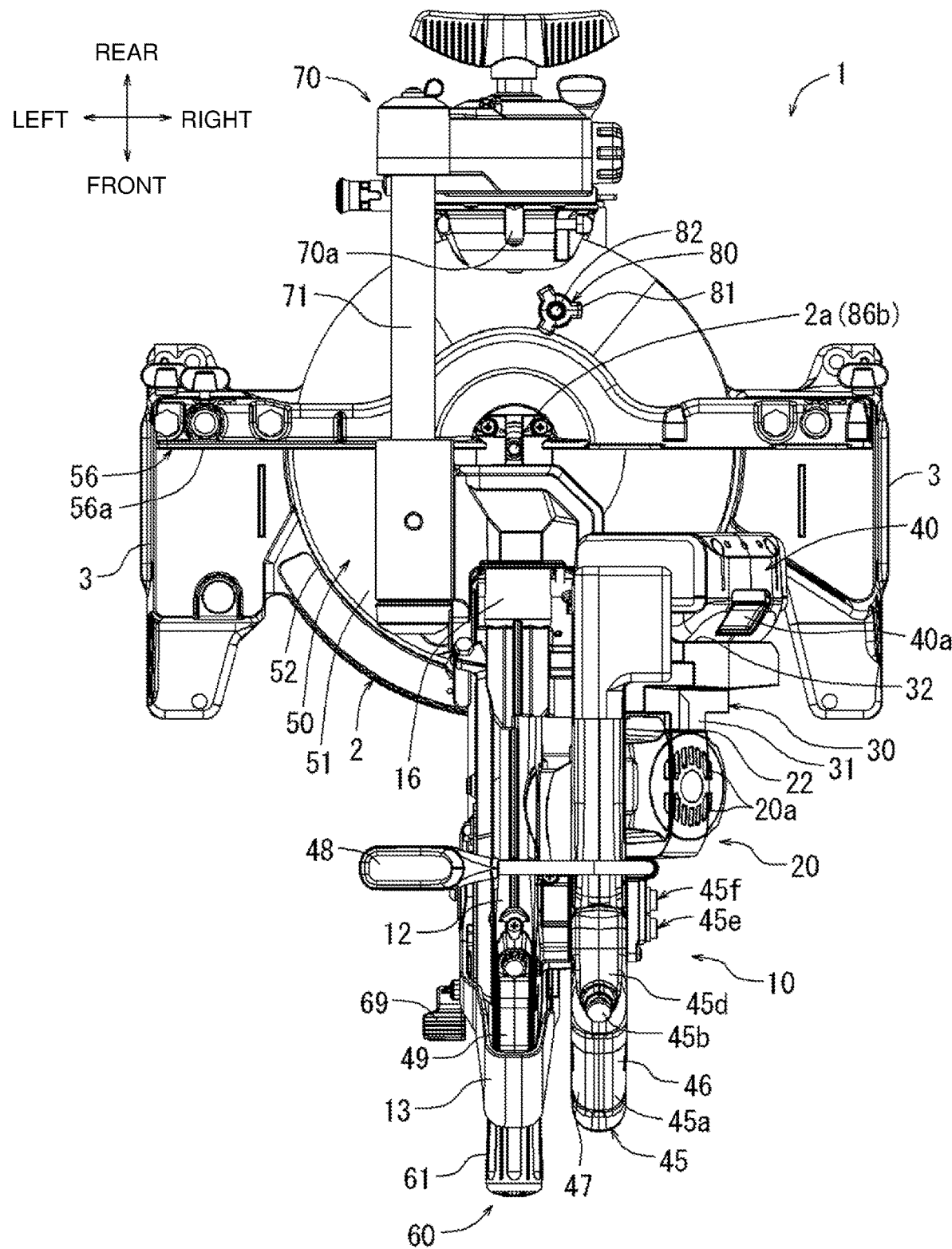
FIG. 8 is a plan view of the cutting machine according to the first embodiment with the cutting machine body slid forward.
Figure 10:
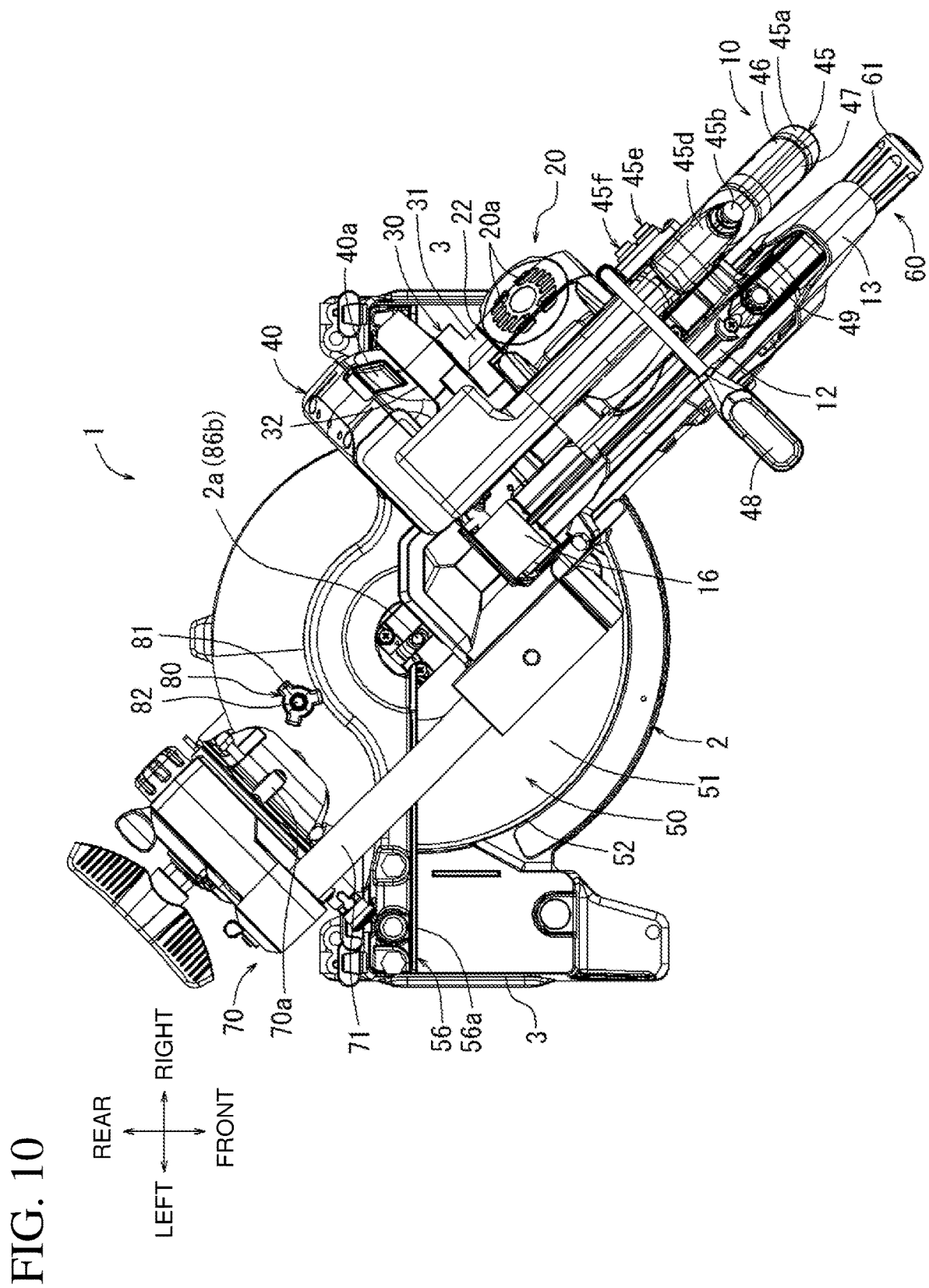
FIG. 10 is a plan view of the cutting machine according to the first embodiment with a maximum miter angle in the right direction.
Figure 11:
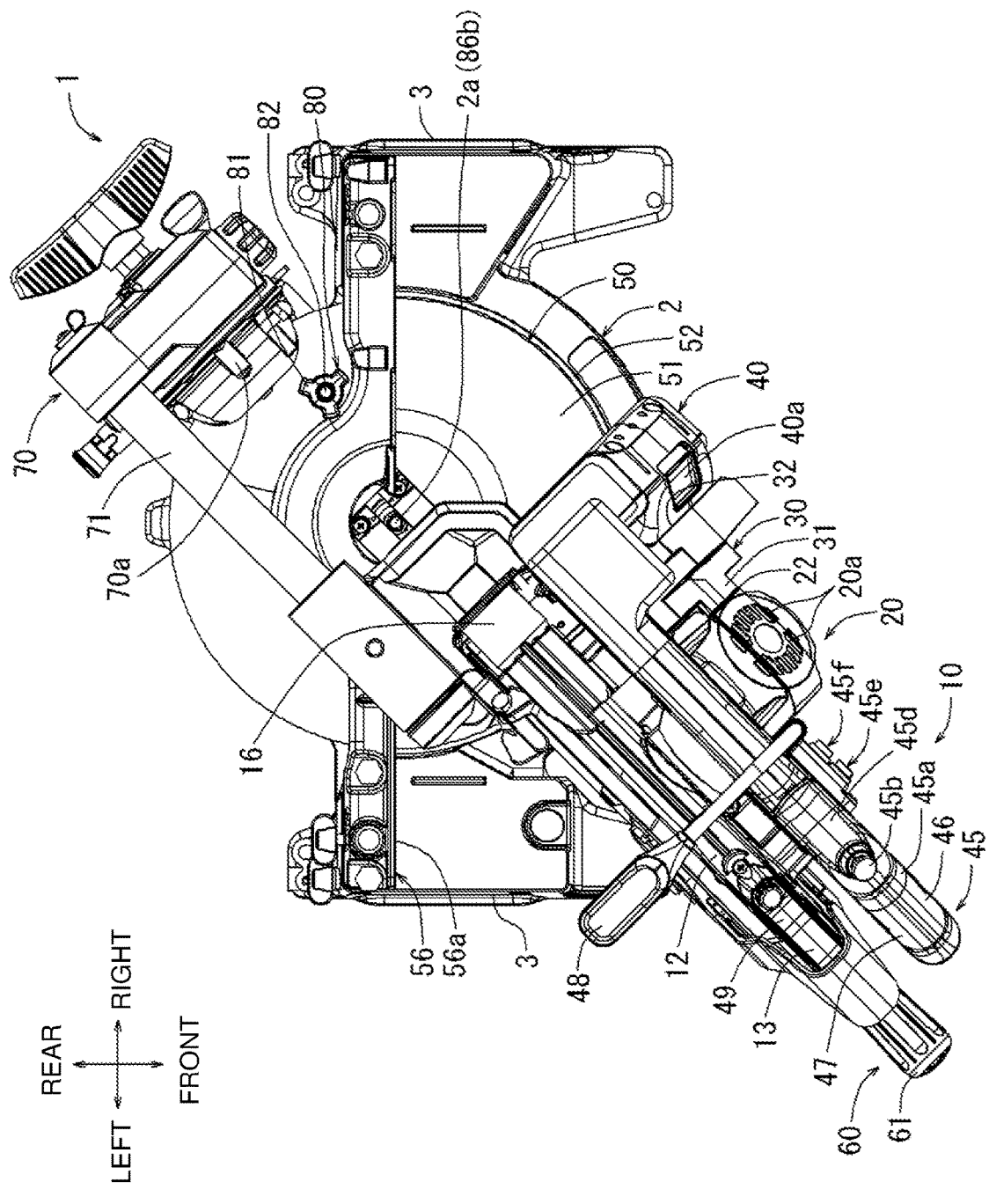
FIG. 11 is a plan view of the cutting machine according to the first embodiment with a maximum miter angle in the left direction.

As shown in FIGS. 10 and 11, the turntable 50 is supported in a manner rotatable horizontally to the base 2 with a rotation support shaft 2a located in the middle of the upper surface of the base 2. As shown in FIGS. 2 and 8, the turntable 50 includes a table body 51, an outer peripheral table wall 52, and a table extension 53. The table body 51 is substantially circular in a plan view, and has its upper surface arranged horizontally. The outer peripheral table wall 52 is substantially cylindrical, and is located on the outer edge of the table body 51. The table extension 53 extends forward from the table body 51. As shown in FIG. 1, the table body 51 has, on its upper surface, a throat plate 54 and a positioning fence 56. The positioning fence 56 positions the workpiece in a surface direction.

Figure 12:
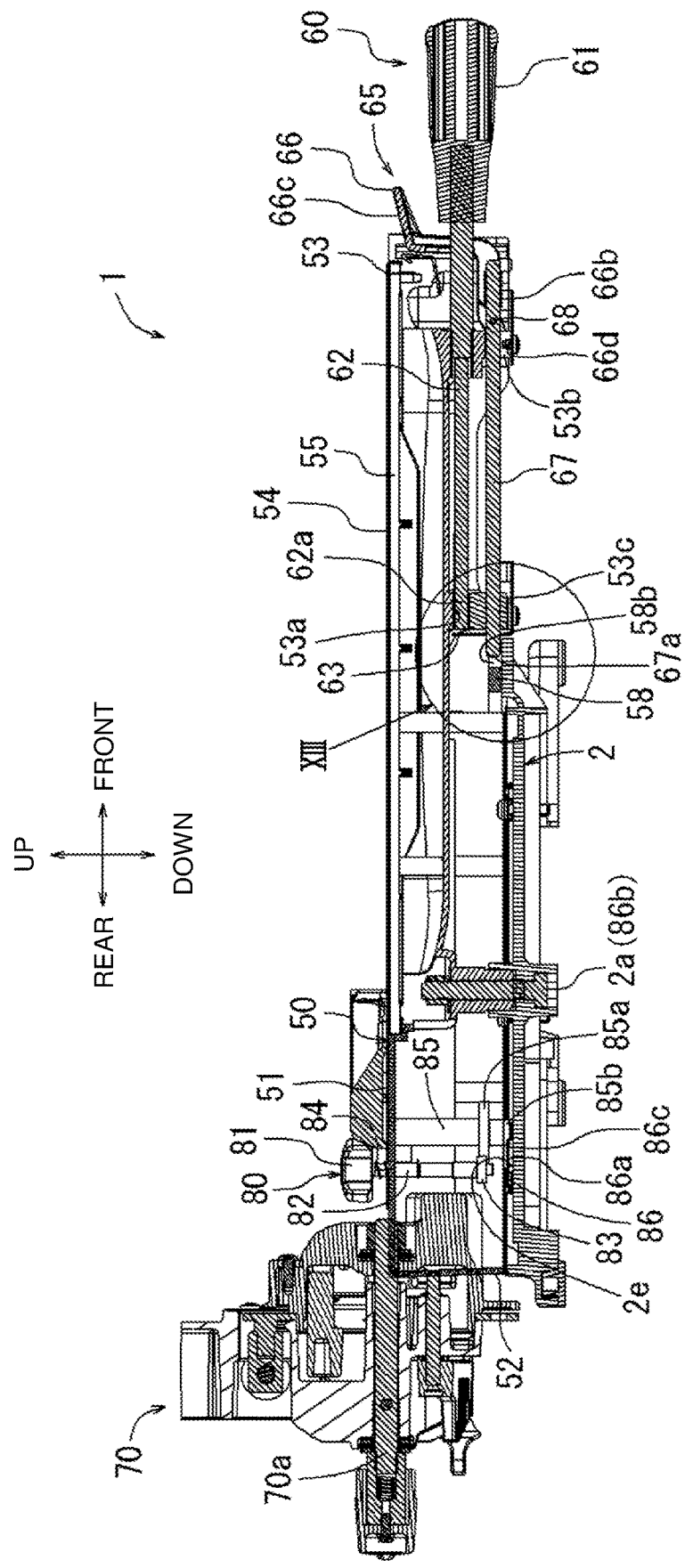

The throat plate 54 is a single plate before having a slot. As shown in FIG. 12, the throat plate 54 in use has a cutout slot 55, which is formed by cutting using a cutting blade 11. The slot 55 indicates an actual accurate position of the cutting blade 11.

As shown in FIG. 12, a table positioning mechanism 60 (first positioning mechanism) and a positive locking mechanism 65 (second positioning mechanism) are located below the table extension 53. The table positioning mechanism 60 includes a fixing rod 62 and a grip 61. The fixing rod 62 is located inside the table extension 53 and extends in the longitudinal direction of the table extension 53. The grip 61 protrudes further forward from a front end of the table extension 53. The grip 61 is integral with a front end of the fixing rod 62.

Figure 13:
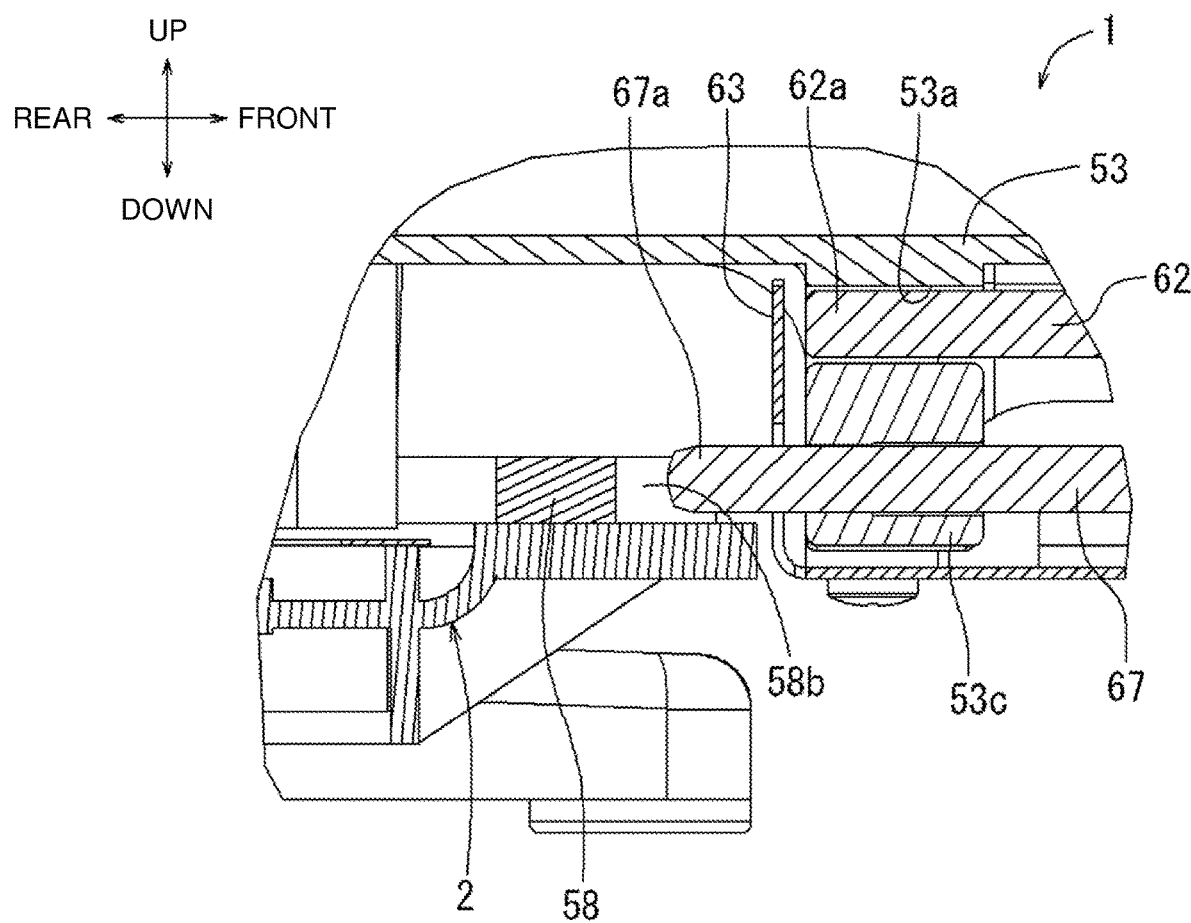
FIG. 13 is an enlarged partial view of area XIII in FIG. 12.

As shown in FIGS. 12 and 13, a threaded shaft part 62a is located on a rear end of the fixing rod 62. The threaded shaft part 62a is screwed into a screw hole 53a formed in the table extension 53. The screw hole 53a extends in the front-rear direction in a rear support 53c located in a lower rear portion of the table extension 53. The fixing rod 62 moves toward the base 2 in the longitudinal direction of the table extension 53 when the user grips and rotates the grip 61 about the axis of the fixing rod 62 in a screw tightening direction. In contrast, the fixing rod 62 moves away from the base 2 in the longitudinal direction of the table extension 53 when the user grips and rotates the grip 61 about the axis of the fixing rod 62 in a screw loosening direction.

As shown in FIGS. 12 and 13, a protection plate 63 extends both vertically and horizontally behind the rear end of the fixing rod 62. The protection plate 63 is placed between the rear end of the fixing rod 62 and a front wall of the base 2 (not shown). The protection plate 63 is fixed to a basal end of the table extension 53. The rear end of the fixing rod 62 abuts against the protection plate 63 when the grip 61 is rotated in the screw tightening direction. The protection plate 63 is then pressed against the front wall of the base 2 as pushed by the rear end of the fixing rod 62. This fixes the table extension 53 to the base 2, locking the turntable 50 to prevent rotation with respect to the base 2. In this manner, the turntable 50 is locked against the base 2 at a predetermined rotation angle.

Figure 16:
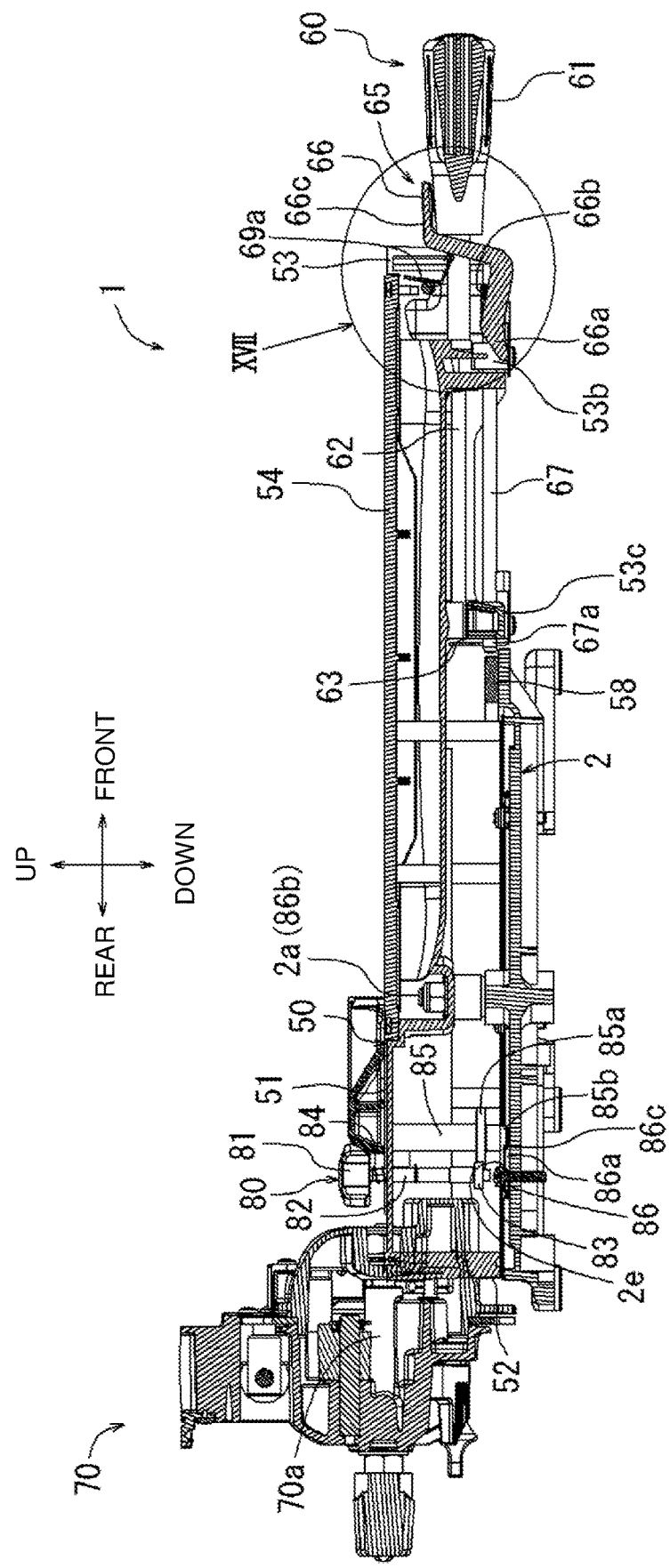
FIG. 16 is a cross-sectional view taken along line XVI-XVI in FIG. 4.

As shown in FIG. 12, the positive locking mechanism 65 includes an unlock lever 66 and a positioning pin 67. The unlock lever 66 is located at the front end of the table extension 53. The unlock lever 66 is substantially curved into an S-shape (a crank shape). The unlock lever 66 includes an operation part 66c protruding forward from above a middle portion of the unlock lever 66. The operation part 66c protrudes further forward from the front end of the table extension 53. As shown in FIG. 16, a rear end 66a is supported in a manner swingable in the vertical direction relative to the table extension 53 with a swing shaft 66d shown in FIG. 12.

As shown in FIGS. 12 and 16, the positioning pin 67 extends in the front-rear direction below the fixing rod 62. The unlock lever 66 cooperates with the positioning pin 67 in front of the swing shaft 66d with an engagement pin 68. The engagement pin 68 has a sufficiently smaller diameter than the positioning pin 67. The engagement pin 68 is placed through the positioning pin 67 in the lateral direction. The engagement pin 68 abuts against the rear end 66a from below. The positioning pin 67 is supported in a manner movable back and forth with a front support 53b and the rear support 53c of the table extension 53.

Figure 14:
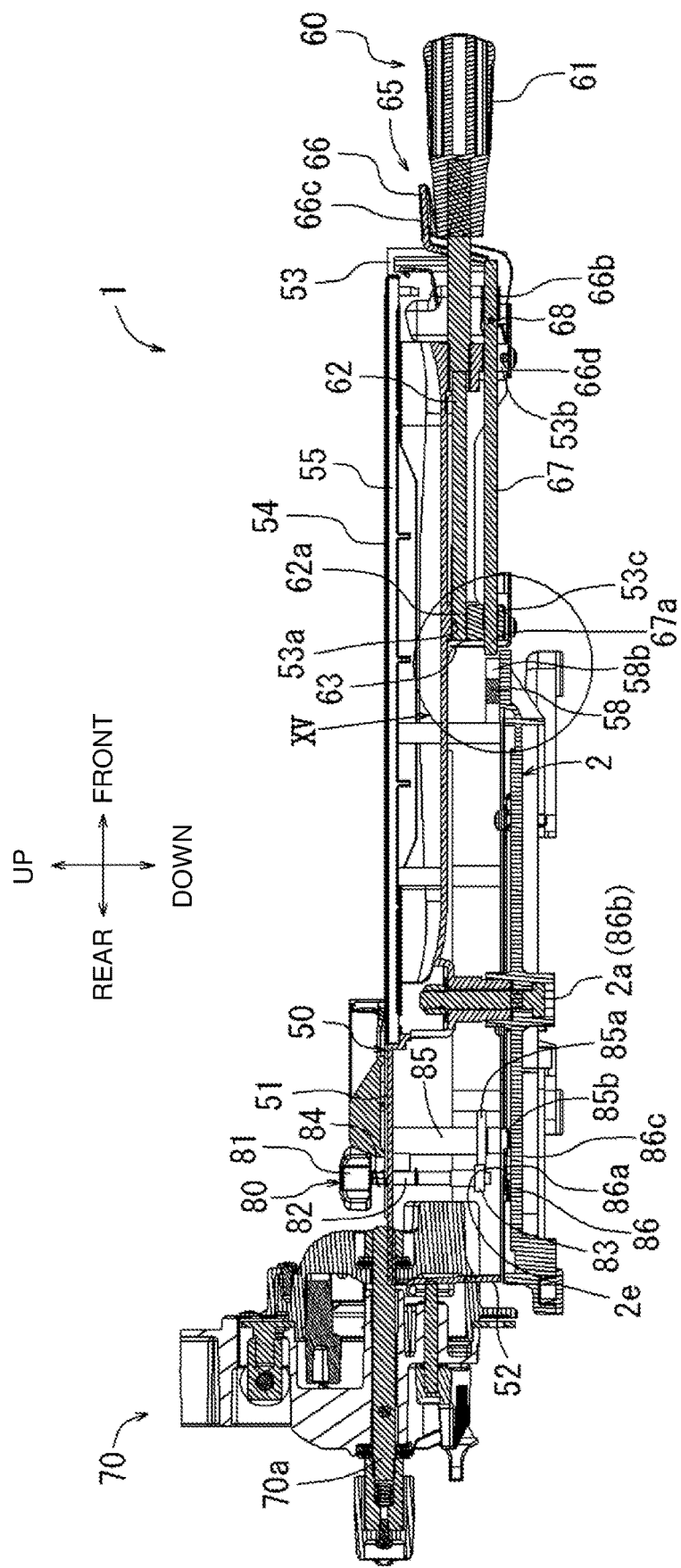
FIG. 14 is a cross-sectional view corresponding to FIG. 12 with the positive locking mechanism turned off.
Figure 15:
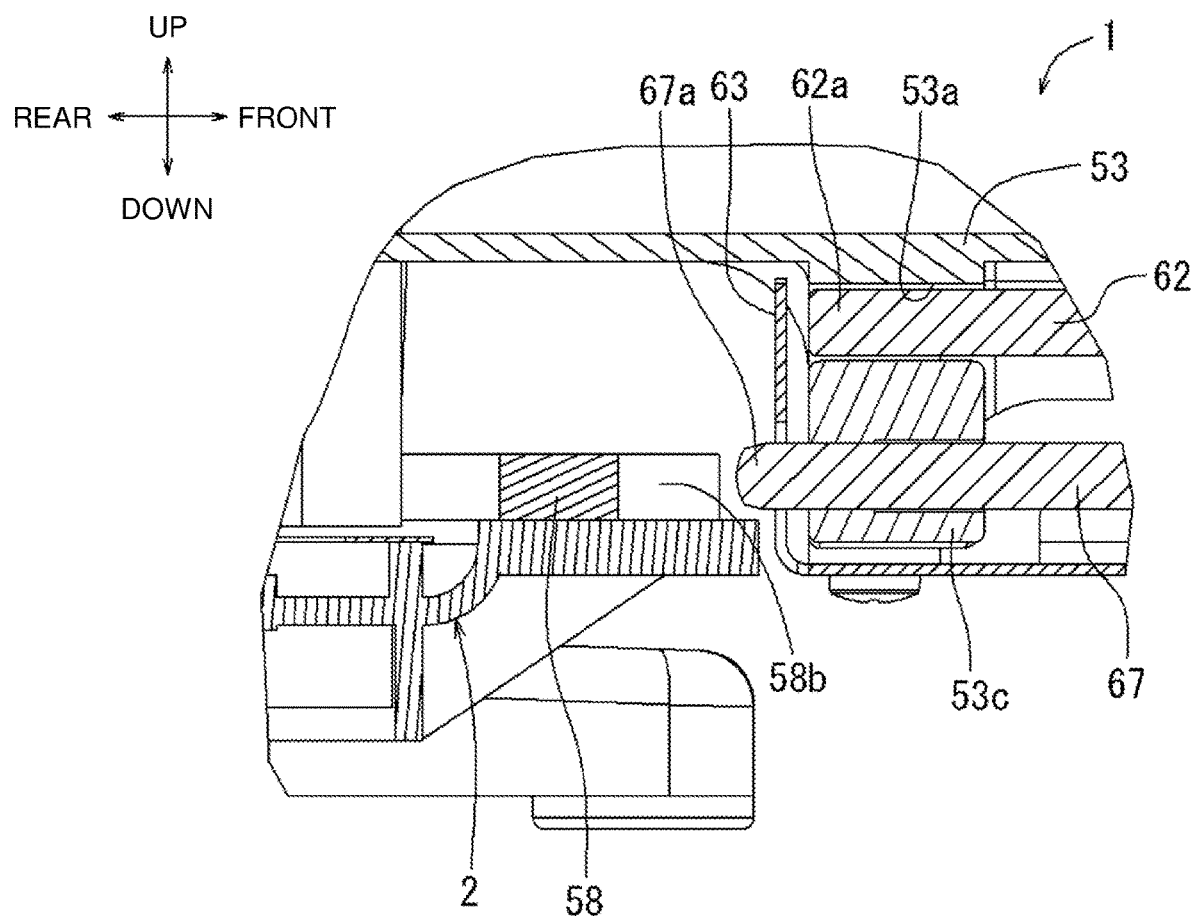
FIG. 15 is an enlarged partial view of area XV in FIG. 14.

As shown in FIG. 14, as the positioning pin 67 moves backward, the rear end 66a is pressed upward by the engagement pin 68. The unlock lever 66 thus swings upward about the swing shaft 66d. As shown in FIG. 12, the unlock lever 66 swings downward about the swing shaft 66d to press the engagement pin 68 downward with the rear end 66a. This moves the engagement pin 68 relatively forward along the lower surface of the rear end 66a, and thus moves the positioning pin 67 forward. The positioning pin 67 has a rear end 67a facing the front surface of a miter scale plate 58 mounted on an upper surface of a middle arc portion of the base 2. The front surface of the miter scale plate 58 has positioning recesses 58b facing the rear end 67a at the height to receive the rear end 67a. The miter scale plate 58 extends in an arc in the circumferential direction. The positioning recesses 58b are spaced at predetermined angular intervals in the circumferential direction of the miter scale plate 58.

Figure 17:
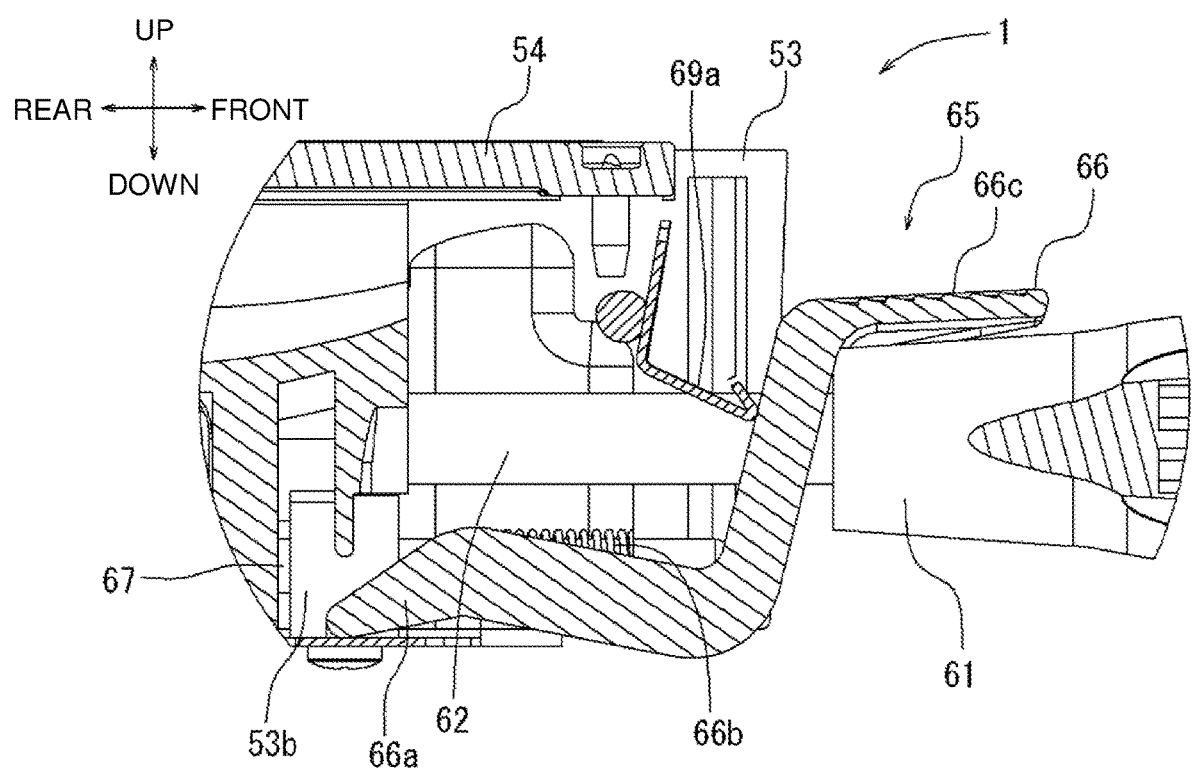
FIG. 17 is an enlarged partial view of area XVII in FIG. 16.

As shown in FIGS. 12 and 17, a compression spring 66b is attached to the positioning pin 67 at a position forward from the engagement pin 68. The compression spring 66b urges the positioning pin 67 backward. Thus, the unlock lever 66 is urged upward by the compression spring 66b with the engagement pin 68. As shown in FIG. 12, when the unlock lever 66 is at an upper position (lock position), the positioning pin 67 is moved backward under the urging force applied from the compression spring 66b. The rear end 67a of the positioning pin 67 thus enters one of the positioning recesses 58b. This locks the rotation of the turntable 50.

The positioning pin 67 is retained at the lock position under the urging force applied from the compression spring 66b.

As shown in FIG. 14, when the operation part 66c is depressed (to an unlock position) against the urging force applied from the compression spring 66b, the engagement pin 68 moves forward, and thus the positioning pin 67 also moves forward. The rear end 67a is thus pulled out of the positioning recess 58b. This unlocks the positive locking mechanism 65 to allow the turntable 50 to rotate. The turntable 50 may be rotated while the positive locking mechanism 65 is unlocked. The rear end 67a is then urged by the compression spring 66b and pressed against the miter scale plate 58. Once the turntable 50 rotates to a predetermined angle, the rear end 67a faces one of the positioning recesses 58b. The rear end 67a then readily enters the positioning recess 58b. This locks the turntable 50 at the rotating position at the predetermined angle.

As shown in FIG. 2, an operation knob 69 is located on the left of the front end of the table extension 53. The operation knob 69 retains the unlock lever 66 at a depressed position (unlock position). The unlock lever 66 is locked at the depressed position (unlocking operation) when the operation knob 69 is operated. As shown in FIG. 17, the unlock lever 66 is locked at the depressed position when a leaf spring 69a integral with the operation knob 69 interferes with the rear of the operation part 66c. While the unlock lever 66 is retained at the unlock position, the rear end 67a shown in FIG. 12 remains detached from the positioning recess 58b. This allows quick and reliable positioning with the table positioning mechanism 60. With no positioning performed with the table positioning mechanism 60, the unlock lever 66 is unlocked by disabling the locking operation of the operation knob 69. This moves the unlock lever 66 back to the lock position located above under the urging force applied from the compression spring 66b.

Figure 5:
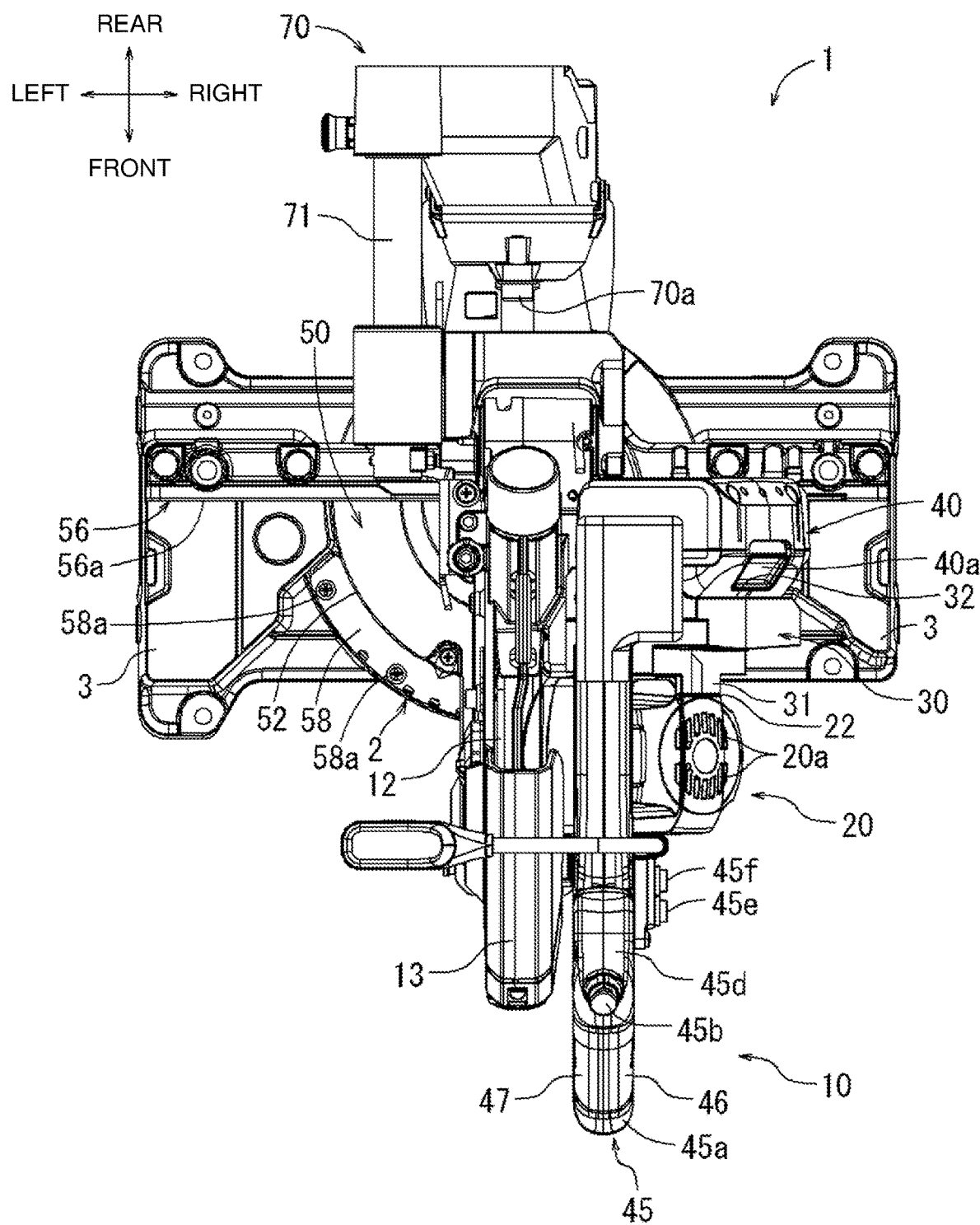
FIG. 5 is a plan view of the cutting machine according to the first embodiment.
Figure 7:
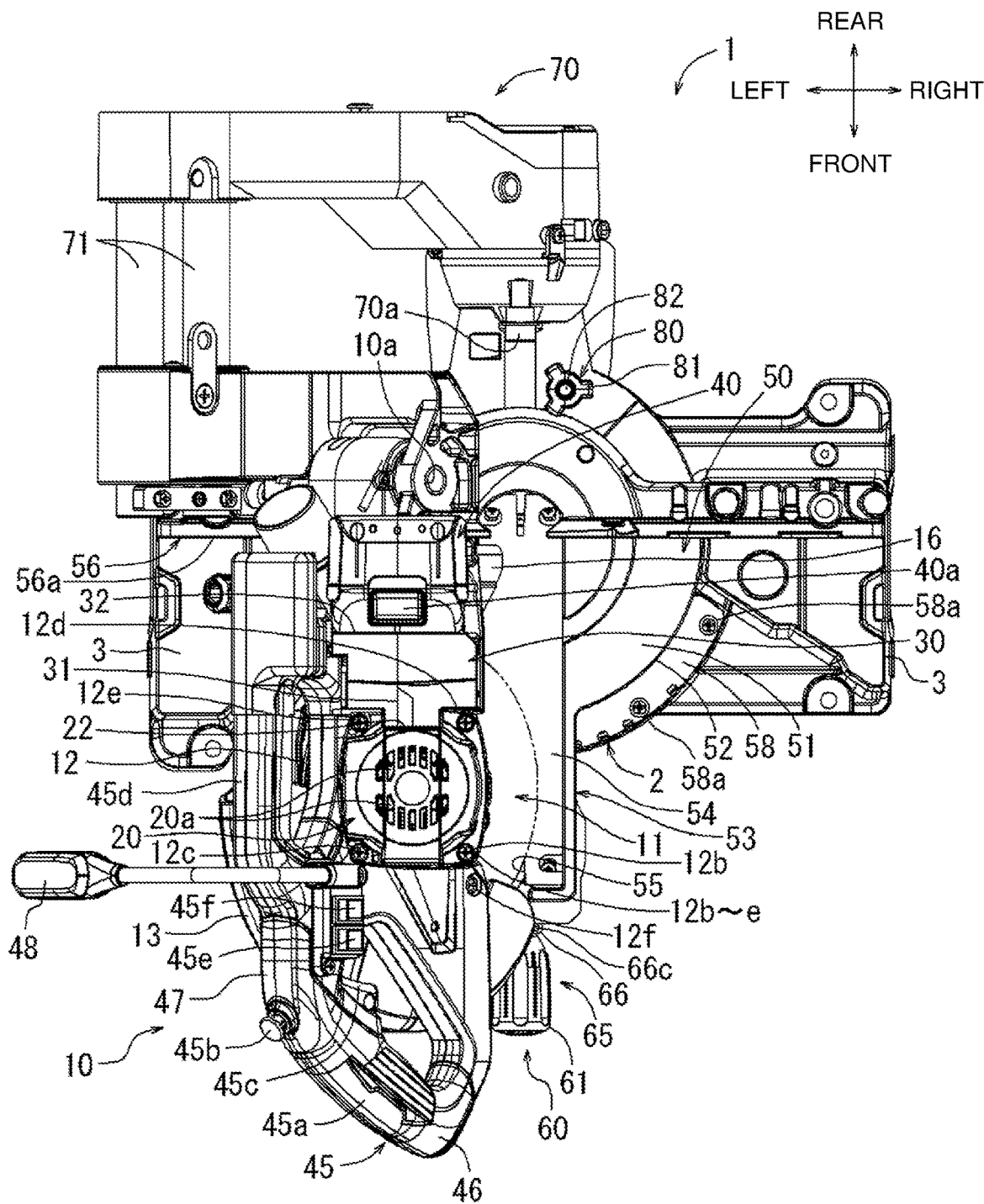
FIG. 7 is a plan view of the cutting machine according to the first embodiment with the cutting machine body tilted leftward.

As shown in FIGS. 5 and 7, the miter scale plate 58 having an arc shape is mounted in the front of the base 2. The miter scale plate 58 is placed within substantially a front half area of the circumference of the base 2. The miter scale plate 58 has a substantially flat upper surface graduated to indicate the miter angle of the turntable 50. The miter scale plate 58 is fixed to the base 2 with fixing screws 58a. Each fixing screw 58a is inserted into a long hole. Loosening the fixing screw 58a and moving the miter scale plate 58 in the lateral direction finely adjusts the angles of the positioning fence 56 and the cutting blade 11. For example, when the positioning pin 67 is inserted into a positioning recess 58b at right angles, the cutting blade 11 and the positioning fence 56 are finely adjusted at right angles. This adjustment is performed mainly in production processes.

As shown in FIG. 2, an adjustment bolt 57 is located at a lower end of the table extension 53 to support the table extension 53 from below. The adjustment bolt 57 is movable in the vertical direction by screwing. When loosened, the adjustment bolt 57 moves downward. The adjustment bolt 57 has a lower end that abuts against the mounting surface for the cutting machine 1 to support the table extension 53 at an adjustable height.

Figure 4:
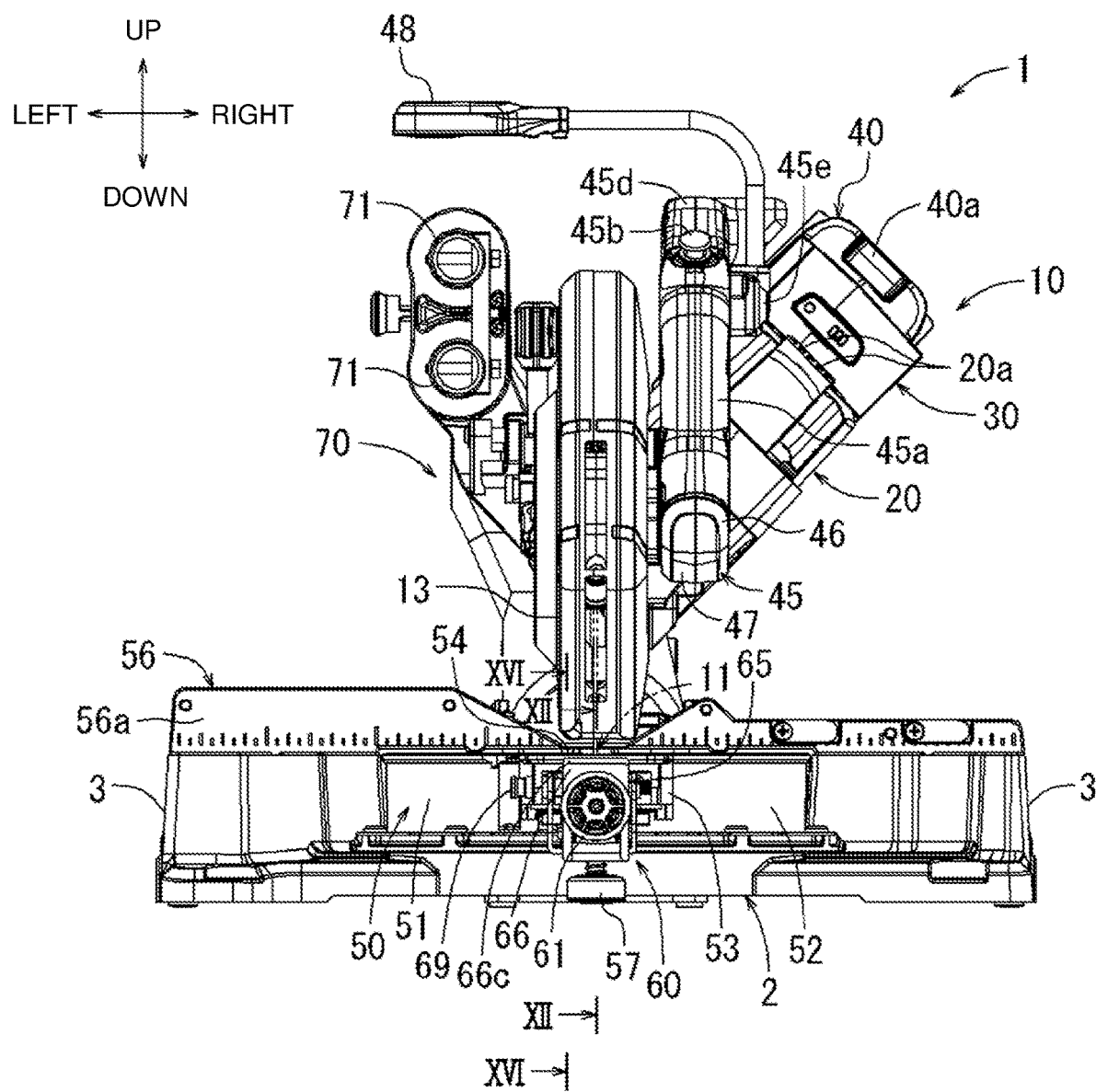
FIG. 4 is a front view of the cutting machine according to the first embodiment.
Figure 6:
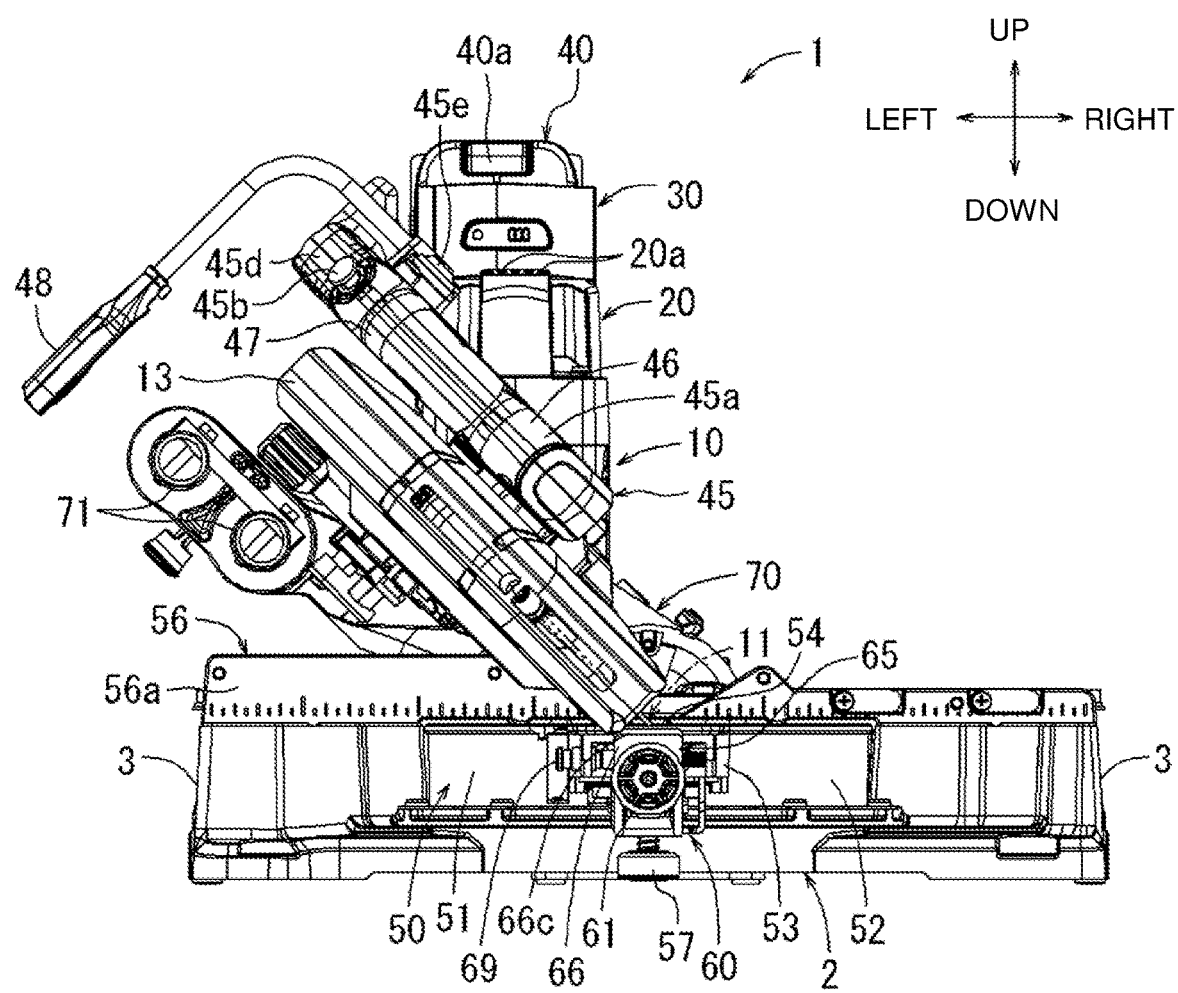
FIG. 6 is a front view of the cutting machine according to the first embodiment with a cutting machine body tilted leftward.

As shown in FIGS. 4 and 12, the positioning fence 56 is a wall that extends in the lateral direction and also upward. A body support 70 is located behind the turntable 50. The body support 70 supports the cutting machine body 10 in a swingable manner. The body support 70 has a lateral tilt support shaft 70a extending in the front-rear direction behind the turntable 50. As shown in FIGS. 6 and 7, the cutting machine body 10 is tiltable in the lateral direction about the lateral tilt support shaft 70a. A slide bar 71 is located between the body support 70 and the cutting machine body 10. As shown in FIGS. 5 and 8, the cutting machine body 10 is slidable in the front-rear direction along the slide bar 71.

As shown in FIG. 2, the cutting machine body 10 has, in its rear portion, a vertical swing support shaft 10a, which is elongated in the lateral direction. The cutting machine body 10 is vertically swingable about the vertical swing support shaft 10a. The cutting machine body 10 is swung downward to allow the cutting blade 11 to cut a workpiece placed on the turntable 50. The cutting machine body 10 is then slid forward. This allows the cutting blade 11 to cut a workpiece, for example, a wide workpiece.

As shown in FIG. 2, the cutting machine body 10 includes a stationary cover 12 and a movable cover 13. The stationary cover (cutting blade cover) 12 covers an upper half of the cutting blade 11. The stationary cover 12 is formed from a metal material, such as aluminum. The movable cover 13 covers a lower half of the cutting blade 11. The movable cover 13 rotates in cooperation with a vertical motion of the cutting machine body 10, and opens and closes the lower half of the cutting blade 11. During cutting, the movable cover 13 moves to an open position, thus uncovering the cutting blade 11 for cutting a workpiece.

Figure 3:
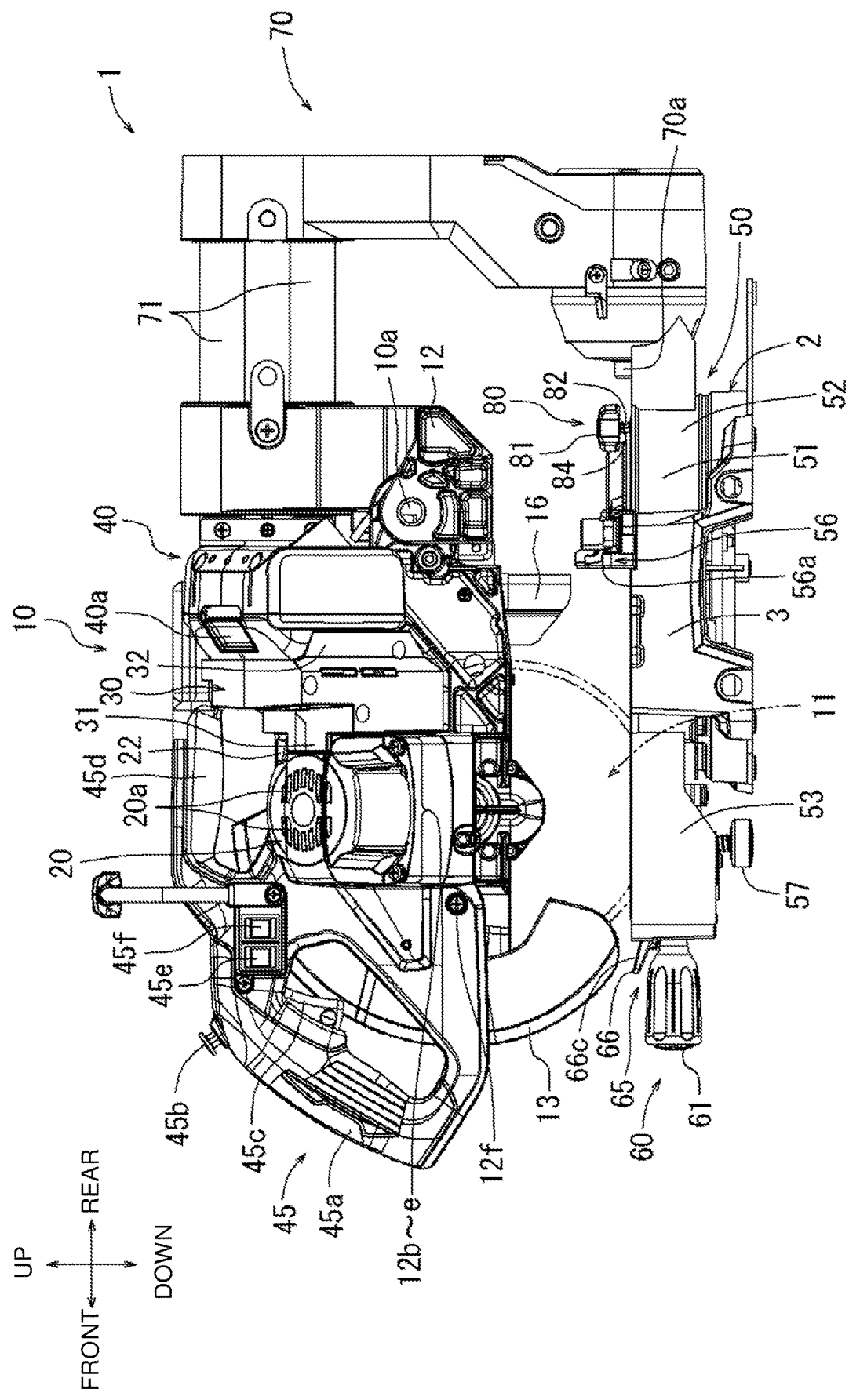
FIG. 3 is a right side view of the cutting machine according to the first embodiment.

As shown in FIGS. 3 and 4, the cutting machine body 10 includes a motor housing 20 and a handle 45. The handle 45 has a half-split structure dividable into a right handle part 46 and a left handle part 47. The right handle part 46 and the left handle part 47 are horizontally symmetrical. The handle 45 includes a front main handle 45a and a rear carrying handle 45d. The main handle 45a and the carrying handle 45d are loop-shaped and thus grippable by the user. The main handle 45a is gripped by the user in a cutting operation. The main handle 45a includes a switch lever 45c on its inner periphery. The switch lever 45c is positioned to be pullable by a finger of the user gripping the main handle 45a. Pulling the switch lever 45c starts a motor 25 and thus rotates the cutting blade 11.

As shown in FIGS. 3 and 4, the main handle 45a includes a lock-off button 45b on its upper surface. The lock-off button 45b is pressed to allow an operation of the switch lever 45c. This structure prevents the motor 25 from starting unexpectedly.

As shown in FIG. 3, the carrying handle 45d is gripped by the user for carrying the cutting machine 1. When the cutting machine body 10 is located at the lower end, the carrying handle 45d extends substantially horizontally. With the cutting machine body 10 locked at the lower end, the user grips the carrying handle 45d to carry the cutting machine 1.

As shown in FIG. 3, the handle 45 includes switches 45e and 45f. Pressing the switch 45e turns on or off a laser illuminator 49 emitting laser light for guideline alignment. The laser light is illuminated on a cut surface and serves as a reference line along which the cutting blade 11 is moved. Pressing the switch 45f turns on or off an illuminator 48 emitting illumination light. The illumination light illuminates a cutting area to be cut by the cutting blade 11. The illuminator 48 includes an arm extending from the handle 45, and is located above the cutting machine body 10.

As shown in FIG. 2, the carrying handle 45*d* receives a communication adapter 41 at its rear. The communication adapter 41 is electrically connected to a controller 35 shown in FIG. 32. The communication adapter 41 wirelessly communicates with other attachments. The attachments include a dust collector for sucking chips. The attachments communicating wirelessly can be activated or deactivated in cooperation with a start or stop operation of the cutting machine 1.

Figure 32:
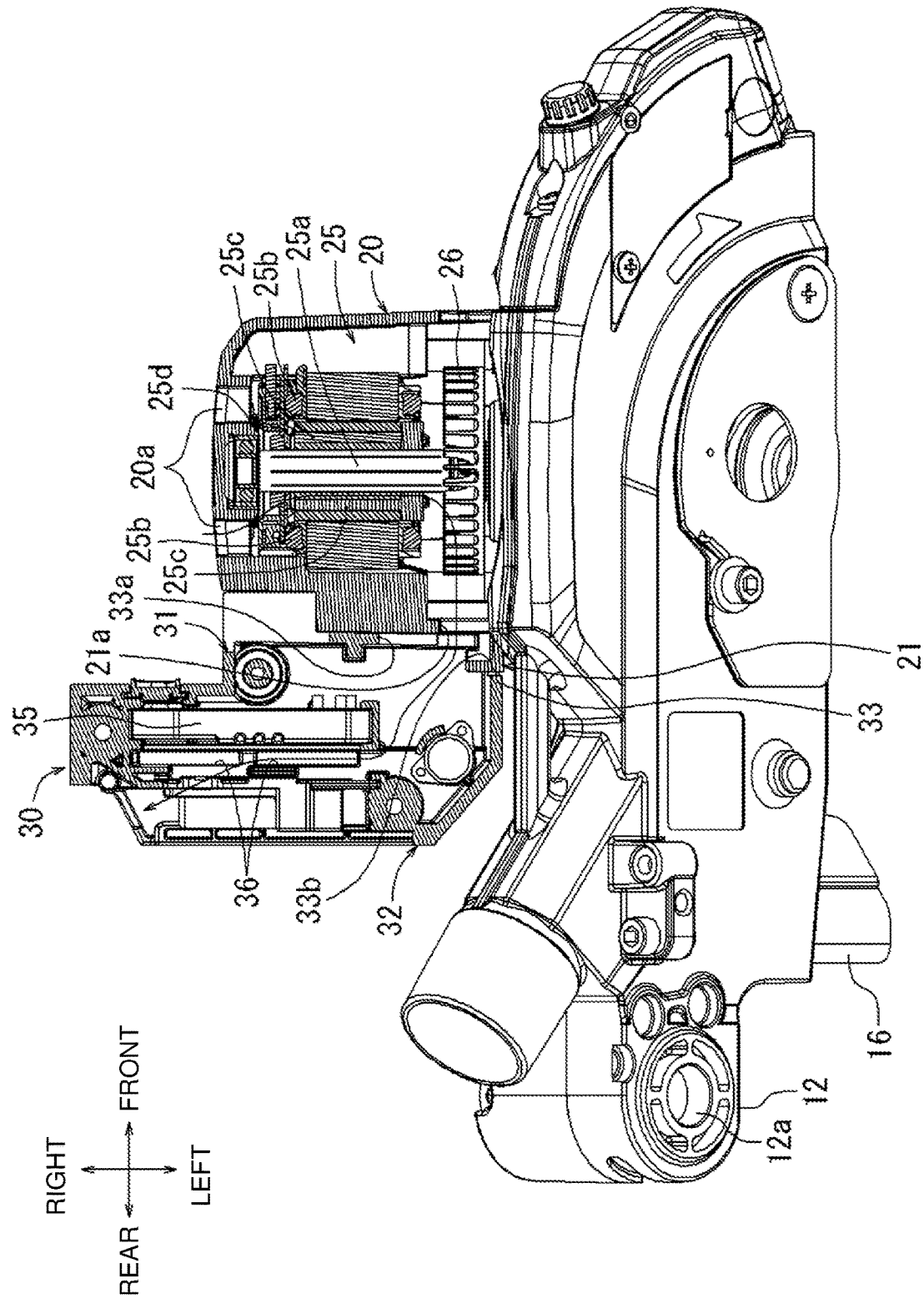
FIG. 32 is a cross-sectional view taken along line XXXII-XXXII in FIG. 31.

As shown in FIG. 4, the motor housing 20 is substantially cylindrical, and is tilted right upward with respect to the stationary cover 12. The motor housing 20 has an inlet 20*a* on its upper right. As shown in FIG. 32, the motor housing 20 accommodates the motor 25. The motor 25 includes a motor shaft 25*a* extending in the axial direction of the substantially cylindrical motor housing 20. The motor shaft 25*a* receives a motor fan 26 on its lower left opposite to the inlet 20*a*. When the motor 25 rotates the motor fan 26, outside air is drawn into the motor housing 20 through the inlet 20*a*.

As shown in FIG. 32, the motor 25 may be a direct current (DC) brushless motor. The motor 25 includes a stator 25*b* supported on the inner peripheral surface of the motor housing 20 in a nonrotatable manner. The motor 25 includes a rotor 25*c* located inward from the inner peripheral surface of the stator 25*b*. The rotor 25*c* is mounted on the motor shaft 25*a*, and is rotatably supported together with the motor shaft 25*a* with respect to the motor housing 20. The rotation angle of the rotor 25*c* is detected by a sensor board 25*d*.

As shown in FIG. 4, the motor housing 20 is not parallel but is tilted with respect to the upper surface of the turntable 50 when the cutting blade 11 is at a perpendicular cutting position orthogonal to the upper surface of the turntable 50. Thus, the tilt angle (bevel angle) of the cutting machine body 10 toward the right of the motor housing 20 can be set larger. For example, the cutting machine body 10 can be tilted by a greater degree than when the motor housing 20 is located parallel to the upper surface of the turntable 50.

As shown in FIG. 2, the cutting blade 11 with the center held between an outer flange 15 and an inner flange (not shown) is attached to a spindle (not shown) with a fixing screw 14 being screwed. The cutting blade 11 is thus supported by the stationary cover 12 in a manner rotatable with the spindle. The spindle, to which the cutting blade 11 is attached, is rotatable together with the rotation of the motor shaft 25*a* shown in FIG. 32 transmitted through a reduction gear.

Figure 18:
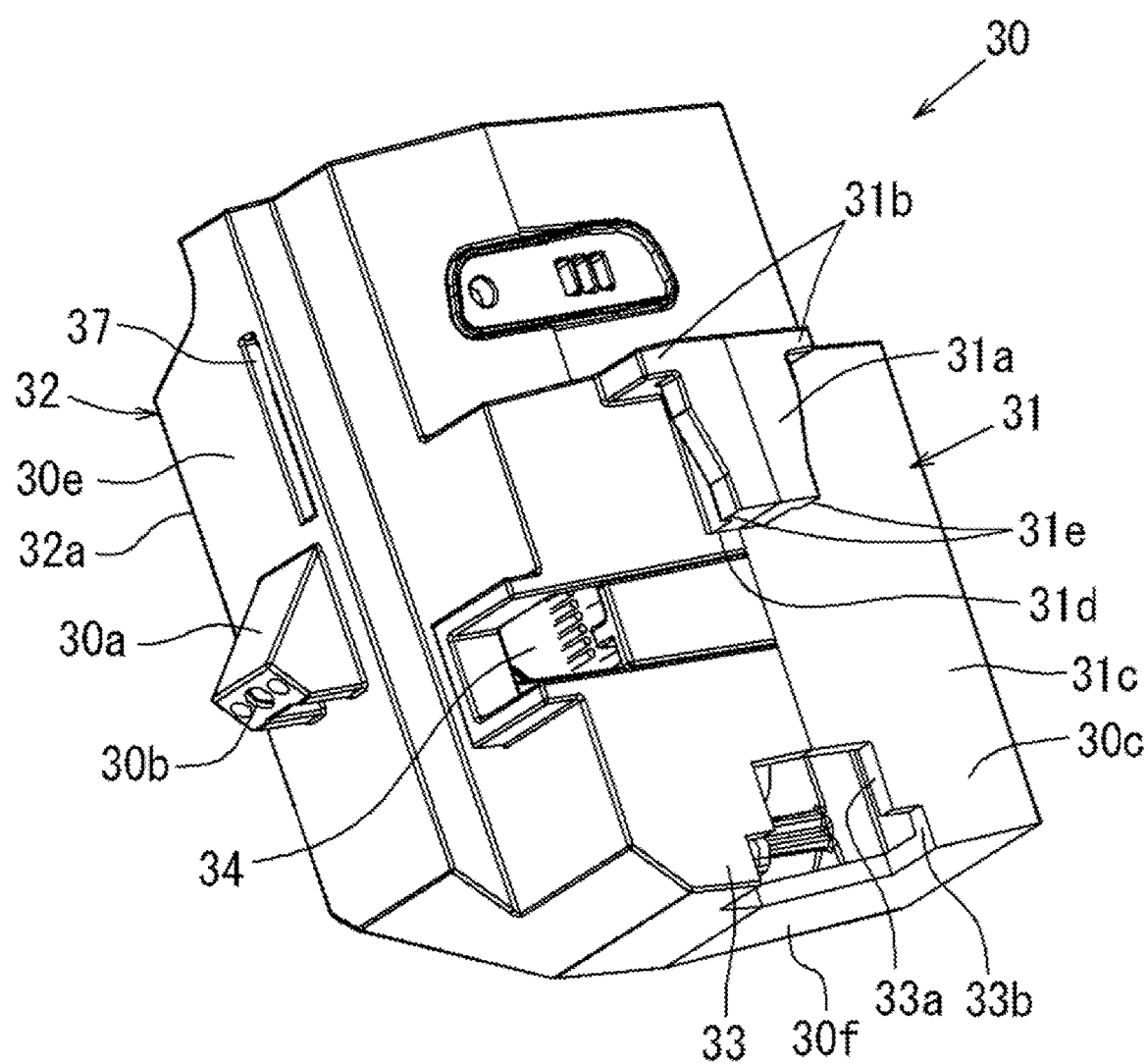
FIG. 18 is a perspective view of an adapter as viewed from a positioning unit.
Figure 19:
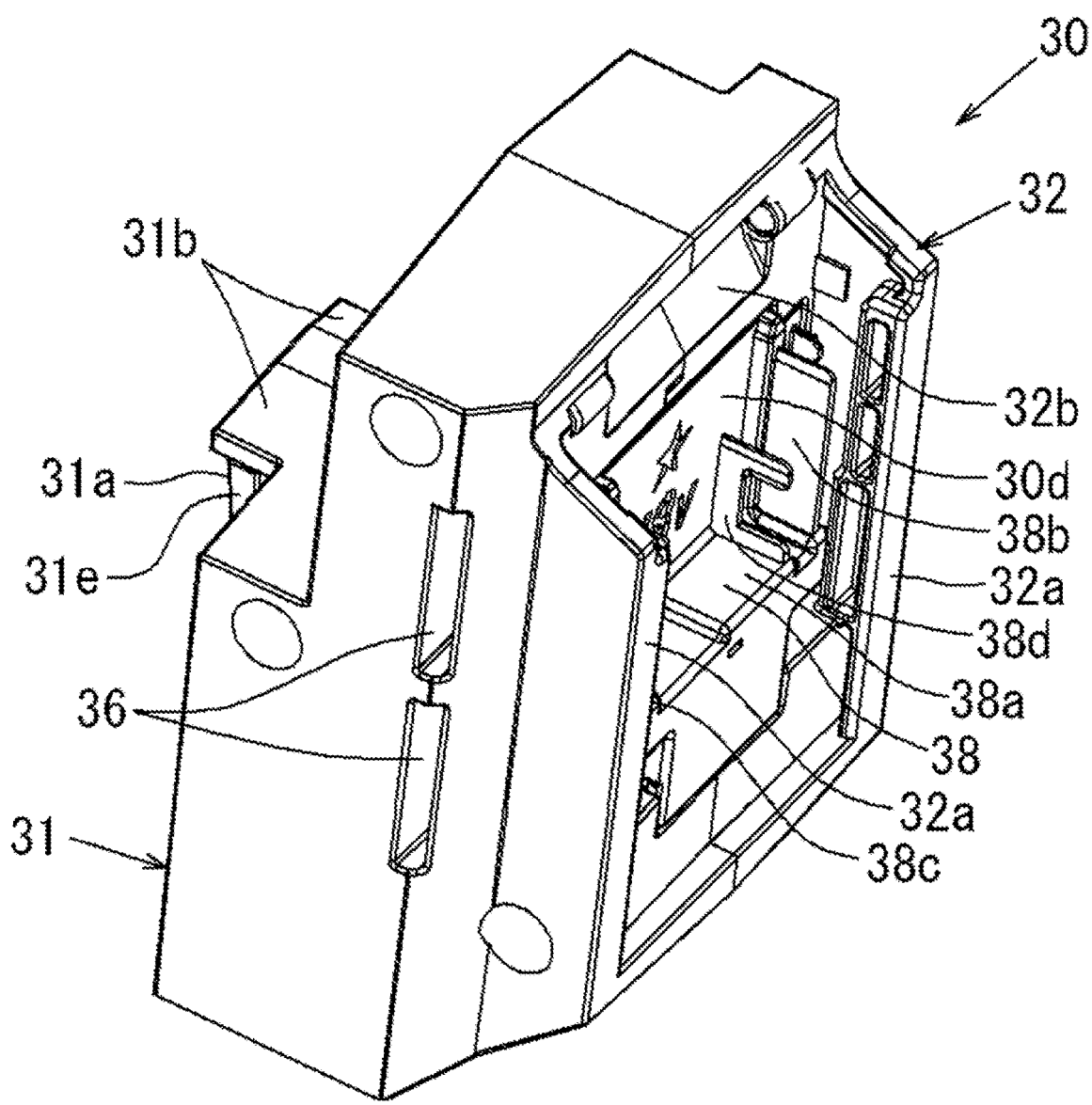
FIG. 19 is a perspective view of the adapter as viewed from a battery holder.
Figure 20:
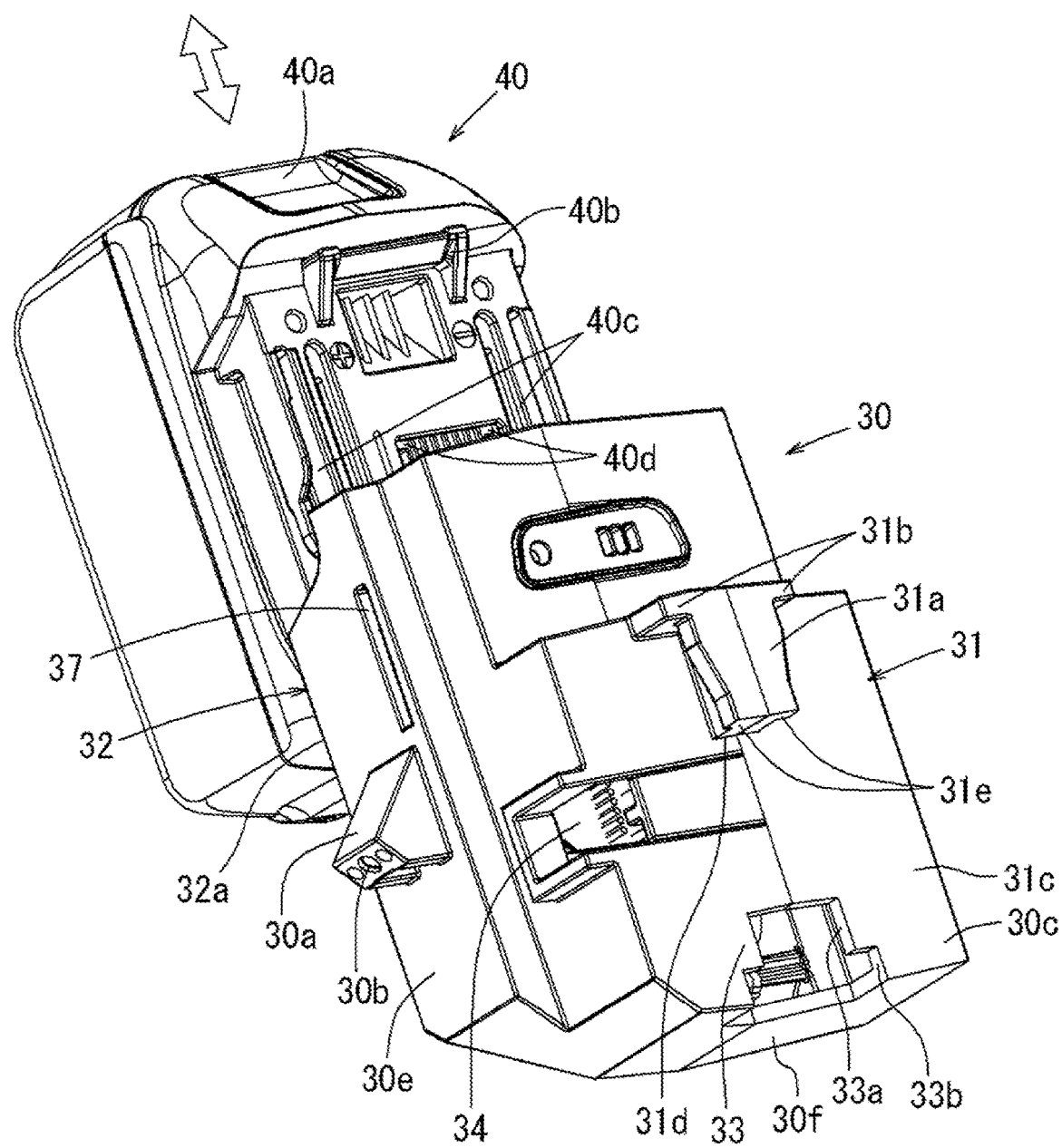
FIG. 20 is a perspective view of the adapter and a battery currently being attached to and detached from the adapter as viewed from the positioning unit.
Figure 21:
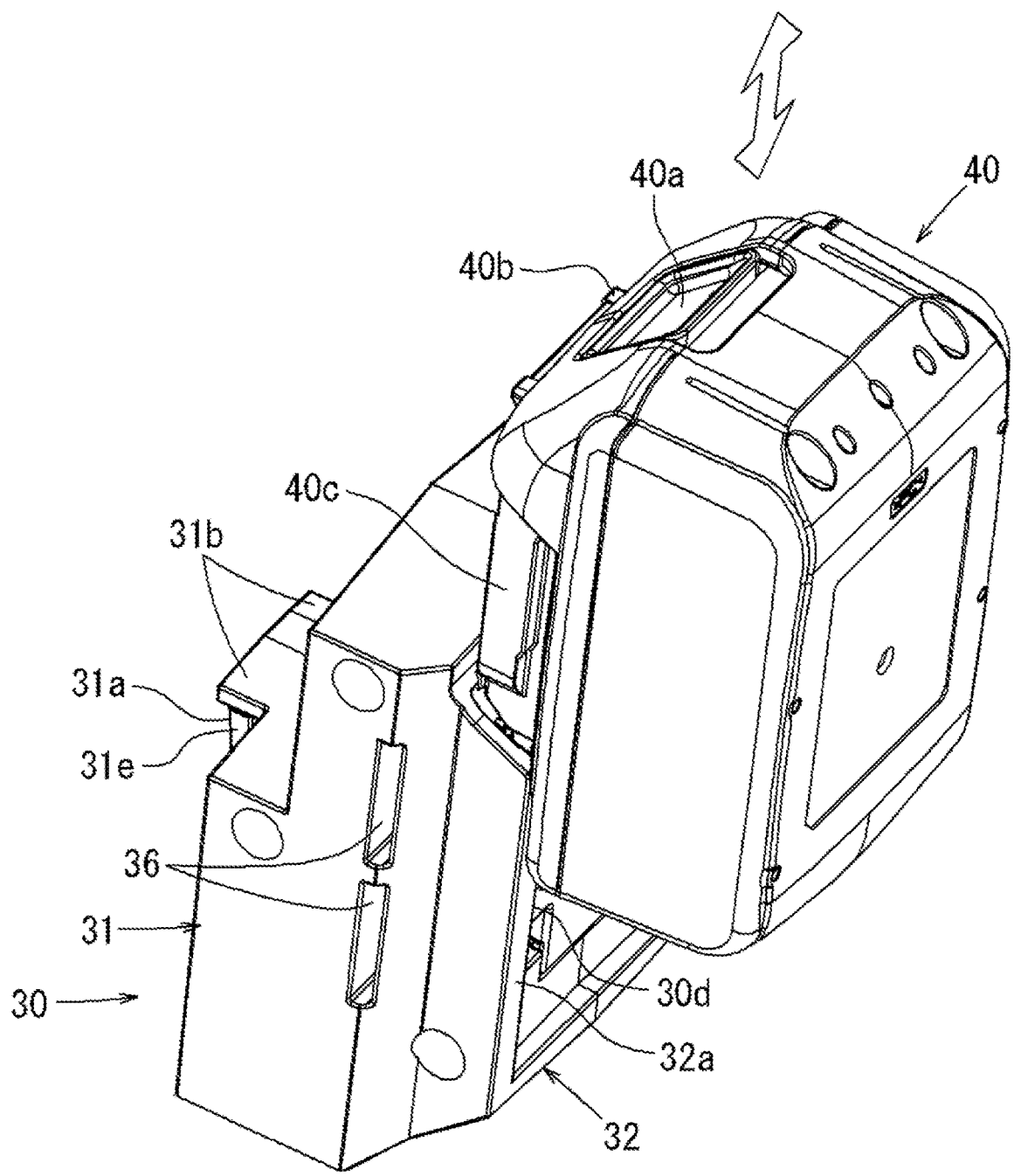
FIG. 21 is a perspective view of the adapter and the battery currently being attached to and detached from the adapter as viewed from the battery holder.
Figure 22:
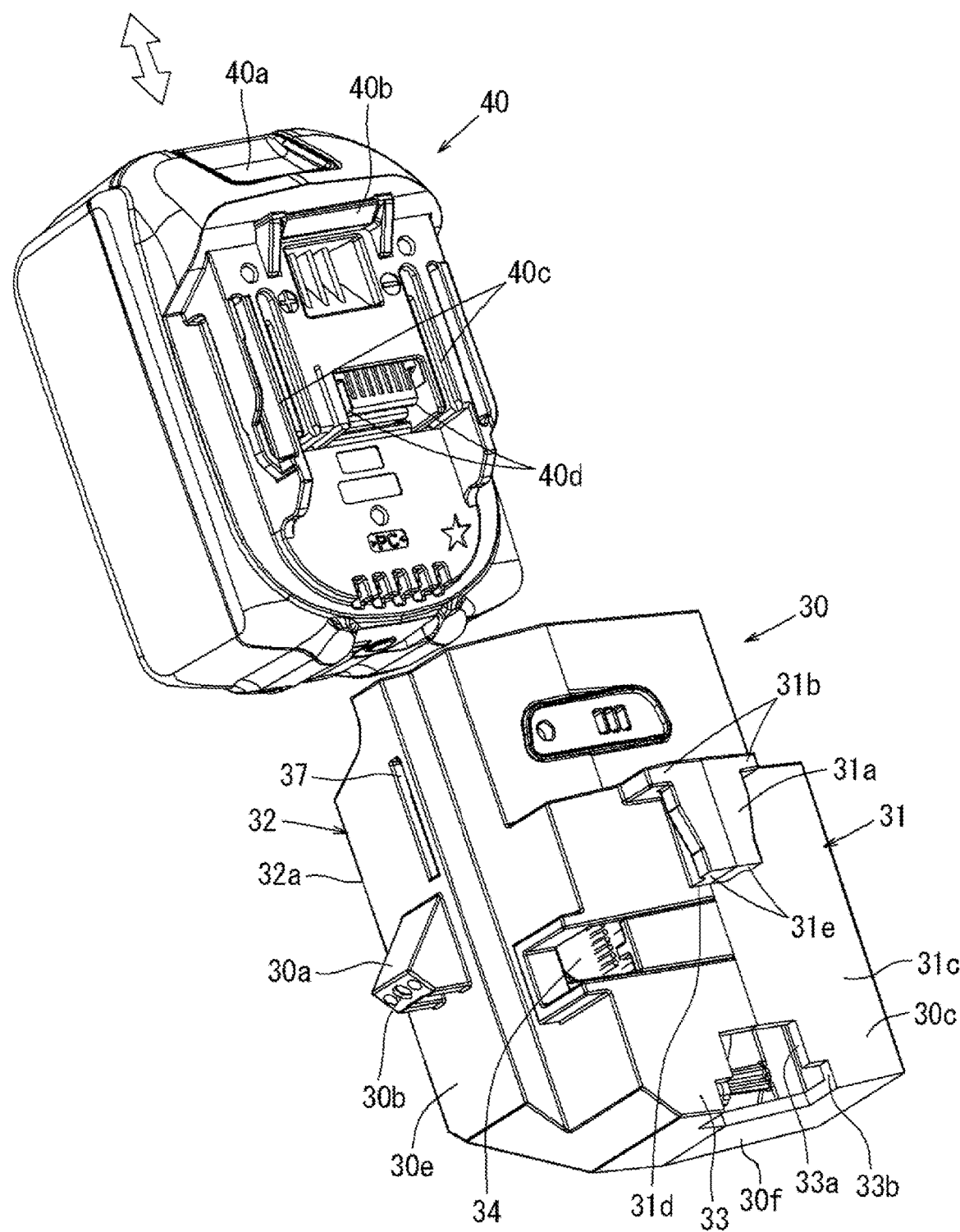
FIG. 22 is a perspective view of the adapter and the battery as viewed from the positioning unit.
Figure 23:
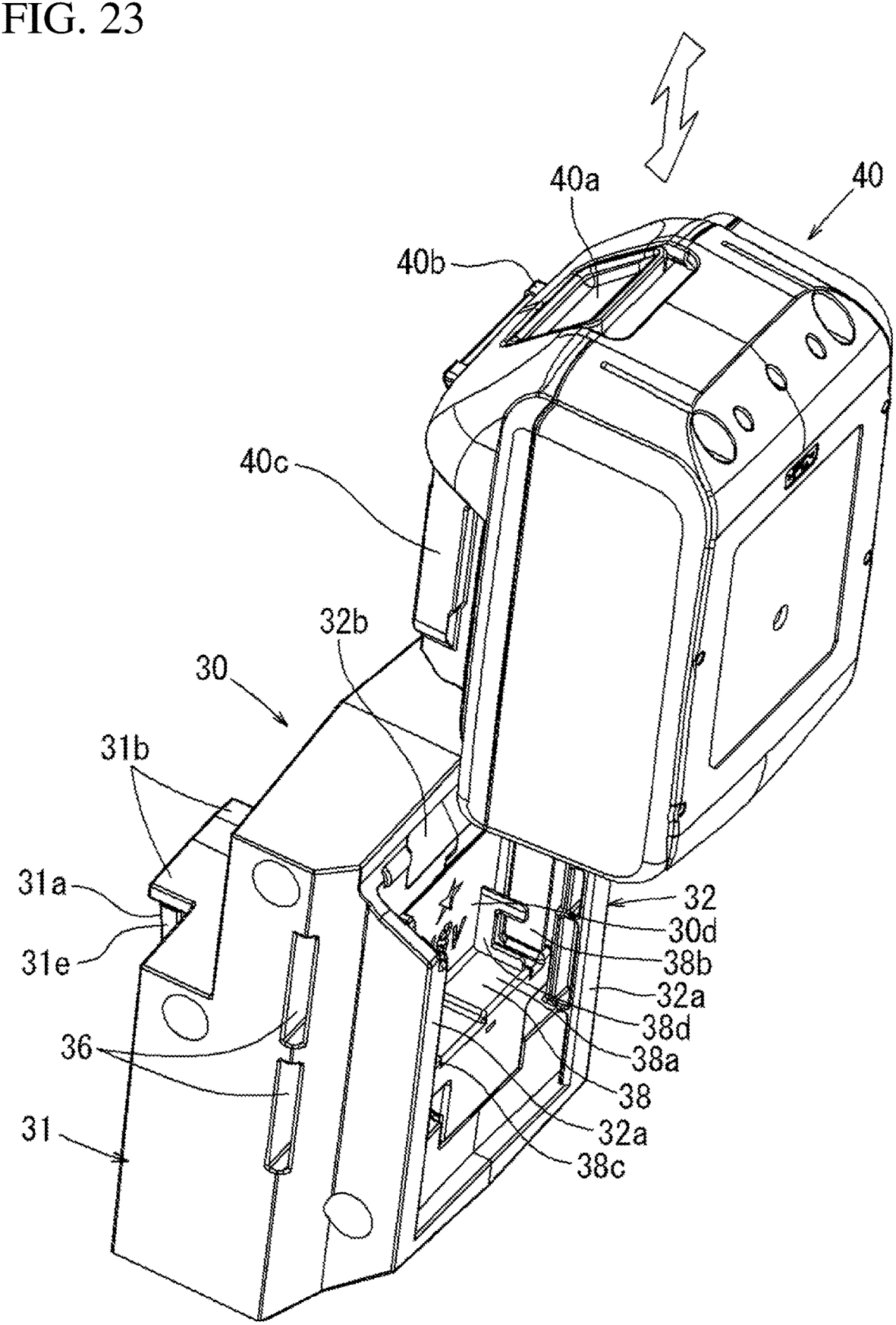
FIG. 23 is a perspective view of the adapter and the battery as viewed from the battery holder.

As shown in FIG. 3, an adapter 30 is attachable to the rear of the motor housing 20. As shown in FIGS. 18 and 19, the adapter 30 has a substantially box-shape with a step. The adapter 30 includes a positioning unit 31 and a battery holder (first battery holder) 32 on different surfaces. The positioning unit 31 is attached to the motor housing 20. The battery holder 32 receives a battery 40 in a removable manner.

As shown in FIGS. 18 and 19, the positioning unit 31 includes a rail 31*a*, engagement parts 31*b*, and a flat surface 31*c*. The flat surface 31*c* is substantially flat. The rail 31*a* has a T-shaped cross section, and includes a standing portion 31*d* and extensions 31*e*. The standing portion 31*d* protrudes from the flat surface 31*c*. The extensions 31*e* extend from the leading end of the standing portion 31*d* substantially parallel to the flat surface 31*c*. The engagement parts 31*b* are located at the end of the rail 31*a* and protrude from the flat surface 31*c*. The engagement parts 31*b* extend in a direction substantially perpendicular to the longitudinal direction of the rail 31*a*.

As shown in FIGS. 18 and 19, the adapter 30 includes a first surface 30*c*, a second surface 30*d*, a body engagement surface 30*e*, and a bottom surface 30*f*. The first surface 30*c* includes the positioning unit 31. The second surface 30*d* includes the battery holder 32. The first surface 30*c* is opposite to and substantially parallel to the second surface 30*d*. The body engagement surface 30*e* and the bottom surface 30*f* are substantially perpendicular to the first surface 30*c* and the second surface 30*d*. The body engagement surface 30*e* is an end face of the adapter 30 in the breadthwise direction, and is located adjacent to the cutting machine body 10 when the adapter 30 is attached to the cutting machine body 10. In this posture, the body engagement surface 30*e* is located on the upper left of the cutting machine body 10. The bottom surface 30*f* is an end face of the adapter 30 in the lengthwise direction, and is located adjacent to the cutting machine body 10 when the adapter 30 is attached to the cutting machine body 10. In this posture, the bottom surface 30*f* is located at the lower left of the cutting machine body 10.

As shown in FIG. 18, the positioning unit 31 includes a ventilation part (second ventilation part) 33. The ventilation part 33 is located on the first surface 30*c*, which faces the front when the adapter 30 is attached to the cutting machine body 10, and on the bottom surface 30*f*. The ventilation part 33 has a second ventilation hole 33*a* allowing passage into and out of the adapter 30. The second ventilation hole 33*a* is a corner hole open in the first surface 30*c* through the bottom surface 30*f*.

As shown in FIG. 19, the battery holder 32 includes a pair of rails 32*a* extending in the longitudinal direction of the adapter 30 and an engagement recess 32*b*. The rails 32*a* extend along the two edges of the adapter 30 and face each other. The engagement recess 32*b* is engaged with an engagement tab 40*b* of the battery 40 shown in FIG. 22.

Figure 29:
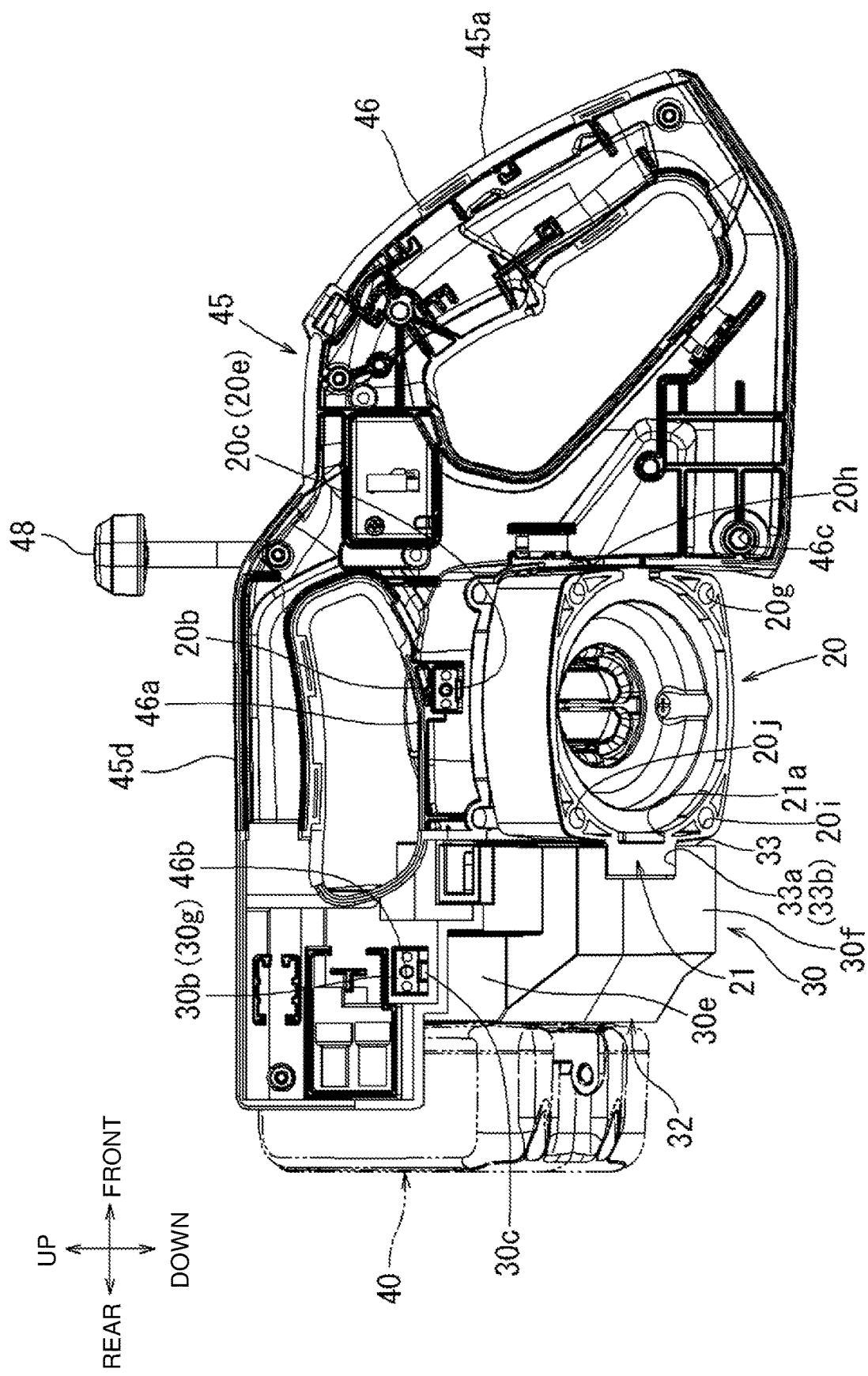
FIG. 29 is a left side view of the right handle part with the motor housing and the adapter attached.
Figure 30:
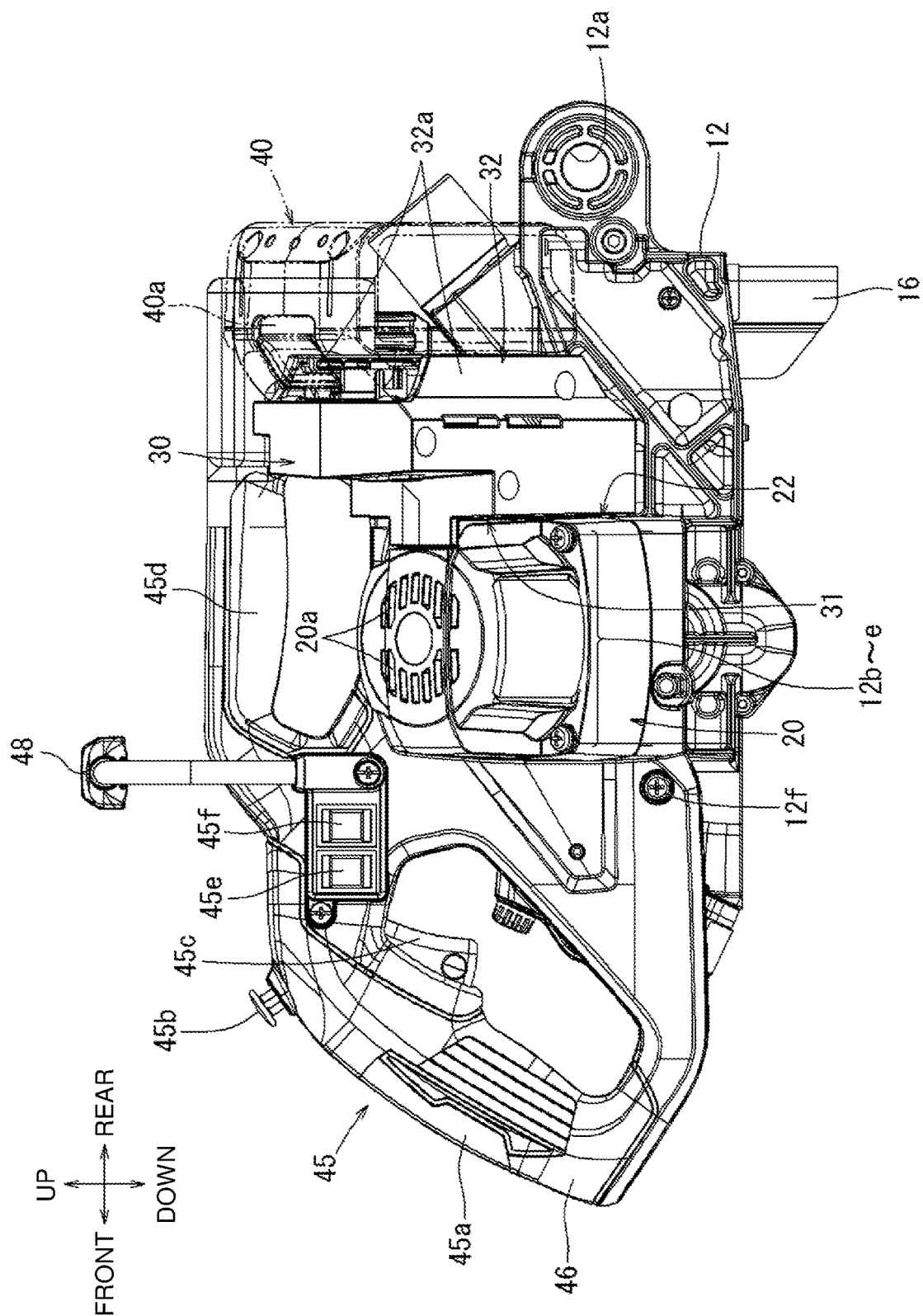
FIG. 30 is a right side view of the handle with the motor housing, the adapter, and a stationary cover attached.

As shown in FIG. 18, the body engagement surface 30*e* includes a body holder 30*a* engageable with the cutting machine body 10. The body holder 30*a* protrudes as a substantially triangular prism. The body holder 30*a* has a screw hole 30*b*. As shown in FIG. 29, when attached to the right handle part 46, the adapter 30 has the screw hole 30*b* extending horizontally.

As shown in FIGS. 18, 19, and 32, the adapter 30 accommodates a terminal unit 38 and the controller 35. Lead wires 34 extend from the terminal unit 38 through the controller 35 to the motor 25 and other components for electrical connection. The terminal unit 38 includes positive and negative power terminals 38*b* and 38*c*, a signal terminal 38*d*, and a terminal base 38*a*. The terminal base 38*a* includes the three terminals, or the positive and negative power terminals 38*b* and 38*c* and the signal terminal 38*d*, which are molded with resin. The controller 35 includes a shallow and substantially rectangular case and a control board accommodated in the case and molded with resin. The controller 35 is placed in the adapter 30 with its longitudinal direction aligned with the longitudinal direction of the adapter 30.

As shown in FIG. 32, the controller 35 includes a control circuit and a power circuit for mainly controlling the motor 25. The controller 35 incorporates the control circuit, a drive circuit, an automatic stop circuit, and other circuits. The control circuit includes a microcomputer that transmits a control signal based on positional information about the rotor 25*c* detected by the sensor board 25*d*. The drive circuit includes a field-effect transistor (FET) that switches a current flowing through the motor 25 in response to the control signal received from the control circuit. The automatic stop circuit cuts power supply to the motor 25 to prevent overcharge or overcharge based on the detected status of the battery 40.

As shown in FIGS. 20 to 23, the battery 40 is box-shaped, and is, for example, a lithium-ion battery with an output of 18 V. The battery 40 detached from the battery holder 32 is rechargeable with a separately prepared charger. The battery 40 can be used to power a screwing machine, an electric drill, and other rechargeable power tools.

As shown in FIGS. 20 to 23, the battery 40 includes a pair of rails 40c and connector terminals 40d. The two rails 40c extend parallel to each other in the longitudinal direction of the battery 40. To attach or detach the battery 40 to or from the battery holder 32, the rails 40c in the battery 40 are slid along the rails 32a in the battery holder 32 in the direction indicated by a solid-white arrow in the figures. The connector terminals 40d are located in an area between the rails 40c. When the battery 40 is installed in the battery holder 32, the connector terminals 40d are electrically connected to the positive and negative power terminals 38b and 38c and the signal terminal 38d in the battery holder 32 shown in FIG. 23. This electrically connects the battery 40 to the controller 35 and the terminal unit 38, and then to the motor 25 or other components.

As shown in FIGS. 20 to 23, the battery 40 includes a disengagement button 40a and the engagement tab 40b. The engagement tab 40b protrudes toward the battery holder 32, and is urged by an urging member (not shown) in the protruding direction. The disengagement button 40a is located on a side surface of the battery 40. Pressing the disengagement button 40a retracts the engagement tab 40b into the battery 40 against the urging force applied from the urging member.

When the battery 40 is installed in the battery holder 32, the urging force from the urging member readily causes the engagement tab 40b to be engaged with the engagement recess 32b. The battery 40 is thus held by the battery holder 32. With the engagement tab 40b engaged with the engagement recess 32b, the disengagement button 40a is pressed. This disengages the engagement tab 40b from the engagement recess 32b, thus detaching the battery 40 from the battery holder 32.

Figure 24:
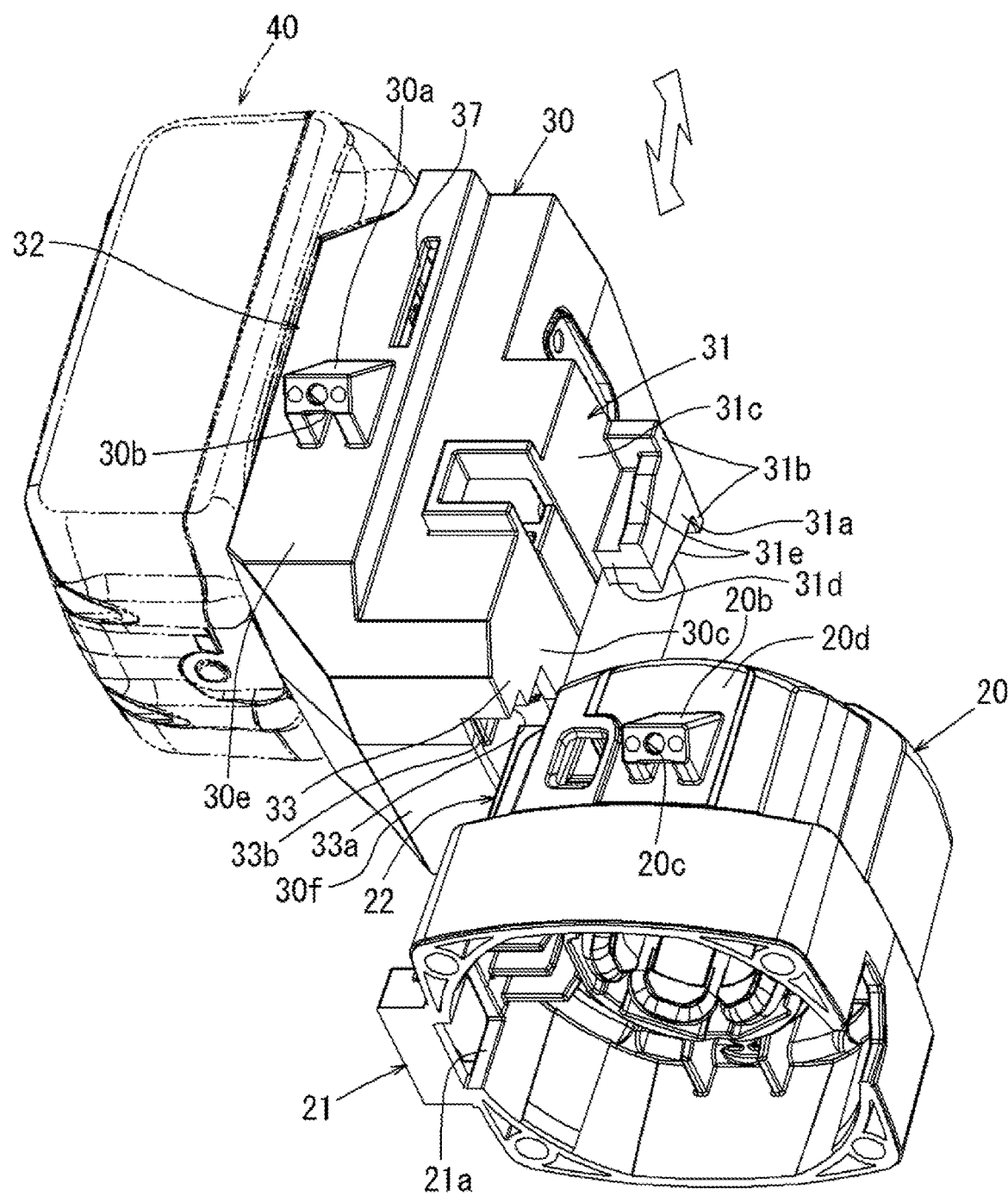
FIG. 24 is a perspective view of a motor housing and the adapter currently being attached to and detached from the motor housing as viewed from inside.
Figure 25:
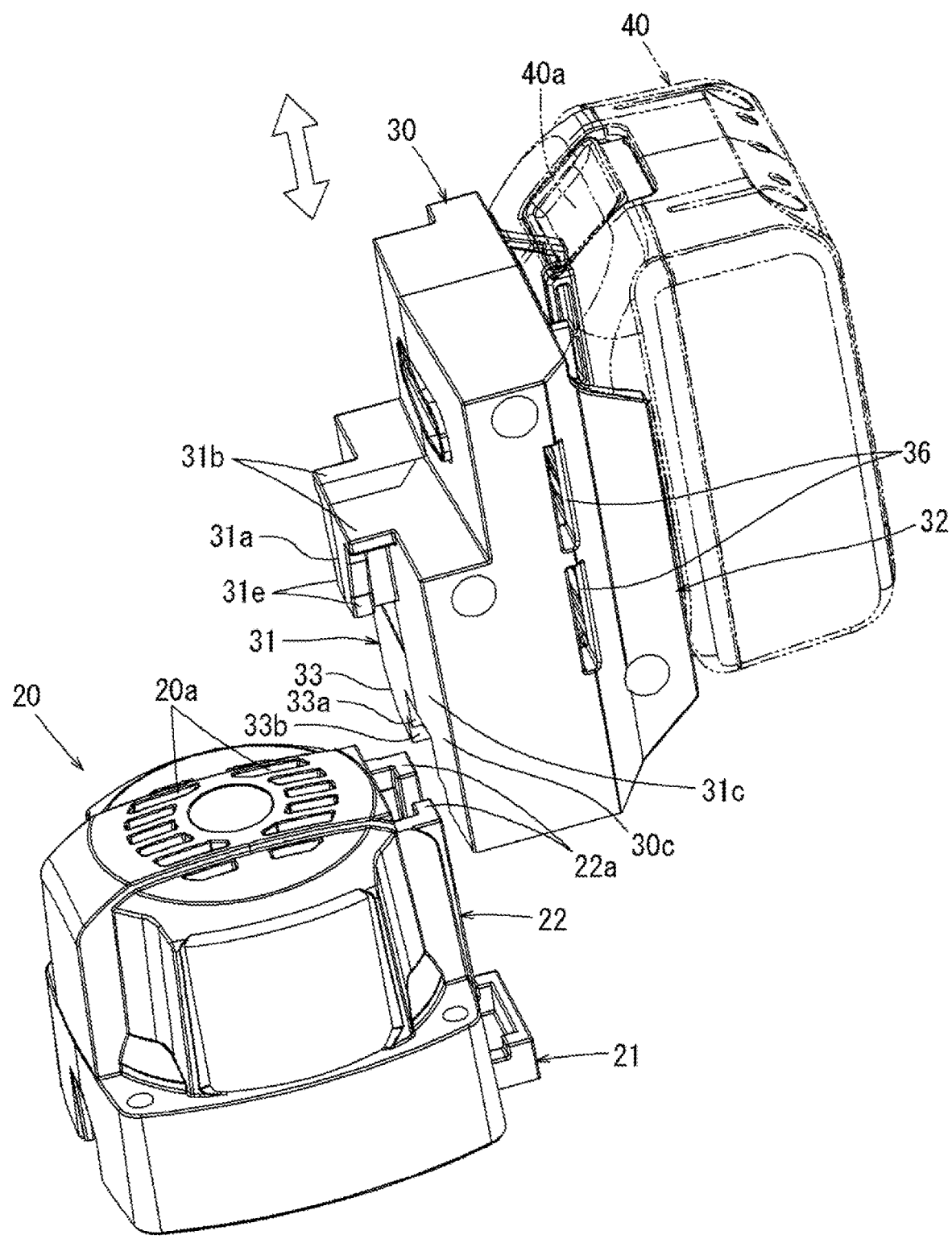
FIG. 25 is a perspective view of the motor housing and the adapter currently being attached to and detached from the motor housing as viewed from outside.

As shown in FIGS. 24 and 25, a positioning unit 22 is located at the rear of the motor housing 20. The positioning unit 22 positions the adapter 30 with respect to the motor housing 20. The positioning unit 22 includes a pair of right and left rails 22a and a blocking part (first ventilation part) 21. The rails 22a extend parallel to the axial direction of the substantially cylindrical motor housing 20. As shown in FIG. 29, the blocking part 21 is located at the lower left when the motor housing 20 is attached to the right handle part 46.

As shown in FIG. 25, the blocking part 21 has a substantially box-shape extending rearward from the positioning unit 22. The adapter 30 is slid onto the motor housing 20 along the rails 22a to allow the blocking part 21 to be fitted into the second ventilation hole 33a. The standing portion 31d of the adapter 30 and the rails 22a in the motor housing 20 are not press-fitted with an interference, but are loosely fitted with a small clearance. This allows quick manual assembly. As shown in FIG. 24, the blocking part 21 has a substantially rectangular first ventilation hole 21a that allows passage into and out of the motor housing 20. As shown in FIG. 32, the first ventilation hole 21a is located on the radial extension of the motor fan 26 and opens toward the motor fan 26.

Figure 26:
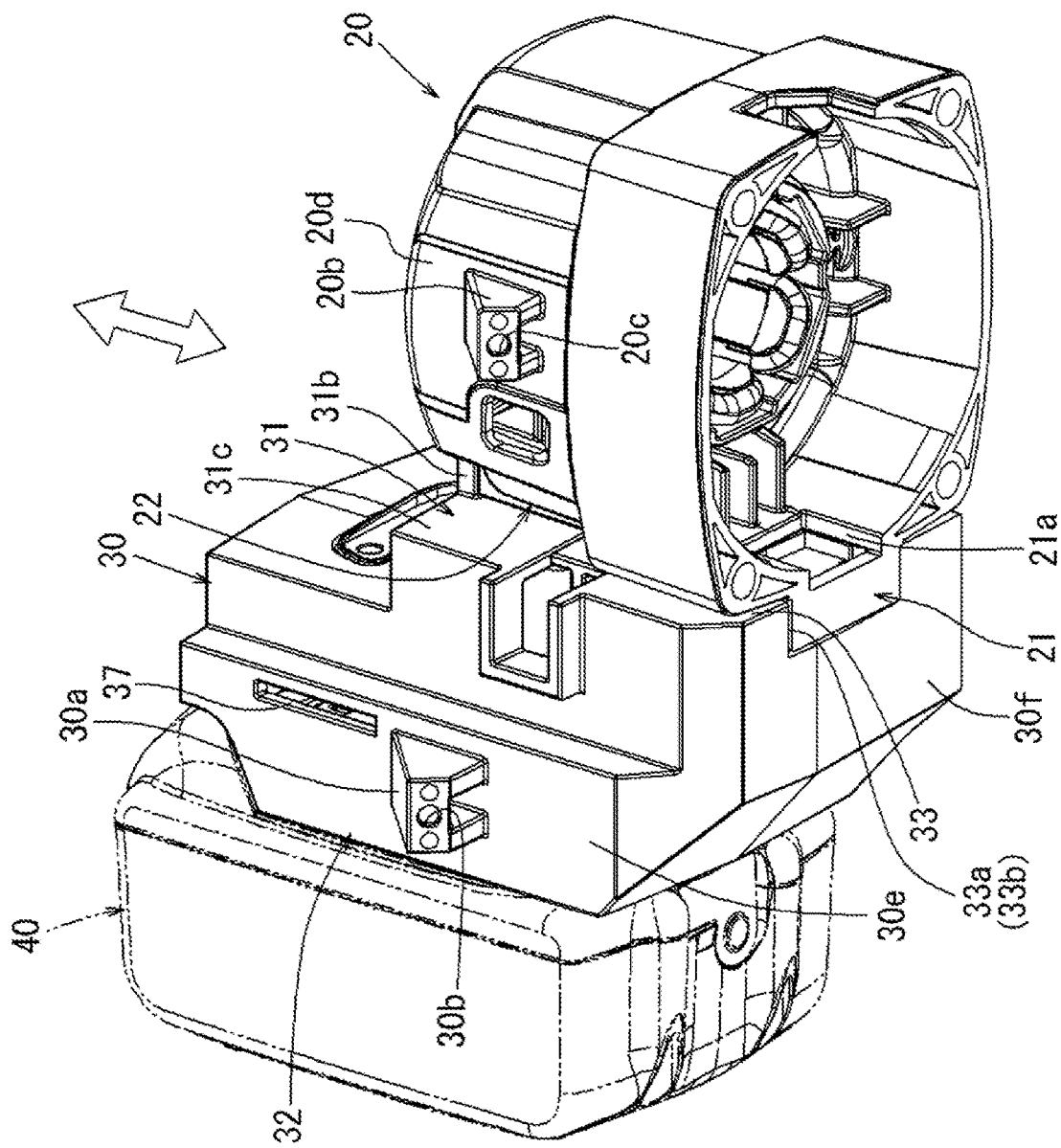
FIG. 26 is a perspective view of the motor housing and the adapter as viewed from inside.
Figure 27:
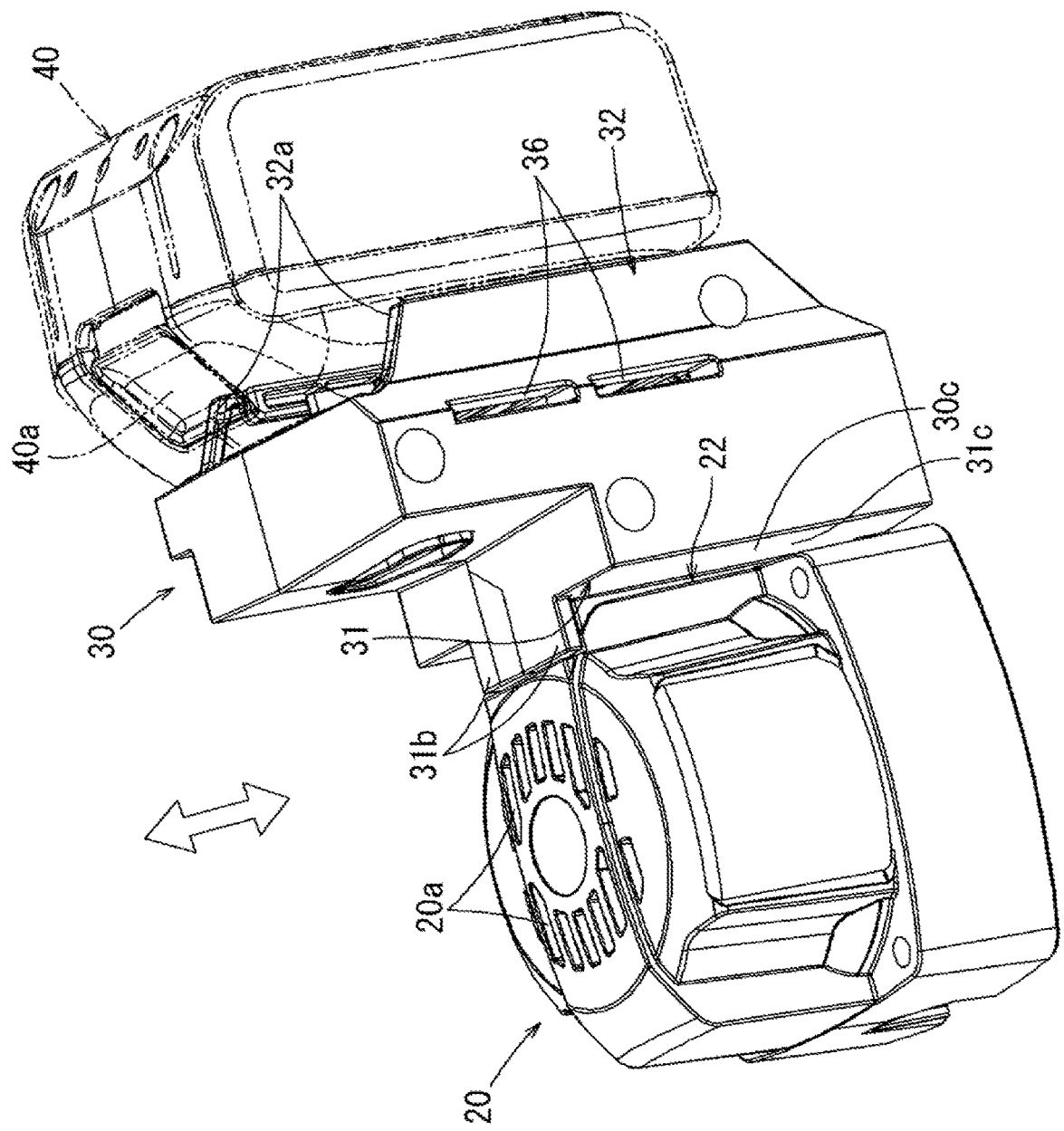
FIG. 27 is a perspective view of the motor housing and the adapter as viewed from outside.

As shown in FIGS. 24 and 26, the motor housing 20 has a side surface 20d on the left when the motor housing 20 is attached to the cutting machine body 10. The side surface 20d has a protrusion 20b protruding as a substantially triangular prism. The protrusion 20b has a screw hole 20c. As shown in FIG. 29, when attached to the right handle part 46, the motor housing 20 has the screw hole 20c extending horizontally.

As shown in FIGS. 24 to 27, the rail 31a in the adapter 30 is slid along the rails 22a in the motor housing 20 in the direction indicated by a solid-white arrow in the figures. This allows the adapter 30 to be attached to or detached from the positioning unit 22 in the longitudinal direction of the motor housing 20. When the adapter 30 is attached to the positioning unit 22 along the motor housing 20, the blocking part 21 is fitted into a cutout 33b at the inlet of the ventilation part 33. This allows the first ventilation hole 21a to communicate with the second ventilation hole 33a. The blocking part 21 fitted in the cutout 33b positions the adapter 30 with respect to the motor housing 20.

When the motor fan 26 rotates, motor cooling air is drawn into the motor housing 20 through the inlet 20a as indicated by an arrow in FIG. 32. The motor cooling air then flows toward the motor fan 26 along the motor shaft 25a. The motor fan 26 radially blows the motor cooling air. The motor cooling air flows into the adapter 30 through the first ventilation hole 21a and the second ventilation hole 33a. The motor cooling air thus cools the controller 35 and the terminal unit 38 accommodated in the adapter 30. The motor cooling air then diverges and exits through a right exhaust air window 36 and a left exhaust air window 37.

Figure 28:
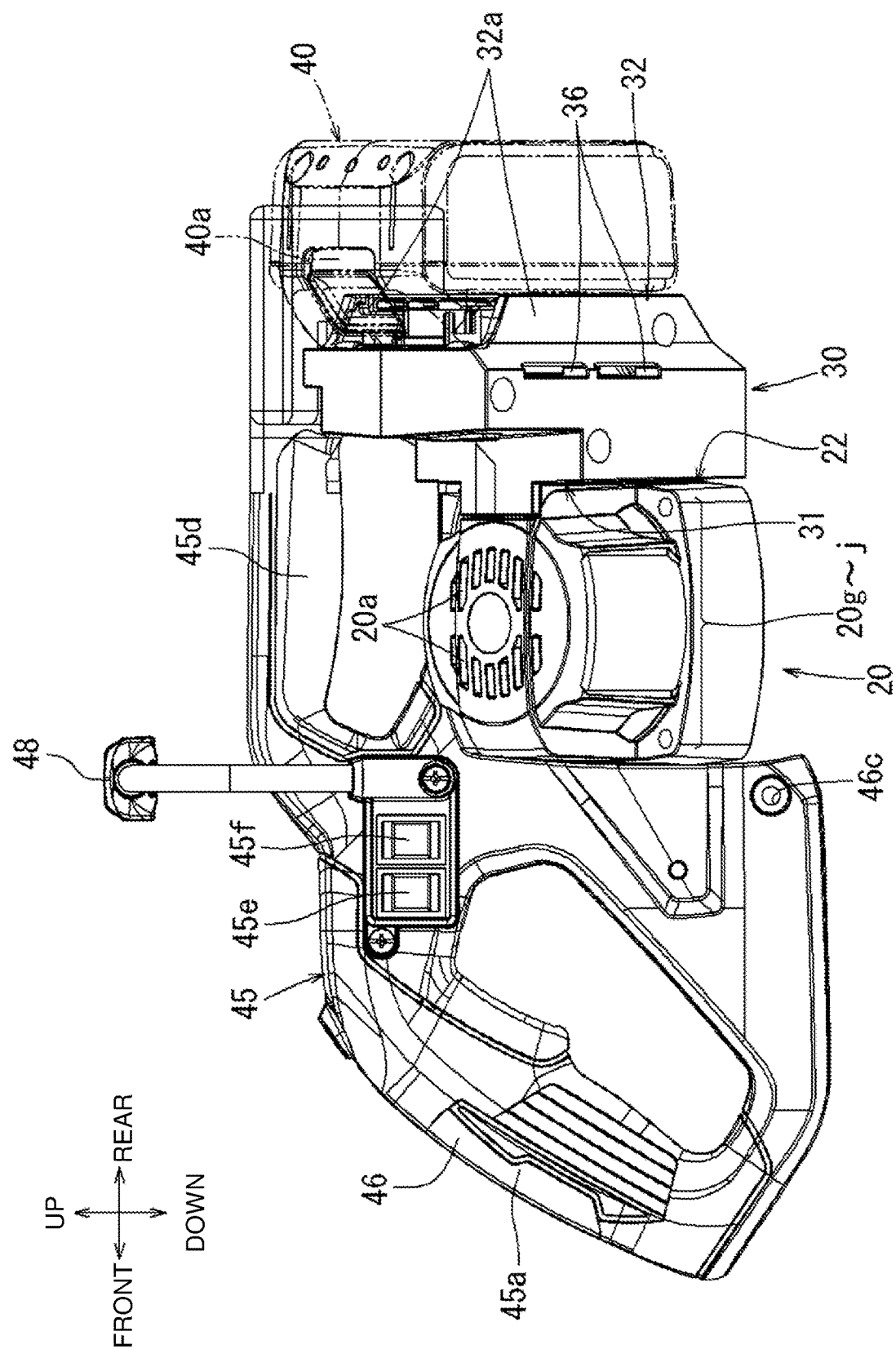
FIG. 28 is a right side view of a right handle part with the motor housing and the adapter attached.

As shown in FIGS. 28 and 29, the motor housing 20 and the adapter 30 are attachable to the right handle part 46. The right handle part 46 has fitting holes 46a and 46b. The fitting hole 46a is a substantially rectangular hole elongated in the front-rear direction to receive the protrusion 20b on the motor housing 20. The fitting hole 46b is a substantially rectangular hole elongated in the front-rear direction to receive the body holder 30a on the adapter 30. When the motor housing 20 and the adapter 30 are attached to the right handle part 46, the protrusion 20b on the motor housing 20 is fitted into the fitting hole 46a, and the body holder 30a on the adapter 30 is fitted into the fitting hole 46b. This positions the motor housing 20 and the adapter 30 with respect to the right handle part 46.

As shown in FIGS. 28 and 29, the left handle part 47 is joined together and aligned with the right handle part 46 with the protrusion 20b in the fitting hole 46a in the right handle part 46 and the body holder 30a on the adapter 30 in the fitting hole 46b in the right handle part 46. The screw hole 20c in the protrusion 20b then receives a fastening screw 20e (not shown) for fastening the motor housing 20, the right handle part 46, and the left handle part 47. The screw hole 30b in the body holder 30a then receives a fastening screw 30g for fastening the adapter 30, the right handle part 46, and the left handle part 47. This integrates the four components, namely, the motor housing 20, the adapter 30, the right handle part 46, and the left handle part 47 together. The screw holes 20c and 30b are substantially parallel to each other when the motor housing 20 and the adapter 30 are combined together. The two screws placed through the screw holes 20c and 30b are thus parallel to each other. In this manner, the four components can be quickly integrated together.

Figure 31:
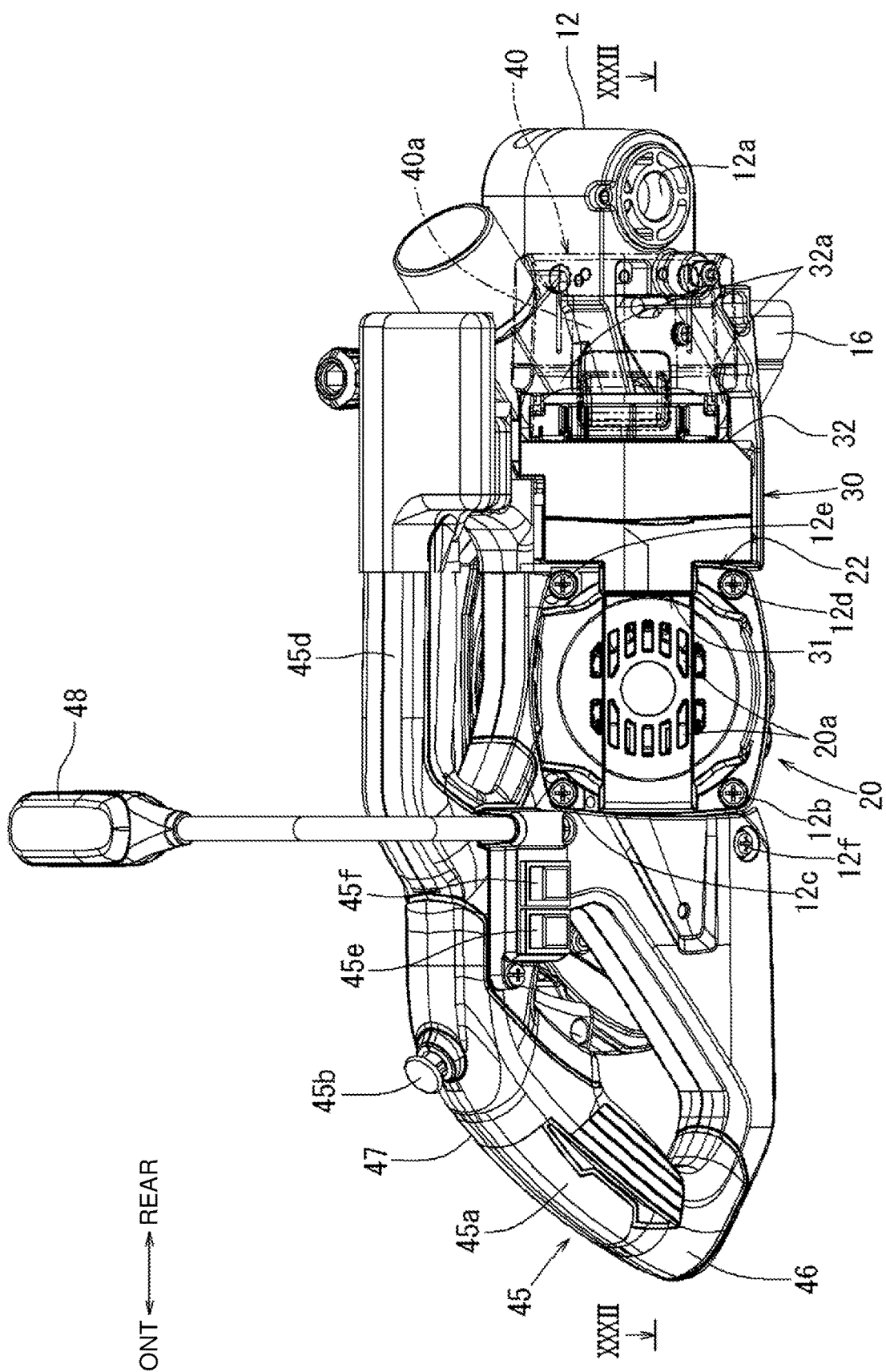
FIG. 31 is a perspective view of FIG. 30 as viewed in the longitudinal direction of the motor housing.

The integrated four components are attachable to the stationary cover 12 with screws. As shown in FIGS. 28, 29, and 31, four fastening screws 12*b* to 12*e* for fastening the motor housing 20 and the stationary cover 12 are first placed through four through-holes 20*g* to 20*j* open at the four corners of the motor housing 20, and are fastened to the stationary cover 12. The four through-holes 20*g* to 20*j* are parallel to the motor 25. Then, a fastening screw 12*f* for fastening the right handle part 46 and the stationary cover 12 is placed through a through-hole 46*c* in the right handle part 46 open at right angles to the cutting blade 11, and is screwed onto the stationary cover 12.

Figure 33:
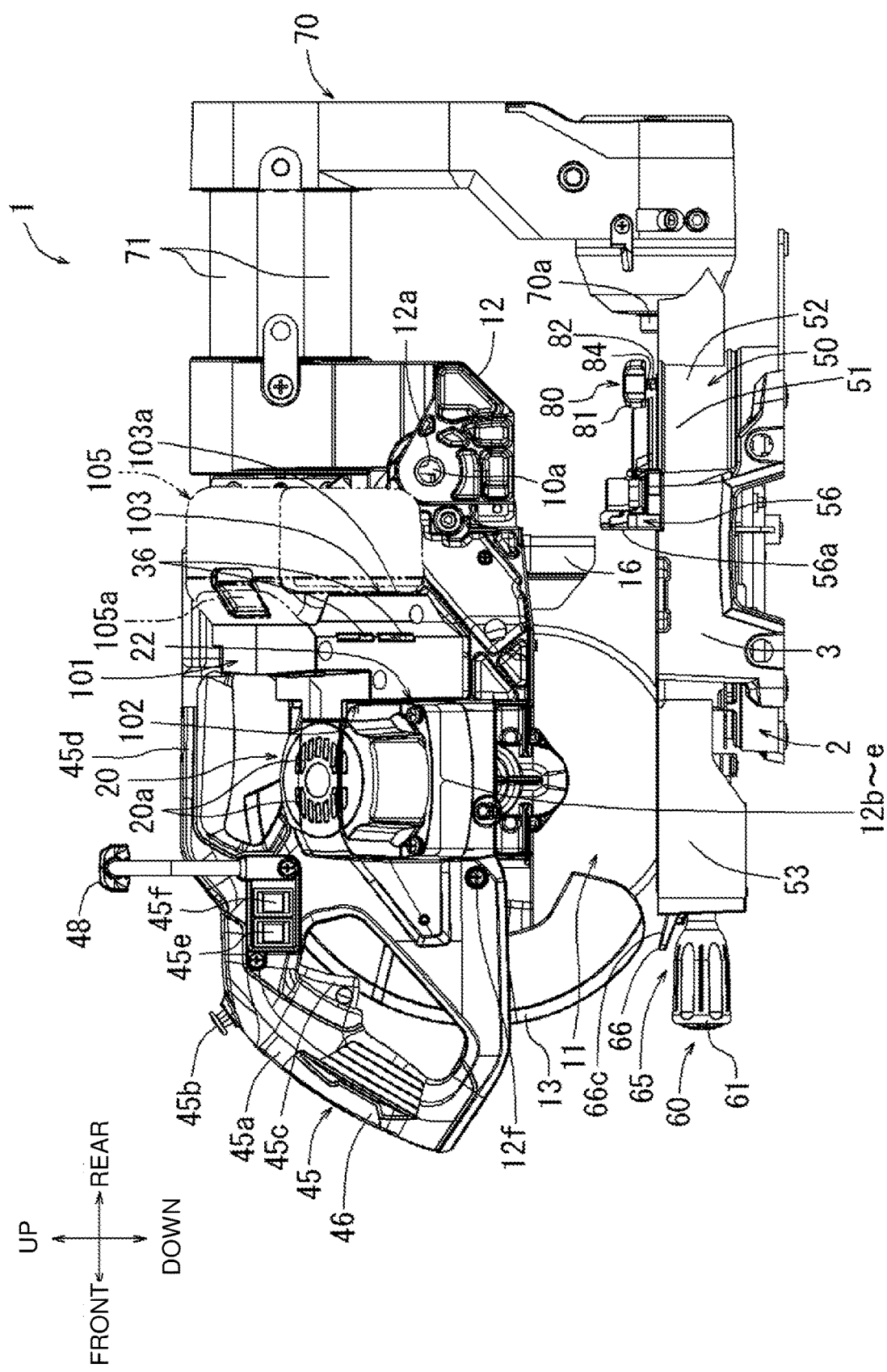
FIG. 33 is a right side view of the cutting machine with a second adapter attached.
Figure 34:
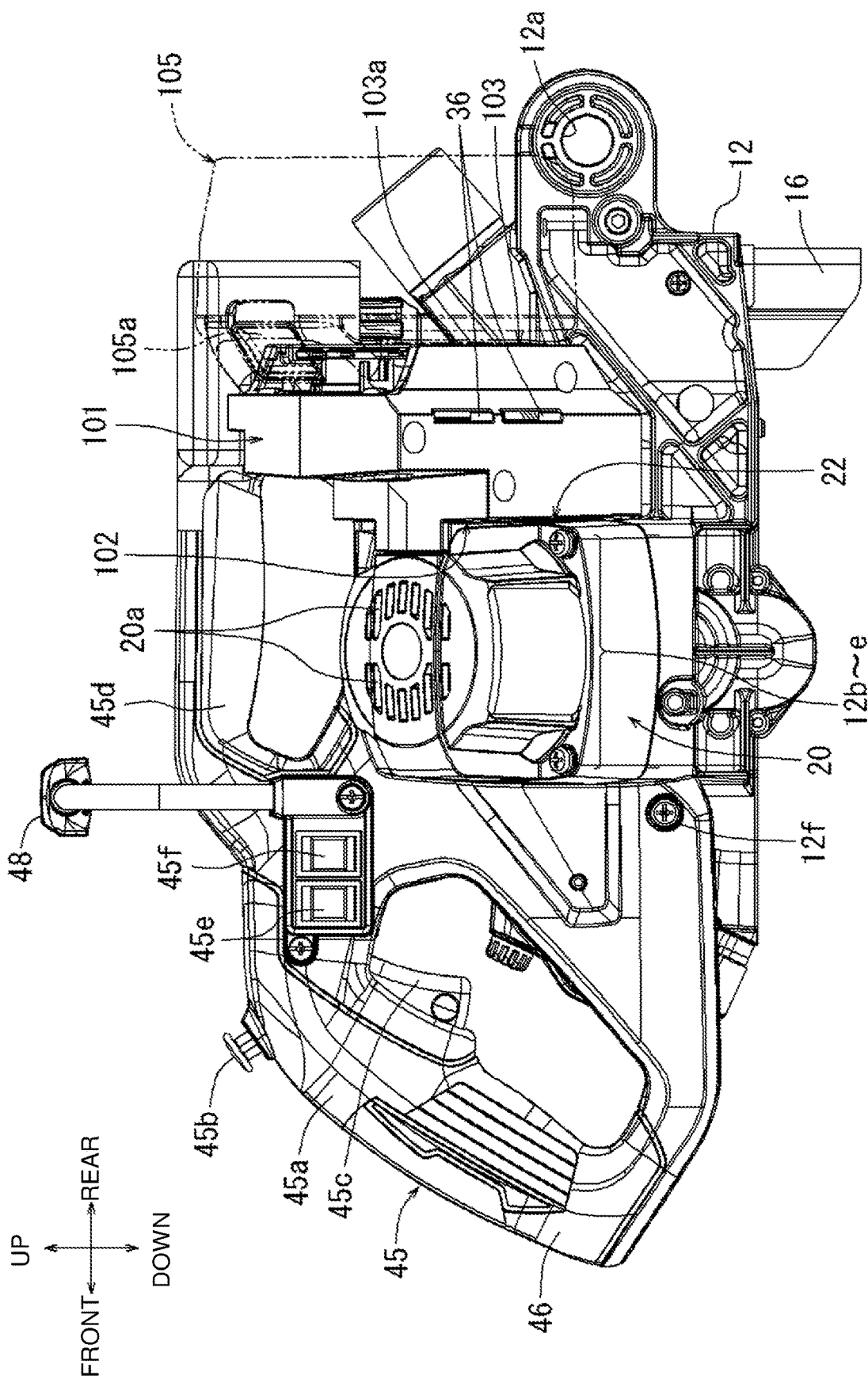
FIG. 34 is a right side view of the handle with the motor housing, the second adapter, and the stationary cover attached.

As shown in FIGS. 33 and 34, the positioning unit 22 in the motor housing 20 may receive an adapter (second adapter) 101 in place of the adapter (first adapter) 30. The adapter 101 is attachable to the positioning unit 22, and includes a positioning unit 102 having the same structure as the positioning unit 31.

As shown in FIGS. 33 and 34, the adapter 101 includes a battery holder 103 in place of the battery holder 32 in the adapter 30. The battery holder (second battery holder) 103 includes a rail 103*a* extending in the longitudinal direction of the adapter 101. The battery holder 103 receives a removable battery (second battery) 105 shaped differently from the battery (first battery) 40. The battery 105 is box-shaped, and may be a lithium-ion battery with an output of 36 V. The battery 105 detached from the battery holder 103 is rechargeable with a separately prepared charger. The adapter 101 includes a body holder 30*a* with the same shape as the body holder 30*a* of the adapter 30.

Figure 35:
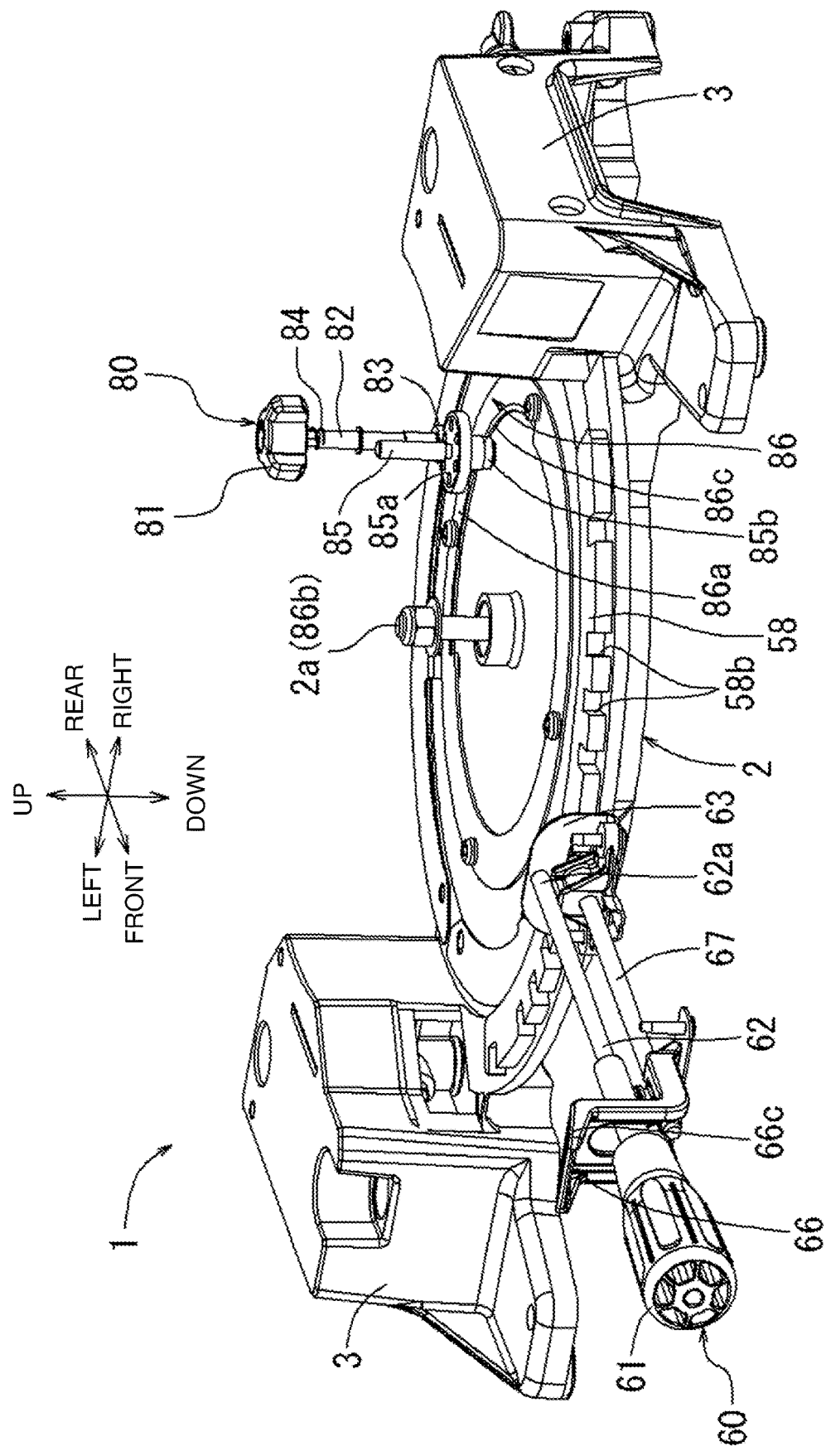
FIG. 35 is a perspective view of a base and a fine angle adjuster.
Figure 36:
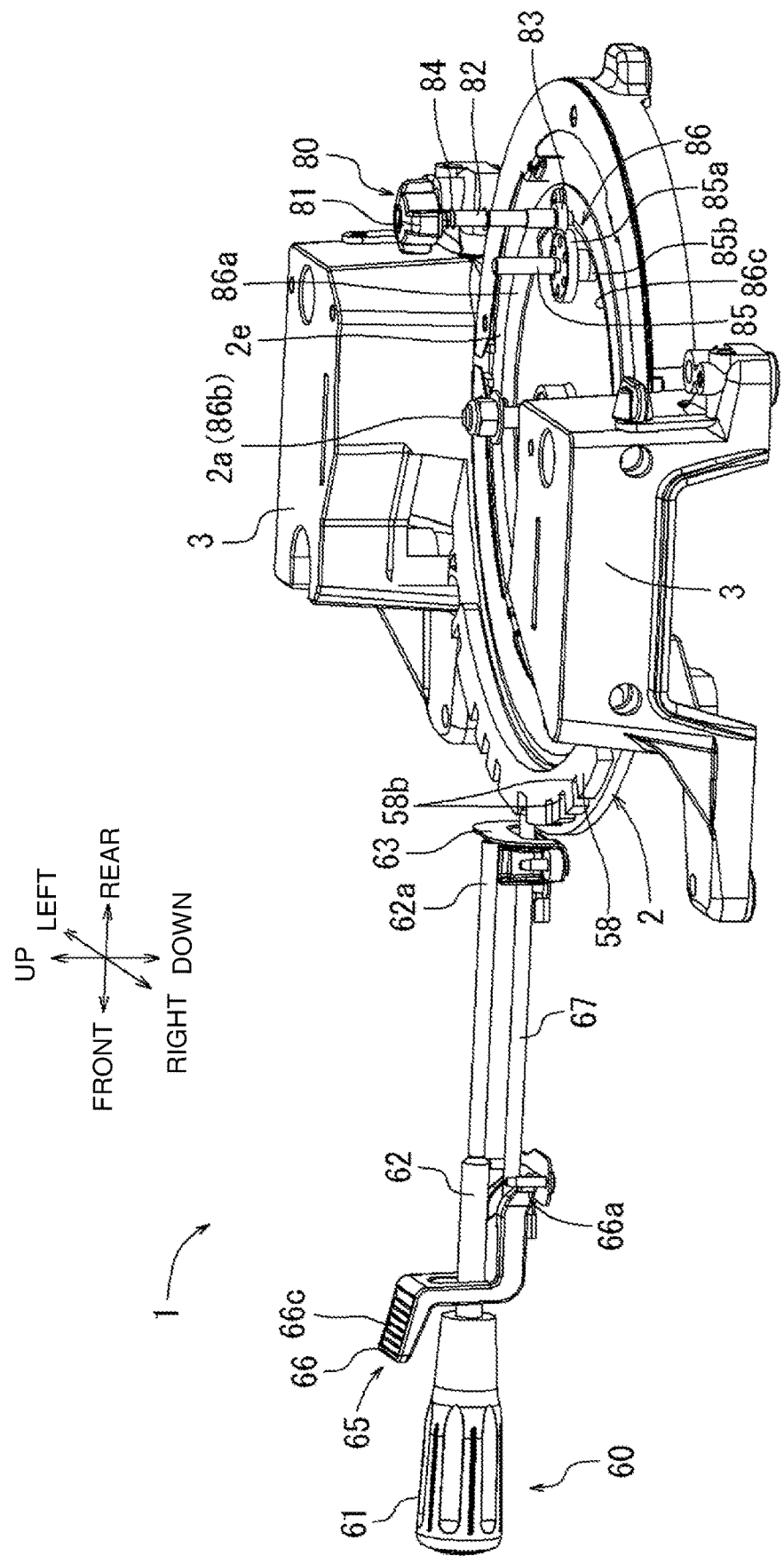
FIG. 36 is a perspective view of the base and the fine angle adjuster.

As shown in FIGS. 35 and 36, the cutting machine 1 may further include a fine angle adjuster 80 that adjusts the rotation angle of the turntable 50 with respect to the base 2.

As shown in FIGS. 35 and 36, the fine angle adjuster 80 is located in the rear area of the base 2 and the turntable 50. The fine angle adjuster 80 includes an operation part 81, a reduction shaft 85, and a rack 86. The rack 86 extends along an inner peripheral wall 2*e* of the base 2. The inner peripheral wall 2*e* is located inward from the outer peripheral table wall 52 of the turntable 50 and nearer the rotation support shaft 2*a* than the outer peripheral table wall 52 of the turntable 50. The inner peripheral wall 2*e* extends vertically (perpendicularly) and faces the rotation support shaft 2*a*. The inner peripheral wall 2*e* is arc-shaped, with the rotation support shaft 2*a* at the center in a plan view. Throughout the drawings of the present application, the teeth of the racks and pinions are not shown.

As shown in FIGS. 35 and 36, the rack 86 includes a rack body 86*a* and a plurality of teeth 86*c*. The rack body 86*a* is arc-shaped, with the rotation support shaft 2*a* as an arc center axis 86*b*. The teeth 86*c* are arranged at circumferentially predetermined intervals on the inner peripheral surface of the rack body 86*a*. The teeth 86*c* protrude from the rack body 86*a* toward the radial center. The teeth 86*c* define tooth grooves between them. The teeth 86*c* extend vertically (perpendicularly).

As shown in FIGS. 12 and 35 to 37, a rotational shaft 82 includes the operation part 81 on its upper end and a first pinion 83 on its lower end. The operation part 81 is located above the upper surface of the turntable 50 and is operable by the user. The operation part 81 is located behind the positioning fence 56, inward from the outer peripheral table wall 52 of the turntable 50, and nearer the rotation support shaft 2*a* than the outer peripheral table wall 52 of the turntable 50. The operation part 81 is integral with the rotational shaft 82. The rotational shaft 82 is supported on the turntable 50 in a manner rotatable about the axis. The rotational shaft 82 has, in its lower portion, the first pinion 83 coaxial with the rotational shaft 82. The first pinion 83 has tooth grooves extending vertically. When the operation part 81 is rotated about the rotational shaft 82, the rotational shaft 82 and the first pinion 83 rotate integrally with the operation part 81.

Figure 37:
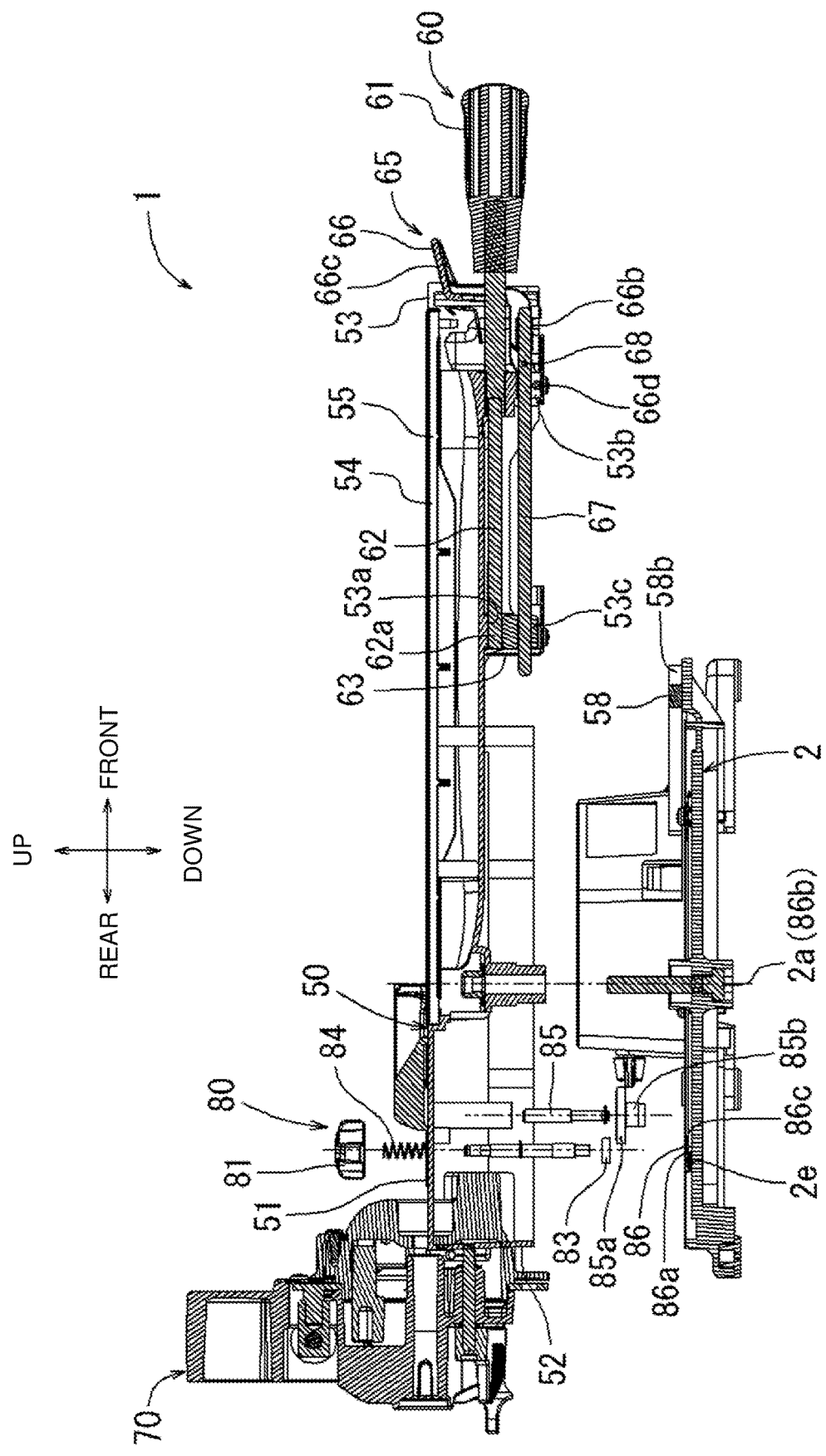
FIG. 37 is an enlarged partial view of area XIII in FIG. 12 in the exploded fine angle adjuster.

As shown in FIGS. 12 and 37, a compression spring 84 for urging the operation part 81 upward is located between the lower end of the operation part 81 and the upper surface of the turntable 50. When the operation part 81 is urged upward, the rotational shaft 82 and the first pinion 83 are also urged upward. The first pinion 83 thus moves to a release position to be disengaged from a pinion engagement gear 85*a* of the reduction shaft 85. At the release position, the first pinion 83 engaged with the rack 86 through the pinion engagement gear 85*a* and a second pinion 85*b* is disengaged from the rack 86. When the operation part 81 is moved downward against the urging force, the rotational shaft 82 and the first pinion 83 are also moved downward. The first pinion 83 thus moves to an engagement position to be engaged with the pinion engagement gear 85*a* of the reduction shaft 85. At the engagement position, the first pinion 83 is engaged with the rack 86 indirectly through the pinion engagement gear 85*a* and the second pinion 85*b*.

As shown in FIGS. 12 and 35 to 37, the reduction shaft (reduction mechanism) 85 is press-fitted in and supported on the turntable 50 in a nonrotatable manner. The reduction shaft 85 extends vertically and parallel to the rotational shaft 82 to which the first pinion 83 is attached. The reduction shaft 85 has, in its lower portion, the second pinion 85*b* coaxial with the reduction shaft 85 inserted in a loose manner. The second pinion 85*b* is thus rotatable about the reduction shaft 85. The second pinion 85*b* is engaged with the rack 86. The pinion engagement gear 85*a* is located above the second pinion 85*b* and is coaxial with the reduction shaft 85. The pinion engagement gear 85*a* is engaged with the first pinion 83 in a disengageable manner. The reduction shaft 85 is thus placed between the first pinion 83 and the rack 86.

As shown in FIGS. 35 and 36, the operation part 81 is pressed downward and rotated against the urging force applied from the compression spring 84. This allows the first pinion 83 to be engaged with the pinion engagement gear 85*a*. The rotational speed of the operation part 81 is reduced by the engagement of the first pinion 83 with the pinion engagement gear 85*a*, before the rotation is transmitted. The rotational speed of the pinion engagement gear 85*a* is reduced by the engagement of the second pinion 85*b* with the rack 86, before the rotation is transmitted. The first pinion 83 rotates and moves relatively along the rack 86. This rotates the turntable 50 with respect to the base 2 about the rotation support shaft 2*a*. Thus, the rotating position of the turntable 50 can be adjusted finely.

When the turntable 50 is rotated to an intended angle with respect to the base 2, the user releases the force applied to the operation part 81. The operation part 81 thus moves upward under the urging force applied from the compression spring 84. The first pinion 83 then readily moves to the upper release position. Although the operation part 81 rotates unexpectedly, this structure prevents the turntable 50 from rotating with respect to the base 2.

As shown in FIGS. 1, 12, and 35, the cutting machine 1 includes the base 2, the turntable 50, and the cutting machine body 10. The turntable 50 is rotatable horizontally to the base 2. The cutting machine body 10 is located above the turntable 50 and connected in a manner swingable vertically to the turntable 50. The turntable 50 includes the table body 51, which is substantially disk-shaped, and the table extension 53. The table body 51 receives a workpiece. The table extension 53 protrudes forward from the table body 51. The cutting machine 1 includes the fine angle adjuster 80 that accurately adjusts a small degree of rotation angle of the turntable 50 with respect to the base 2 with an easy operation. The fine angle adjuster 80 includes the rack 86 located on the base 2, the first pinion 83, and the operation part 81. The first pinion 83 is located in the table body 51 within the area of the table body 51 as viewed from above. The first pinion 83 is engaged with the rack 86 indirectly. The operation part 81 is gripped by the user and operable to rotate the first pinion 83.

The first pinion 83 is located in the table body 51, or more specifically located near the rotation support shaft 2a serving as the rotation center of the turntable 50. The operation part 81 for rotating the first pinion 83 is also located near the rotation support shaft 2a. The operation part 81 thus moves a relatively short distance with the rotation of the turntable 50 to remain within a small area. The operation part 81 is thus easy to operate. The rack 86 is located on the inner peripheral wall 2e of the base 2. The base 2 deforms less over time than the turntable 50 that deforms when receiving a workpiece. The rack 86 thus has higher durability than a rack located on the turntable 50.

As shown in FIG. 35, the first pinion 83 and the operation part 81 are integral with each other through the rotational shaft 82 to rotate integrally. The pinion engagement gear 85a and the second pinion 85b are integral with each other through the reduction shaft 85 to rotate integrally. The first pinion 83 moved to the engagement position is engaged with the pinion engagement gear 85a. The second pinion 85b is engaged with the rack 86.

When the operation part 81 is rotated while the first pinion 83 is at the engagement position, the operation force applied through the operation part 81 is transmitted at a speed reduced by the first pinion 83 and the pinion engagement gear 85a engaged with each other. The rotational speed of the pinion engagement gear 85a is reduced by the second pinion 85b and the rack 86 engaged with each other, before the rotation is transmitted. Thus, the rotating position of the turntable 50 with respect to the base 2 can be adjusted finely. The fine angle adjuster 80 has a simpler structure, and thus can be manufactured at lower cost. The first pinion 83 can be operated through the operation part 81 with a relatively small force.

As shown in FIG. 12, the first pinion 83 is movable between the engagement position and the release position in the table body 51. At the engagement position, the first pinion 83 is engaged with the rack 86 in the extending direction of the rotational shaft 82. At the release position, the first pinion 83 is disengaged from the rack 86. When the first pinion 83 is at the release position, the turntable 50 can be rotated without operating the fine angle adjuster 80. The turntable 50 can thus be rotated greatly. When the first pinion 83 is at the engagement position, the position of the turntable 50 can be finely adjusted with the fine angle adjuster 80. The first pinion 83 moves between the engagement position and the release position linearly, thus easily enabling and disabling the transmission of the operation force to the rack 86.

As shown in FIGS. 12 and 35, the rack 86 includes the arc-shaped rack body 86a and the plurality of teeth 86c. The teeth 86c protrude from the rack body 86a toward the radial center of the arc and arranged along the rack body 86a. The first pinion 83 is located in the table body 51 to have its rotation axis parallel to the arc center axis 86b of the rack body 86a. More specifically, the rotation axis of the first pinion 83 is parallel to the rotation axis of the rack 86. This increases the transmission efficiency of the operation force from the first pinion 83 to the rack 86, and thus allows the turntable 50 to rotate in a smoother manner. The tooth grooves on the first pinion 83 are parallel to the tooth grooves on the rack 86. The first pinion 83 is thus easily moved along the rotation axis between the engagement position and the release position.

As shown in FIGS. 12 and 37, the cutting machine 1 includes the compression spring 84 for urging the first pinion 83 from the engagement position (lower position) toward the release position (upper position). Thus, the first pinion 83 is readily moved to the release position when the turntable 50 is not to be adjusted finely through the operation part 81.

Figure 9:
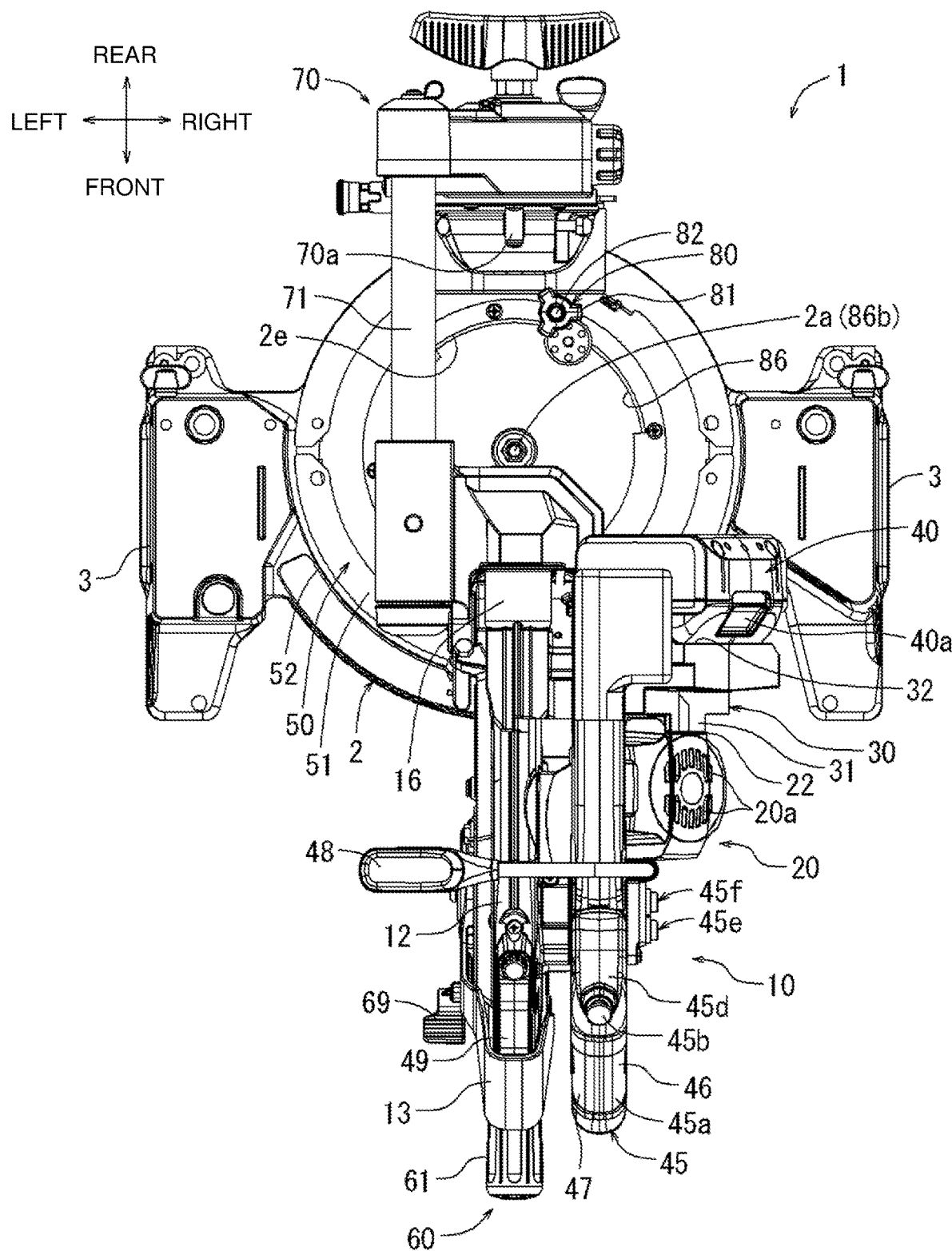
FIG. 9 is a plan view of the cutting machine according to the first embodiment with a turntable removed.

As shown in FIG. 9, the first pinion 83 and the operation part 81 are located in the rear area and on the outer periphery of the table body 51. A workpiece is to be placed in the front area of the turntable 50. The first pinion 83 and the operation part 81 thus do not obstruct the workpiece. The user can easily operate the operation part 81 after placing the workpiece on the turntable 50.

As shown in FIGS. 12 and 35, the reduction shaft (reduction mechanism) 85 is located between the first pinion 83 and the rack 86 to reduce the rotational speed of the first pinion 83 for transmitting the rotation of the first pinion 83 to the rack 86. The rotational speed of the operation part 81 is thus reduced by the reduction shaft 85, before the rotation is transmitted to the rack 86. This allows finer adjustment of the miter angle of the turntable 50 with respect to the base 2. Also, the rack 86 can have a smaller diameter. For example, the structure including the reduction shaft 85 can have the rack 86 with a smaller diameter than the structure that reduces the rotational speed of the turntable 50 with respect to the base 2 by increasing the diameter of the rack 86. The tabletop cutting machine 1 can have a smaller size and can finely adjust the miter angle.

Second Embodiment

A cutting machine (tabletop cutting machine) 110 according to a second embodiment includes a base 112, a turntable 113, and a fine angle adjuster 111 shown in FIGS. 38 to 41, in place of the base 2, the turntable 50, and the fine angle adjuster 80 according to the first embodiment shown in FIGS. 35 to 37.

Figure 38:
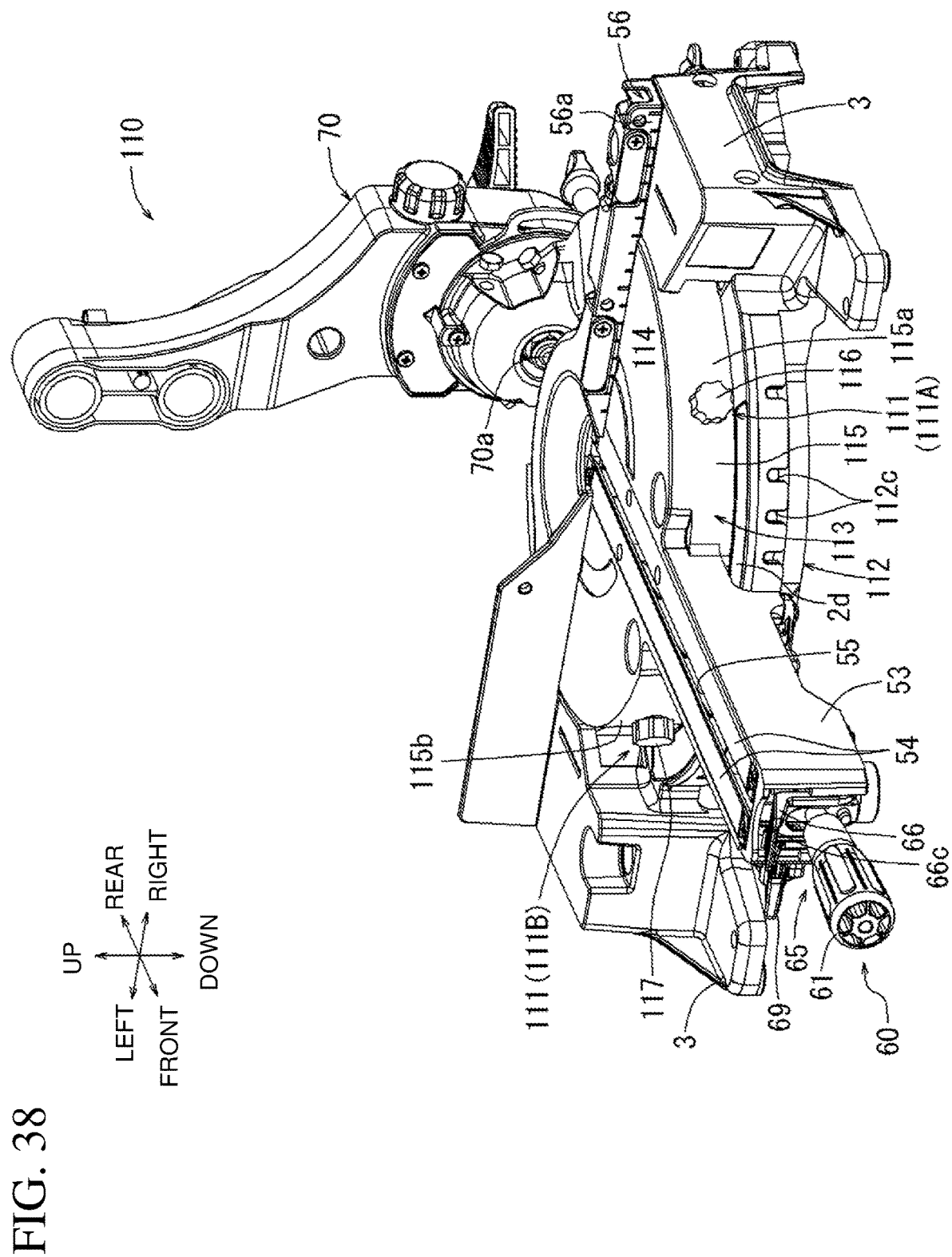
FIG. 38 is a perspective view of a cutting machine according to a second embodiment excluding a cutting machine body.
Figure 41:
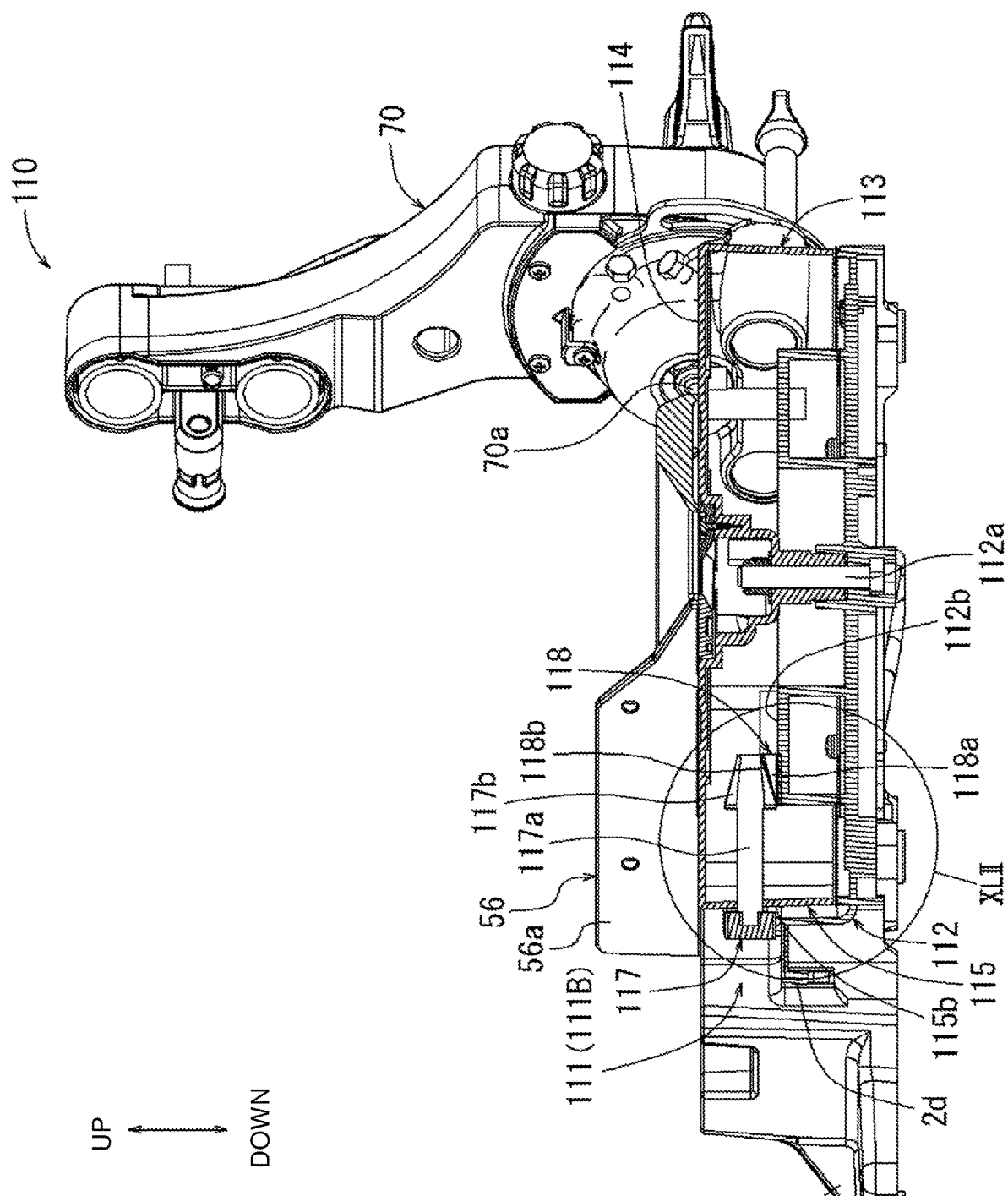
FIG. 41 is a cross-sectional view taken along line XLI-XLI in FIG. 40 with the turntable mounted.

As shown in FIGS. 38 and 41, the turntable 113 included in the cutting machine 110 includes a table body 114, an outer peripheral table wall 115, and a table extension 53. The table body 114 is substantially circular in a plan view, and has its upper surface arranged horizontally. The outer peripheral table wall 115 is substantially cylindrical, and is located on the outer edge of the table body 114 with a rotation support shaft 112a at the center. The outer peripheral table wall 115 includes a right front wall 115a and a left front wall 115b. The right front wall 115a is located rightward from the table extension 53 in the front half area of the circumference. The left front wall 115b is located leftward from the table extension 53.

Figure 39:
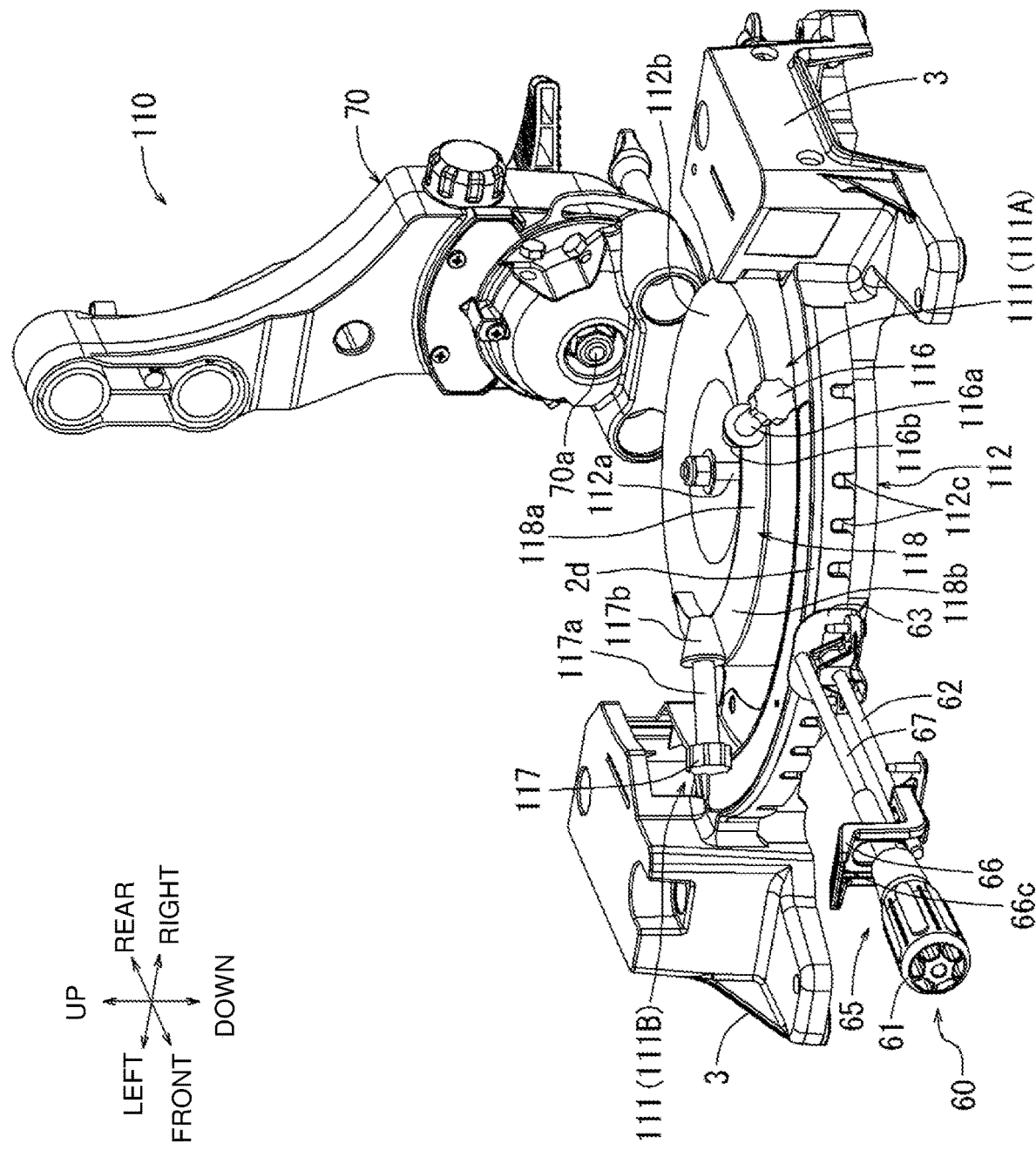
FIG. 39 is a perspective view of the cutting machine according to the second embodiment excluding the cutting machine body and a turntable.
Figure 40:
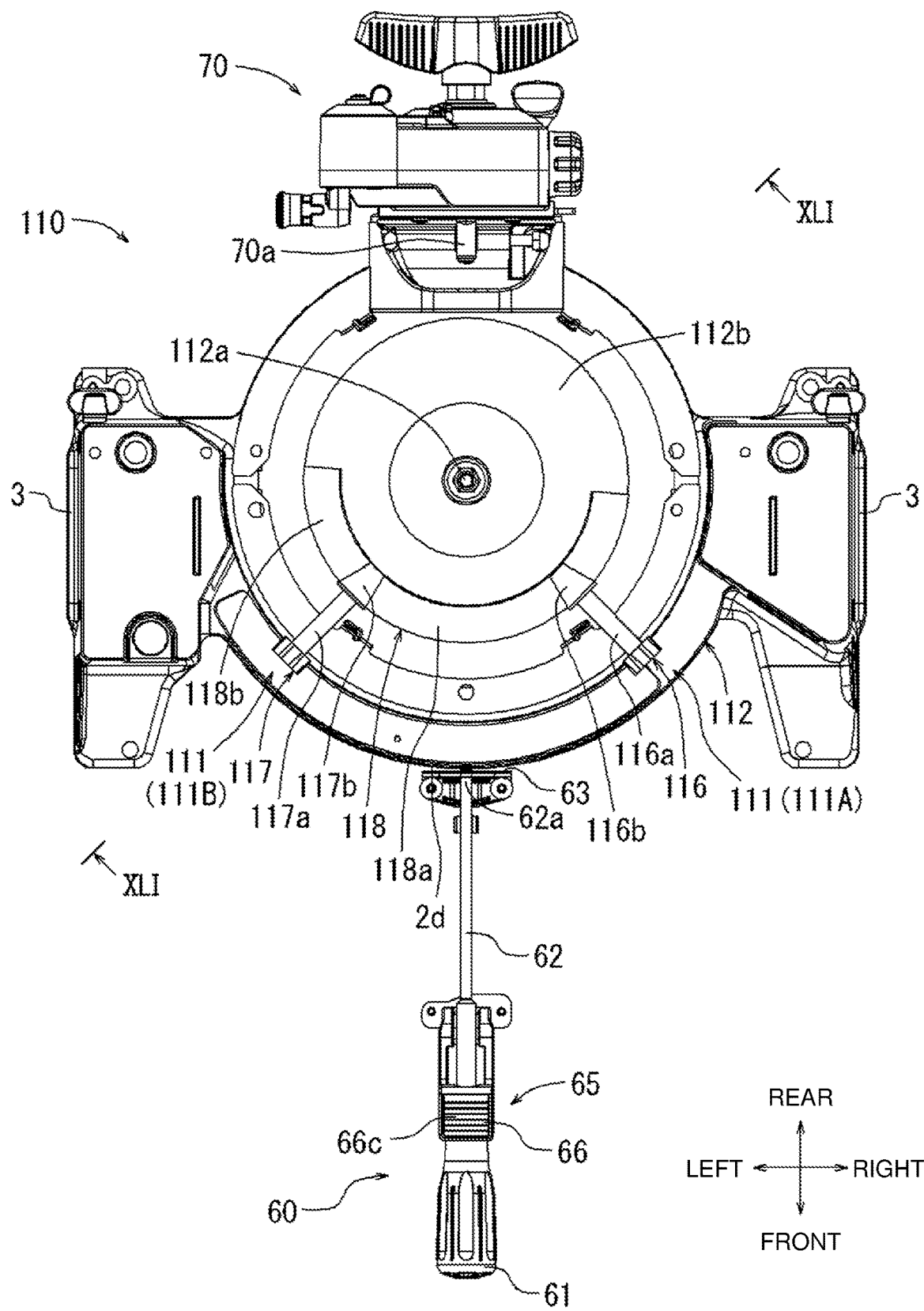
FIG. 40 is a plan view of the cutting machine shown in FIG. 39.

As shown in FIGS. 39 to 41, the base 112 includes a rack support 112b inward from the outer peripheral table wall 115. Positioning recesses 112c to face the positioning pin 67 are directly formed in the base 112. This differs from the structure of the first embodiment having the positioning recesses in the miter scale plate. The rack support 112b is hollow and cylindrical about the rotation support shaft 112a. The rack support 112b has a horizontal upper surface on which a rack 118 is fixed. The rack 118 includes an arc-shaped rack body 118a. The rack body 118a is located in the front area of the rack support 112b with the rotation support shaft 112a at the center. The rack 118 is a bevel gear with a plurality of teeth 118b. The teeth 118b are arranged at circumferentially equal intervals on the upper surface of the rack body 118a. The teeth 118b define tooth grooves between them. The teeth 118b and the tooth grooves extend radially about the rotation support shaft 112a, and incline downward at positions radially more outward from the rotation support shaft 112a.

As shown in FIGS. 38 to 41, the cutting machine 110 includes two fine angle adjusters 111 (111A and 111B) located in the front area of the base 112 and the turntable 113. The fine angle adjuster 111A on the right is located rightward from the table extension 53. The fine angle adjuster 111B on the left is located leftward from the table extension 53. The right fine angle adjuster 111A includes a first operation part 116, a first pinion 116b, and the rack 118.

As shown in FIGS. 38 to 40, the first operation part 116 is located substantially in the middle of the right front wall 115a in the height direction. The first operation part 116 is located at the front of the right front wall 115a and is operable by the user. The first operation part 116 is located at the distal end of a first pinion shaft 116a and is integral with the first pinion shaft 116a. The first pinion shaft 116a extends radially from the rotation support shaft 112a and is arranged horizontally. The first pinion shaft 116a is supported by the right front wall 115a in a manner rotatable about the axis. The first pinion shaft 116a integrally has the first pinion 116b at its basal end. The first pinion 116b is a conical bevel gear coaxial with the first pinion shaft 116a. The first pinion 116b has a smaller diameter toward its end.

As shown in FIGS. 40 and 41, when the first operation part 116 is rotated about the first pinion shaft 116a, the first pinion shaft 116a and the first pinion 116b are rotated integrally with the first operation part 116. The first pinion shaft 116a is supported by the right front wall 115a in a manner horizontally movable in the radial direction about the rotation support shaft 112a. When the first operation part 116 is pressed inward, the first pinion 116b is moved to an engagement position. At the engagement position, the first pinion 116b is engaged with the rack 118. When the first operation part 116 is pulled outward, the first pinion 116b is moved to a release position. At the release position, the first pinion 116b is disengaged from the rack 118. The first operation part 116 is located inward from the outer periphery of the base 112 as viewed from above at both the engagement position and the release position.

As shown in FIGS. 38 to 40, the left fine angle adjuster 111B includes a second operation part 117, a second pinion 117b, and the rack 118. The second operation part 117 is located substantially in the middle of the left front wall 115b in the height direction. The second operation part 117 is located at the front of the left front wall 115b and is operable by the user. The second operation part 117 is located at the distal end of a second pinion shaft 117a and is integral with the second pinion shaft 117a. The second pinion shaft 117a extends radially from the rotation support shaft 112a and is arranged horizontally. The second pinion shaft 117a is supported by the left front wall 115b in a manner rotatable about the axis. The second pinion shaft 117a integrally has the second pinion 117b at its basal end. The second pinion 117b is a conical bevel gear coaxial with the second pinion shaft 117a. The second pinion 117b has a smaller diameter toward its end.

As shown in FIGS. 40 and 41, when the second operation part 117 is rotated about the second pinion shaft 117a, the second pinion shaft 117a and the second pinion 117b are rotated integrally with the second operation part 117. The second pinion shaft 117a is supported by the left front wall 115b in a manner horizontally movable in the radial direction about the rotation support shaft 112a. When the second operation part 117 is pressed inward, the second pinion 117b is moved to an engagement position. At the engagement position, the second pinion 117b is engaged with the rack 118. When the second operation part 117 is pulled outward, the second pinion 117b is moved to a release position. At the release position, the second pinion 117b is disengaged from the rack 118. The second operation part 117 is located inward from the outer periphery of the base 112 as viewed from above at both the engagement position and the release position.

As shown in FIG. 41, the second operation part 117 is rotated while the second pinion 117b is at the engagement position. This rotates the second pinion 117b being engaged with the rack 118, and moves the second pinion 117b circumferentially along the rack 118. The turntable 113 thus rotates about the rotation support shaft 112a. Thus, the rotating position of the turntable 113 can be adjusted finely. The first operation part 116 is operable in the same manner as the second operation part 117.

Third Embodiment

Figure 42:
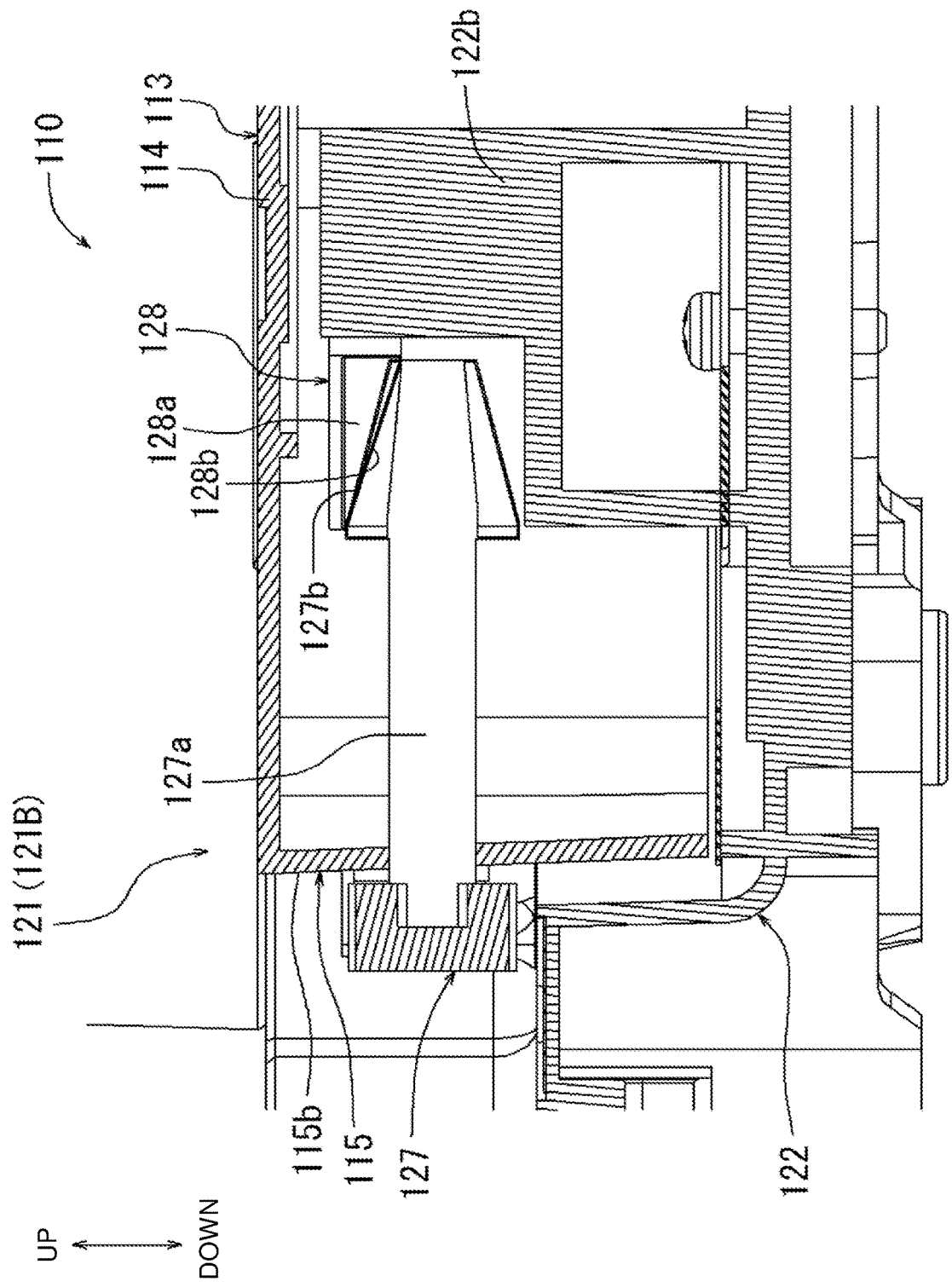
FIG. 42 is an enlarged partial view of area XLII in FIG. 41 for a cutting machine according to a third embodiment.

A cutting machine (tabletop cutting machine) 110 according to a third embodiment includes a base 122 and a fine angle adjuster 121 shown in FIG. 42, in place of the base 112 and the fine angle adjuster 111 shown in FIG. 41. The base 122 includes a rack support 122b inward from the outer peripheral table wall 115. The rack support 122b is substantially circular in a plan view with the rotation support shaft 112a (refer to FIG. 40) at the center. The rack support 122b has an upper surface on which a rack 128 is fixed. The rack 128 includes a rack body 128a in the front area of the rack support 122b. The rack body 128a is arc-shaped with the rotation support shaft 112a at the center. The rack 128 is a bevel gear with a plurality of teeth 128b. The teeth 128b are arranged at circumferentially equal intervals on the lower surface of the rack body 128a. The teeth 128b define tooth grooves between them. The teeth 128b and the tooth grooves extend radially about the rotation support shaft 112a, and incline upward at positions radially more outward from the rotation support shaft 112a.

As shown in FIG. 42, the cutting machine 110 includes the base 122 and the fine angle adjuster 121. The fine angle adjuster 121 is located in the front area of the turntable 113. Similarly to the fine angle adjuster 111B shown in FIG. 38, a fine angle adjuster 121B on the left shown in FIG. 42 is located leftward from the table extension 53. Another fine angle adjuster (not shown) is located rightward from the table extension 53 similarly to the fine angle adjuster 111A shown in FIG. 38.

As shown in FIG. 42, the left fine angle adjuster 121B includes a second operation part 127, a second pinion 127b, and the rack 128. The second operation part 127 is located substantially in the middle of the left front wall 115b in the height direction. The second operation part 127 is located at the front of the left front wall 115b and is operable by the user. The second operation part 127 is located at the distal end of a second pinion shaft 127a and is integral with the second pinion shaft 127a. The second pinion shaft 127a extends radially from the rotation support shaft 112a and is arranged horizontally. The second pinion shaft 127a is supported by the left front wall 115b in a manner rotatable about the axis. The second pinion shaft 127a integrally has the second pinion 127b at its basal end. The second pinion 127b is a conical bevel gear coaxial with the second pinion shaft 127a. The second pinion 127b has a smaller diameter toward its end.

As shown in FIG. 42, when the second operation part 127 is rotated about the second pinion shaft 127a, the second pinion shaft 127a and the second pinion 127b are rotated integrally with the second operation part 127. The second pinion shaft 127a is supported by the left front wall 115b in a manner horizontally movable in the radial direction about the rotation support shaft 112a (refer to FIG. 40). When the second operation part 127 is pressed inward, the second pinion 127b is moved to an engagement position. At the engagement position, the second pinion 127b is engaged with the rack 128. When the second operation part 127 is pulled outward, the second pinion 127b is moved to a release position. At the release position, the second pinion 127b is disengaged from the rack 128. The second operation part 127 is located inward from the outer periphery of the base 122 as viewed from above at both the engagement position and the release position.

As shown in FIG. 42, the second operation part 127 is rotated while the second pinion 127b is at the engagement position. This rotates the second pinion 127b being engaged with the rack 128, and moves the second pinion 127b circumferentially along the rack 128. The turntable 113 thus rotates about the rotation support shaft 112a. Thus, the rotating position of the turntable 113 can be adjusted finely. The right fine angle adjuster (not shown) is formed in the same manner as the left fine angle adjuster 121B.

Fourth Embodiment

Figure 43:
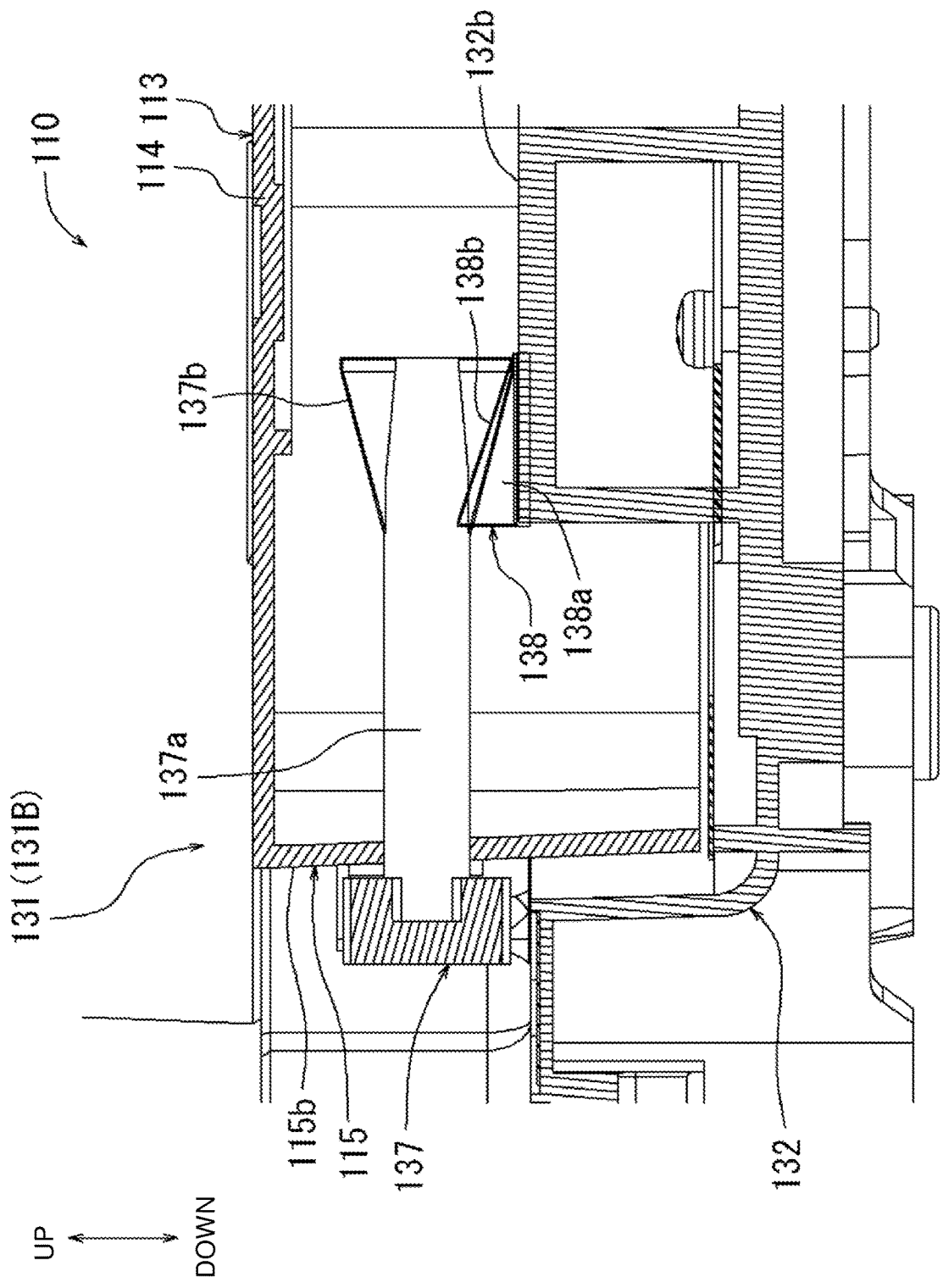
FIG. 43 is an enlarged partial view of area XLII in FIG. 41 for a cutting machine according to a fourth embodiment.

A cutting machine 110 according to a fourth embodiment includes a base 132 and a fine angle adjuster 131 shown in FIG. 43, in place of the base 112 and the fine angle adjuster 111 shown in FIG. 41. The base 132 includes a rack support 132b inward from the outer peripheral table wall 115. The rack support 132b is substantially circular in a plan view with the rotation support shaft 112a (refer to FIG. 40) at the center. The rack support 132b has an upper surface on which a rack 138 is fixed. The rack 138 includes a rack body 138a in the front area of the rack support 132b. The rack body 138a is arc-shaped with the rotation support shaft 112a at the center. The rack 138 is a bevel gear with a plurality of teeth 138b. The teeth 138b are arranged at circumferentially equal intervals on the upper surface of the rack body 138a. The teeth 138b define tooth grooves between them. The teeth 138b and the tooth grooves extend radially about the rotation support shaft 112a, and incline upward at positions radially more outward from the rotation support shaft 112a.

As shown in FIG. 43, the cutting machine 110 includes the base 132 and the fine angle adjuster 131. The fine angle adjuster 131 is located in the front area of the turntable 113. Similarly to the fine angle adjuster 111B shown in FIG. 38, a fine angle adjuster 131B on the left shown in FIG. 43 is located leftward from the table extension 53. Another fine angle adjuster (not shown) is located rightward from the table extension 53 similarly to the fine angle adjuster 111A shown in FIG. 38.

As shown in FIG. 43, the left fine angle adjuster 131B includes a second operation part 137, a second pinion 137b, and the rack 138. The second operation part 137 is located substantially in the middle of the left front wall 115b in the height direction. The second operation part 137 is located at the front of the left front wall 115b and is operable by the user. The second operation part 137 is located at the distal end of a second pinion shaft 137a and is integral with the second pinion shaft 137a. The second pinion shaft 137a extends radially from the rotation support shaft 112a and is arranged horizontally. The second pinion shaft 137a is supported by the left front wall 115b in a manner rotatable about the axis. The second pinion shaft 137a integrally has the second pinion 137b at its basal end. The second pinion 137b is a conical bevel gear coaxial with the second pinion shaft 137a. The second pinion 137b has a larger diameter toward its end.

As shown in FIG. 43, when the second operation part 137 is rotated about the second pinion shaft 137a, the second pinion shaft 137a and the second pinion 137b are rotated integrally with the second operation part 137. The second pinion shaft 137a is supported by the left front wall 115b in a manner horizontally movable in the radial direction about the rotation support shaft 112a (refer to FIG. 40). When the second operation part 137 is pulled outward, the second pinion 137b is moved to an engagement position. At the engagement position, the second pinion 137b is engaged with the rack 138. When the second operation part 137 is pressed inward, the second pinion 137b is moved to a release position. At the release position, the second pinion 137b is disengaged from the rack 138. The second operation part 137 is located inward from the outer periphery of the base 132 as viewed from above at both the engagement position and the release position.

As shown in FIG. 43, the second operation part 137 is rotated while the second pinion 137b is at the engagement position. This rotates the second pinion 137b being engaged with the rack 138, and moves the second pinion 137b circumferentially along the rack 138. The turntable 113 thus rotates about the rotation support shaft 112a. Thus, the rotating position of the turntable 113 can be adjusted finely. The right fine angle adjuster (not shown) is formed in the same manner as the left fine angle adjuster 131B.

Fifth Embodiment

Figure 44:
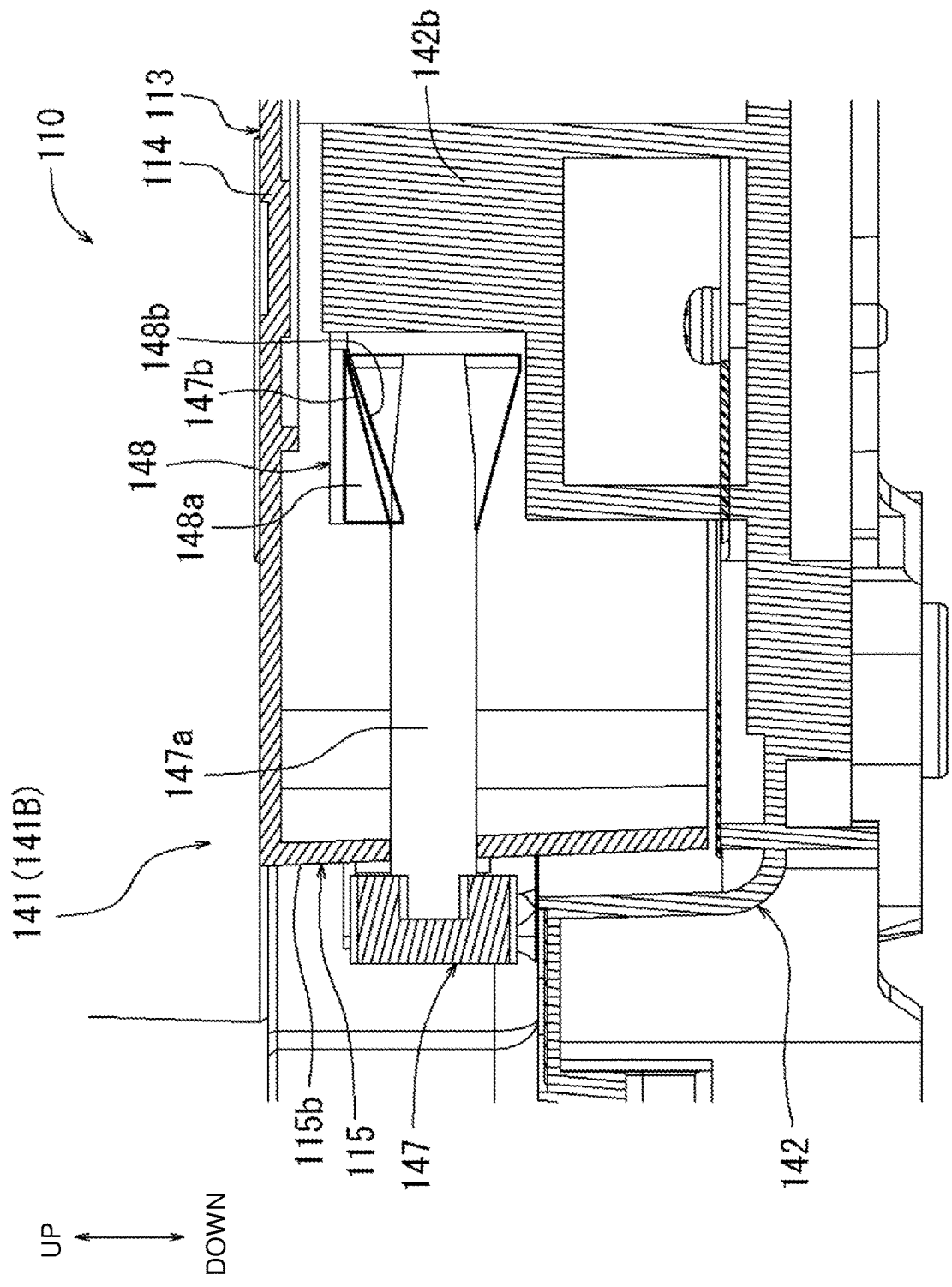
FIG. 44 is an enlarged partial view of area XLII in FIG. 41 for a cutting machine according to a fifth embodiment.

A cutting machine (tabletop cutting machine) 110 according to a fifth embodiment includes a base 142 and a fine angle adjuster 141 shown in FIG. 44, in place of the base 112 and the fine angle adjuster 111 shown in FIG. 41. The base 142 includes a rack support 142b inward from the outer peripheral table wall 115. The rack support 142b is substantially circular in a plan view with the rotation support shaft 112a (refer to FIG. 40) at the center. The rack support 142b has an upper surface on which a rack 148 is fixed. The rack 148 includes a rack body 148a in the front area of the rack support 142b. The rack body 148a is arc-shaped with the rotation support shaft 112a at the center. The rack 148 is a bevel gear with a plurality of teeth 148b. The teeth 148b are arranged at circumferentially equal intervals on the lower surface of the rack body 148a. The teeth 148b define tooth grooves between them. The teeth 148b and the tooth grooves extend radially about the rotation support shaft 112a, and incline downward at positions radially more outward from the rotation support shaft 112a.

As shown in FIG. 44, the cutting machine 110 includes the base 142 and the fine angle adjuster 141. The fine angle adjuster 141 is located in the front area of the turntable 113. Similarly to the fine angle adjuster 111B shown in FIG. 38, a fine angle adjuster 141B on the left shown in FIG. 44 is located leftward from the table extension 53. Another fine angle adjuster (not shown) is located rightward from the table extension 53 similarly to the fine angle adjuster 111A shown in FIG. 38.

As shown in FIG. 44, the left fine angle adjuster 141B includes a second operation part 147, a second pinion 147b, and the rack 148. The second operation part 147 is located substantially in the middle of the left front wall 115b in the height direction. The second operation part 147 is located at the front of the left front wall 115b and is operable by the user. The second operation part 147 is located at the distal end of a second pinion shaft 147a and is integral with the second pinion shaft 147a. The second pinion shaft 147a extends radially from the rotation support shaft 112a and is arranged horizontally. The second pinion shaft 147a is supported by the left front wall 115b in a manner rotatable about the axis. The second pinion shaft 147a integrally has the second pinion 147b at its basal end. The second pinion 147b is a conical bevel gear coaxial with the second pinion shaft 147a. The second pinion 147b has a larger diameter toward its end.

As shown in FIG. 44, when the second operation part 147 is rotated about the second pinion shaft 147a, the second pinion shaft 147a and the second pinion 147b are rotated integrally with the second operation part 147. The second pinion shaft 147a is supported by the left front wall 115b in a manner horizontally movable in the radial direction about the rotation support shaft 112a (refer to FIG. 40). When the second operation part 147 is pulled outward, the second pinion 147b is moved to an engagement position. At the engagement position, the second pinion 147b is engaged with the rack 148. When the second operation part 147 is pressed inward, the second pinion 147b is moved to a release position. At the release position, the second pinion 147b is disengaged from the rack 148. The second operation part 147 is located inward from the outer periphery of the base 142 as viewed from above at both the engagement position and the release position.

As shown in FIG. 44, the second operation part 147 is rotated while the second pinion 147b is at the engagement position. This rotates the second pinion 147b being engaged with the rack 148, and moves the second pinion 147b circumferentially along the rack 148. The turntable 113 thus rotates about the rotation support shaft 112a. Thus, the rotating position of the turntable 113 can be adjusted finely. The right fine angle adjuster (not shown) is formed in the same manner as the left fine angle adjuster 141B.

As shown in FIGS. 1, 38, and 39, the cutting machine 110 includes the base 112, the turntable 113, and the cutting machine body 10. The turntable 113 is rotatable horizontally to the base 112. The cutting machine body 10 is located above the turntable 113 and connected in a manner swingable vertically to the turntable 113. The turntable 113 includes the table body 114, which is substantially disk-shaped, and the table extension 53. The table body 114 receives a workpiece. The table extension 53 protrudes forward from the table body 114. The cutting machine 110 includes the fine angle adjuster 111 that accurately adjusts a small degree of rotation angle of the turntable 113 with respect to the base 112 with an easy operation. The fine angle adjuster 111 includes the rack 118 located on the base 112, the pinions (the first pinion 116b and the second pinion 117b), and the operation parts (the first operation part 116 and the second operation part 117). The first pinion 116b and the second pinion 117b are located in the table body 114 within the area of the table body 114 as viewed from above. The first pinion 116b and the second pinion 117b are engageable with the rack 118 directly or indirectly. The first operation part 116 is gripped by the user and operated to rotate the first pinion 116b. The second operation part 117 is gripped by the user and operated to rotate the second pinion 117b.

The first pinion 116b and the second pinion 117b are located in the table body 114, or more specifically located near the rotation support shaft 112a serving as the rotation center of the turntable 113. The first operation part 116 for rotating the first pinion 116b and the second operation part 117 for rotating the second pinion 117b are also located near the rotation support shaft 112a. The first operation part 116 and the second operation part 117 thus move a relatively short distance with the rotation of the turntable 113 to remain within a small area. The first operation part 116 and the second operation part 117 are thus easy to operate. The rack 118 is located on the upper surface of the rack support 112b included in the base 112. The base 112 deforms less over time than the turntable 113 that deforms when receiving a workpiece. The rack 118 thus has higher durability than a rack located on the turntable 113.

As shown in FIG. 40, the first pinion 116b and the first operation part 116 are integral with each other through the first pinion shaft 116a to rotate integrally. The operation force operating the first operation part 116 is thus transmitted directly to the first pinion 116b. The first pinion 116b can be operated through the first operation part 116 with a relatively small force. The first operation part 116 and the first pinion 116b have a simpler structure, and thus can be manufactured at lower cost.

As shown in FIG. 40, the second pinion 117b and the second operation part 117 are integral with each other through the second pinion shaft 117a to rotate integrally. The operation force operating the second operation part 117 is thus transmitted directly to the second pinion 117b. The second pinion 117b can be operated through the second operation part 117 with a relatively small force. The second operation part 117 and the second pinion 117b have a simpler structure, and thus can be manufactured at lower cost.

As shown in FIG. 41, the second pinion 117b is movable between the engagement position and the release position in the table body 114. At the engagement position, the second pinion 117b is engaged with the rack 118 in the extending direction of the second pinion shaft 117a. At the release position, the second pinion 117b is disengaged from the rack 118. When the second pinion 117b is at the release position, the turntable 113 can be rotated without rotating the second pinion 117b. The turntable 113 can thus be rotated greatly with a small force. When the second pinion 117b is at the engagement position, the position of the turntable 113 can be finely adjusted with the second pinion 117b. The second pinion 117b moves between the engagement position and the release position linearly, thus easily enabling and disabling the transmission of the operation force to the rack 118.

As shown in FIGS. 38 and 39, the table body 114 includes the outer peripheral table wall 115 standing vertically along the outer peripheral edge. The outer peripheral table wall 115 includes the right front wall 115a located rightward from the table extension 53 and the left front wall 115b located leftward from the table extension 53. The first operation part 116 protrudes radially outward from the right front wall 115a. The second operation part 117 protrudes radially outward from the left front wall 115b. The first operation part 116 and the second operation part 117 are located near the user, and easily visually recognizable by the user. For example, the first operation part 116 and the second operation part 117 are easily visually recognizable before a workpiece is placed on the turntable 113 or when a workpiece sized smaller than the turntable 113 is placed on the turntable 113. The user can thus easily operate the first operation part 116 and the second operation part 117.

As shown in FIGS. 38 and 39, the cutting machine 110 includes the first operation part 116, the first pinion 116b, the second operation part 117, and the second pinion 117b. The first operation part 116 protrudes from the right front wall 115a. The first pinion 116b rotates integrally with the first operation part 116. The second operation part 117 protrudes radially outward from the left front wall 115b. The second pinion 117b rotates integrally with the second operation part 117. The user can selectively operate the first operation part 116 or the second operation part 117 to finely adjust the miter angle of the turntable. When the turntable 113 is rotated right and the first operation part 116 is moved to a position not easily accessible, the user can operate the second operation part 117. When the turntable 113 is rotated left and the second operation part 117 is moved to a position not easily accessible, the user can operate the first operation part 116. This structure allows fine adjustment of the miter angle of the turntable 113 in a reliable and easy manner.

As shown in FIG. 41, the rack 118 includes the rack body 118a, which is arc-shaped and facing upward, and the plurality of teeth 118b protruding upward from the rack body 118a and arranged along the rack body 118a. The teeth 118b of the rack 118, the second pinion 117b, and the first pinion 116b are bevel gears. The second pinion 117b is radially movable from the rack 118 to be disengaged from the rack 118.

The second pinion 117b is engaged with the rack 118 obliquely with respect to the radial direction. This second pinion 117b can be disengaged from the rack 118 at a shorter distance of movement or with a smaller friction force than when engaged with the rack 118 perpendicularly. The rack 118 is arranged obliquely with respect to the turntable 113 located above. Under a large force applied downward from the turntable 113, the second pinion 117b slides obliquely downward along the rack 118. This reduces the force applied to the rack 118 from the turntable 113.

Sixth Embodiment

Figure 45:
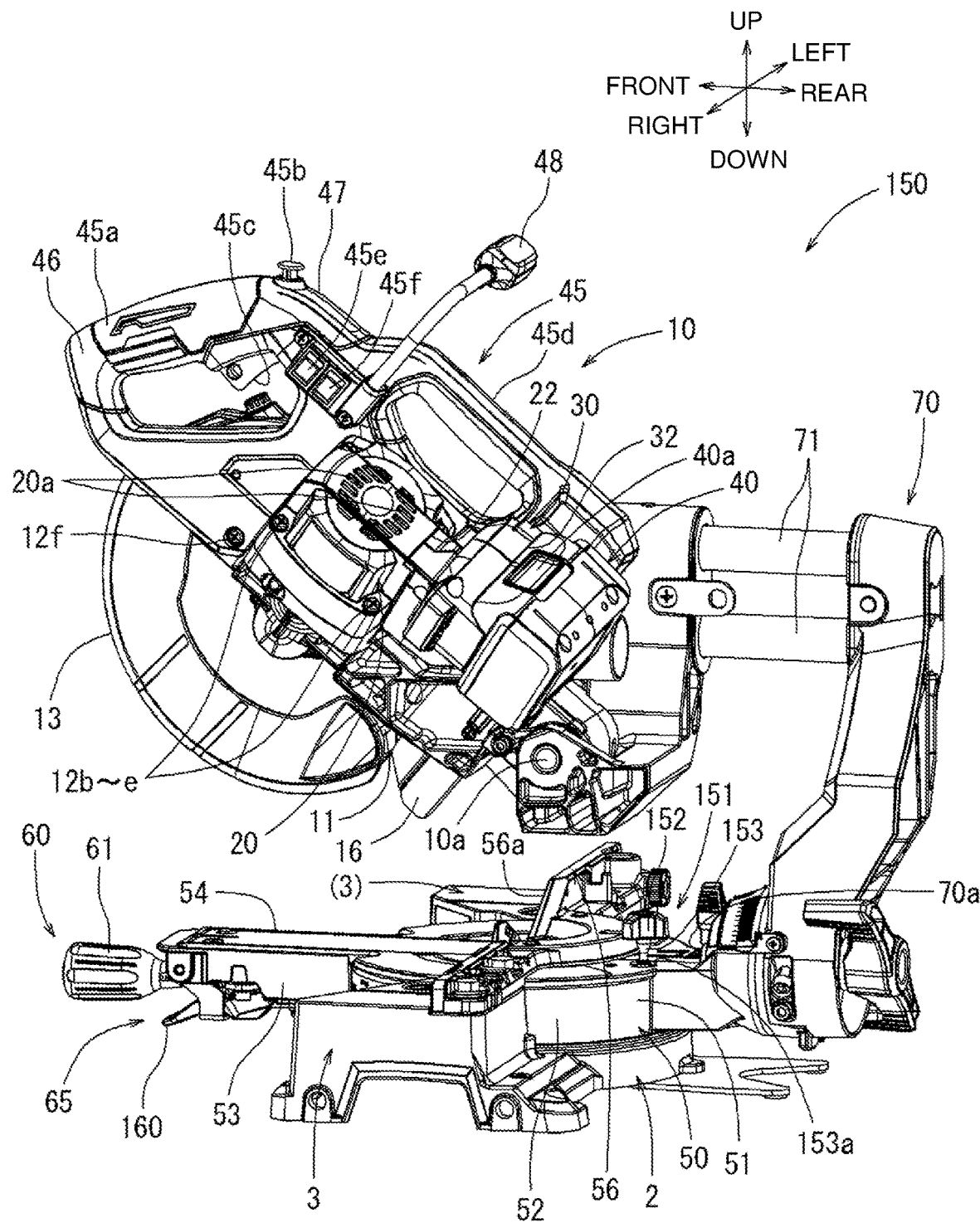
FIG. 45 is an overall perspective view of a cutting machine according to a sixth embodiment.

A cutting machine (tabletop cutting machine) 150 according to a sixth embodiment includes a fine angle adjuster 151 and an unlock lever 160 shown in FIG. 45, in place of the fine angle adjuster 80 and the unlock lever 66 according to the first embodiment shown in FIG. 2. The unlock lever 160 is located below the grip 61. The unlock lever 160 is swingable vertically between a lower lock position and an upper unlock position. The unlock lever 160 is urged downward. When the unlock lever 160 is retained at the lock position, the rotational position of the turntable 50 is locked. When the unlock lever 160 is pulled upward and retained at the unlock position, the turntable 50 is unlocked. The unlock lever 160 can be retained at the unlock position with, for example, the operation knob 69 shown in FIG. 2.

Figure 48:
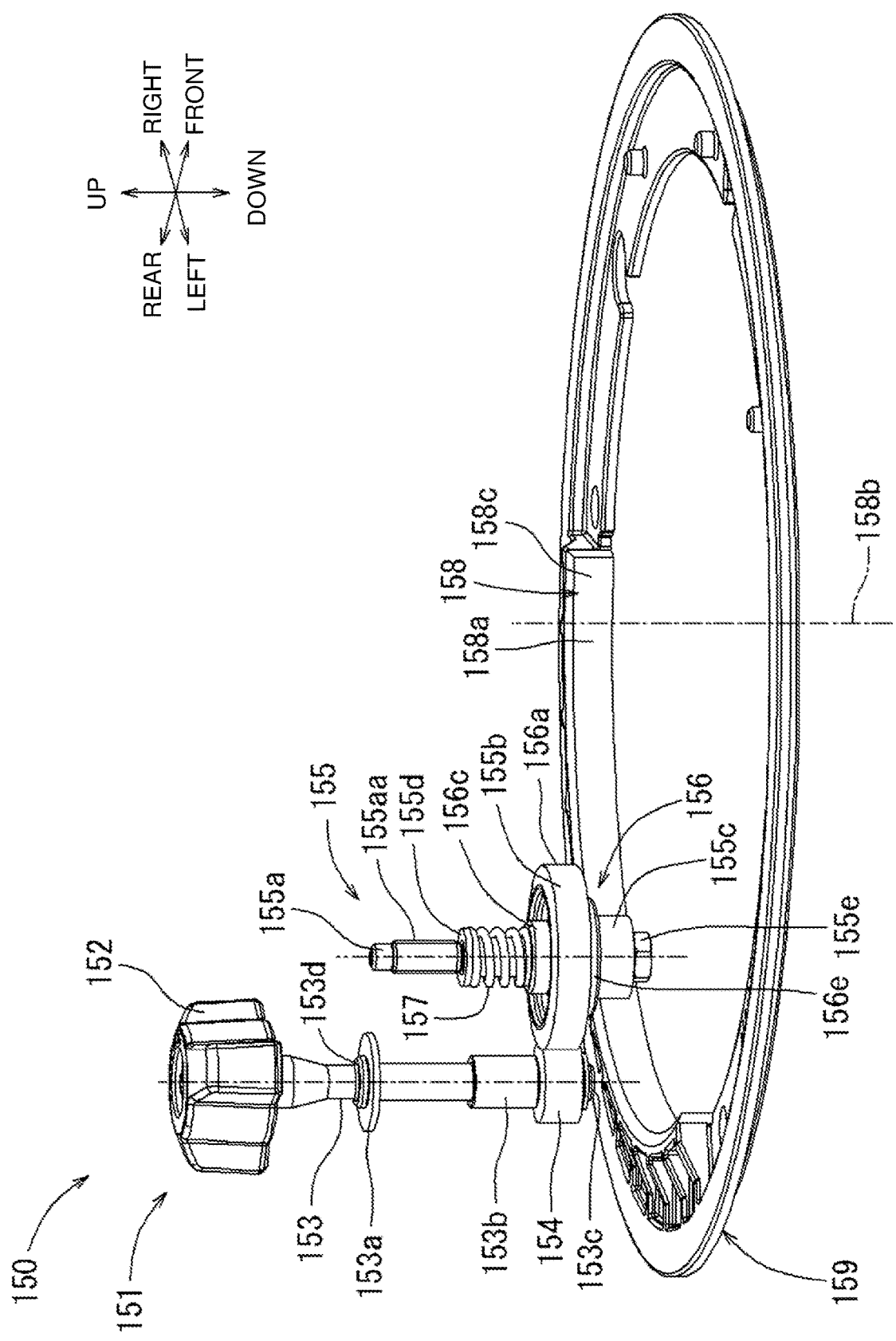
FIG. 48 is a perspective view of the fine angle adjuster and a rack with a clutch mechanism not in operation.

As shown in FIG. 45, the cutting machine 150 includes the fine angle adjuster 151 that adjusts the rotation angle of the turntable 50 with respect to the base 2. The fine angle adjuster 151 is located in the rear area of the base 2 and the turntable 50 behind the positioning fence 56. As shown in FIG. 48, the fine angle adjuster 151 includes an operation part 152 and a rack 158. The rack 158 is integral with an upper base part 159 attached to the upper portion of the base 2 (refer to FIG. 46).

As shown in FIG. 48, the rack 158 includes a rack body 158a and a plurality of teeth 158c. The rack body 158a is arc-shaped, with an arc center axis 158b coaxial with the rotation support shaft 2a (refer to FIG. 46) at the center. The teeth 158c are formed on the inner surface of the arc of the rack body 158a. The teeth 158c are arranged at circumferentially predetermined intervals on the rack body 158a. The teeth 158c extend vertically. The teeth 158c define tooth grooves between them.

Figure 46:
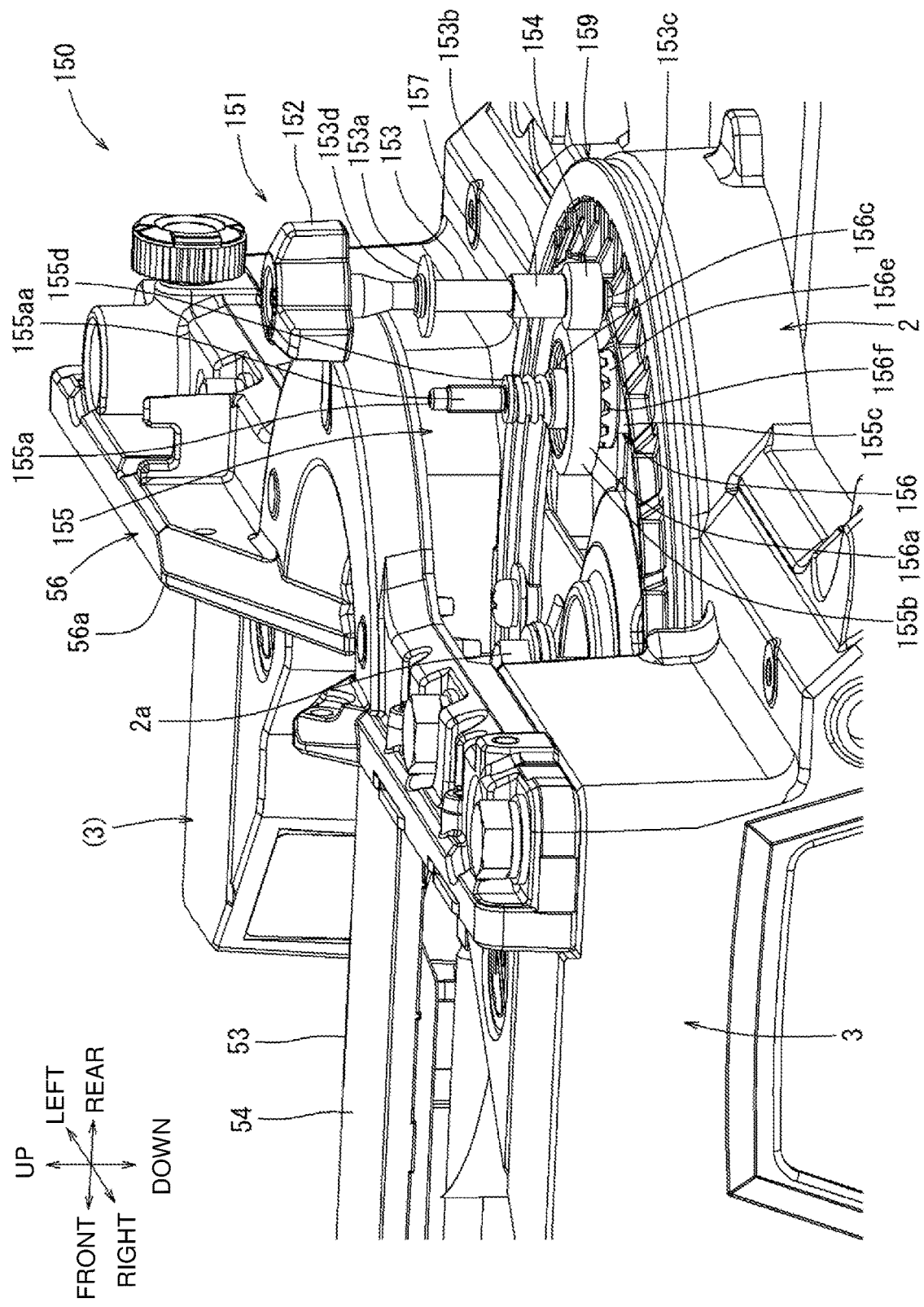
FIG. 46 is an enlarged perspective view of an inside of a turntable in the cutting machine according to the sixth embodiment.

As shown in FIG. 46, the fine angle adjuster 151 includes a reduction mechanism 155 for reducing the transmission speed of the operation force applied through the operation part 152. The reduction mechanism 155 includes a rotational shaft (first shaft) 153 and a reduction shaft (second shaft) 155a both extending vertically. The rotational shaft 153 and the reduction shaft 155a are parallel to each other. The rotational shaft 153 is supported on the turntable 50 (refer to FIG. 45) in a manner rotatable about the axis. The reduction shaft 155a has an upper threaded part 155aa screwed into a screw hole in the turntable 50 and is supported in a nonrotatable manner.

Figure 47:
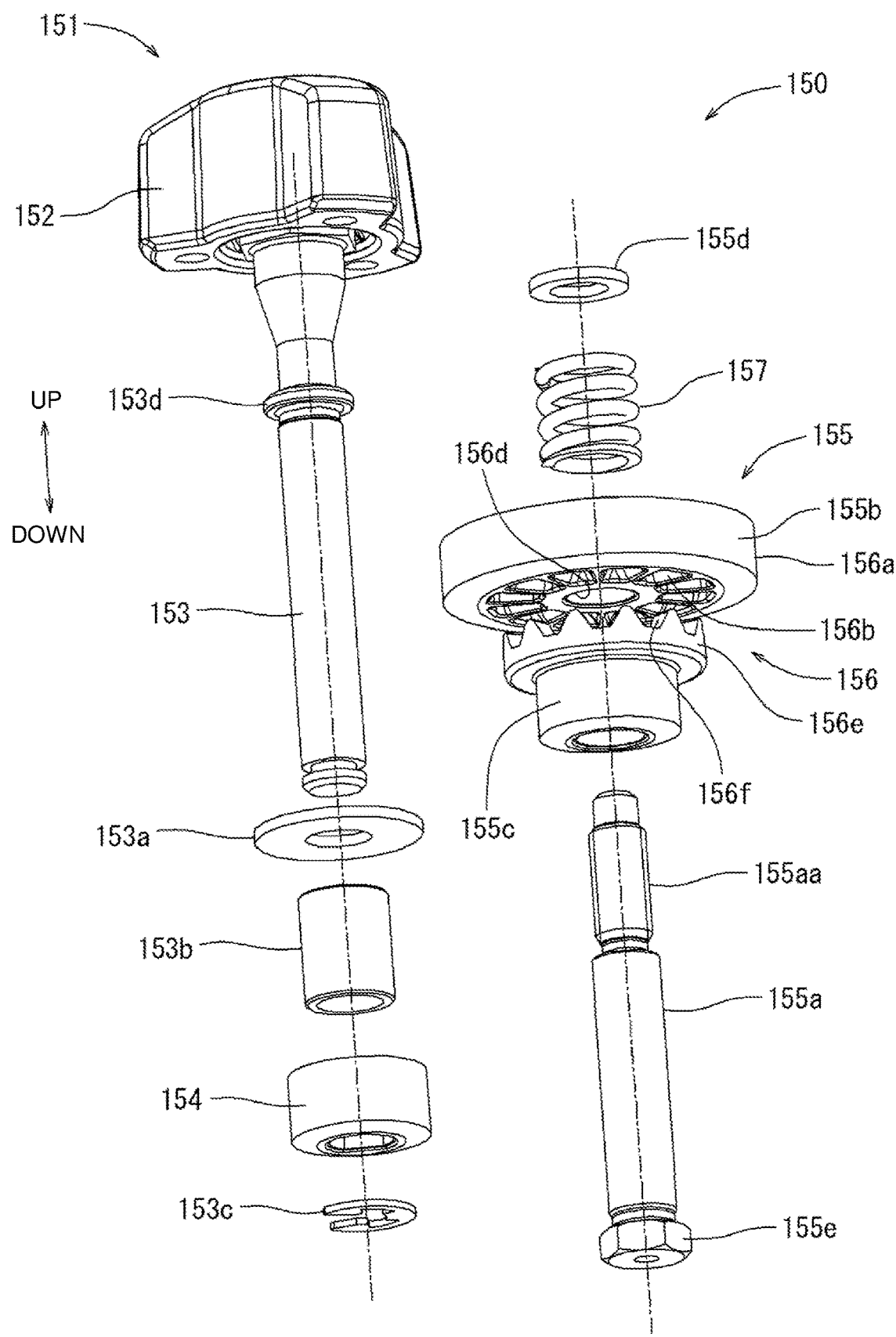
FIG. 47 is an exploded perspective view of a fine angle adjuster according to the sixth embodiment.

As shown in FIG. 47, the rotational shaft 153 includes the operation part 152 in its upper portion and a first pinion 154 in its lower portion. As shown in FIG. 45, the operation part 152 is located above the upper surface of the turntable 50 and is rotatable by the user from above the turntable 50. The rotational shaft 153 includes a radially protruding flange 153d below the operation part 152. The flange 153d is arranged above the upper surface of the turntable 50 to prevent the rotational shaft 153 from moving downward. A washer 153a is located between the flange 153d and the upper surface of the turntable 50.

As shown in FIG. 47, the first pinion 154 is attached to the rotational shaft 153 in a nonrotatable manner to rotate integrally with the rotational shaft 153. The first pinion 154 is prevented from slipping off with a slip prevention member 153c attached to the lower end of the rotational shaft 153. The rotational shaft 153 is supported on the turntable 50 (refer to FIG. 45) in a manner rotatable about the axis. When the operation part 152 is rotated about the rotational shaft 153, the rotational shaft 153 and the first pinion 154 rotate integrally with the operation part 152. The first pinion 154 has tooth grooves extending vertically. A sleeve 153b serves as a spacer for the first pinion 154.

As shown in FIG. 47, the reduction shaft 155a includes a pinion engagement gear 155b and a second pinion 155c that are rotatable about the same axis. The pinion engagement gear 155b and the second pinion 155c have teeth extending vertically. The second pinion 155c is located in the lower portion of the reduction shaft 155a and engaged with the rack 158 (refer to FIG. 48). The pinion engagement gear 155b is located above the second pinion 155c. The pinion engagement gear 155b is engaged with the first pinion 154.

As shown in FIG. 47, the reduction mechanism 155 includes a clutch mechanism 156. The clutch mechanism 156 includes an upper clutch part 156a and a lower clutch part 156e. The pinion engagement gear 155b surrounds the outer periphery of the upper clutch part 156a and is integral with the upper clutch part 156a. The second pinion 155c is integral with the lower clutch part 156e.

As shown in FIG. 47, the lower clutch part 156e is attached to the reduction shaft 155a to rotate integrally with the reduction shaft 155a. The lower clutch part 156e is supported by a clutch support 155e at the lower end of the reduction shaft 155a from below, and thus is prevented from moving downward. The upper clutch part 156a is axially movable upward from the lower clutch part 156e while having the reduction shaft 155*a* placed through a shaft hole 156*d* at the center. The upper clutch part 156*a* has a lower surface on which a first cam 156*b* is located. The lower clutch part 156*e* has an upper surface on which a second cam 156*f* is located. The first cam 156*b* and the second cam 156*f* each have a cam surface including recesses and protrusions alternatively arranged circumferentially about the reduction shaft 155*a*. The cam surfaces of the first cam 156*b* and the second cam 156*f* include helical surfaces referred to as lead surfaces. The first cam 156*b* and the second cam 156*f* come in contact with each other with a relatively large area of contact, and retain their surface contact although they are misaligned with each other in the surface direction.

As shown in FIG. 47, a compression spring 157 is located above the upper clutch part 156*a*. The compression spring 157 is located between a spring receiver 156*c* (refer to FIG. 48) and a spring holder 155*d*. The spring receiver 156*c* is located on the upper portion of the upper clutch part 156*a*. The spring holder 155*d* is attached to the upper portion of the reduction shaft 155*a*. The compression spring 157 urges the upper clutch part 156*a* downward (in a direction in which the first cam 156*b* and the second cam 156*f* are engaged).

As shown in FIG. 48, the first pinion 154 is engaged with the pinion engagement gear 155*b*. The second pinion 155*c* is engaged with the rack 158. The rotational speed of the operation part 152 is reduced by the engagement of the first pinion 154 with the pinion engagement gear 155*b*, before the rotation is transmitted. When the pinion engagement gear 155*b* receives a relatively small torque, the upper clutch part 156*a* is urged by the compression spring 157 to be at the lower engagement position. The first cam 156*b* and the second cam 156*f* shown in FIG. 47 are thus engaged with each other. The rotational power of the upper clutch part 156*a* is transmitted to the lower clutch part 156*e* through the engagement of the first cam 156*b* with the second cam 156*f*. The second pinion 155*c* integral with the lower clutch part 156*e* rotates and moves along the rack 158. This rotates the turntable 50 (refer to FIG. 45) about the arc center axis 158*b* with respect to the upper base part 159 that supports the rack 158 shown in FIG. 48. Thus, the rotating position of the turntable 50 can be adjusted finely.

Figure 49:
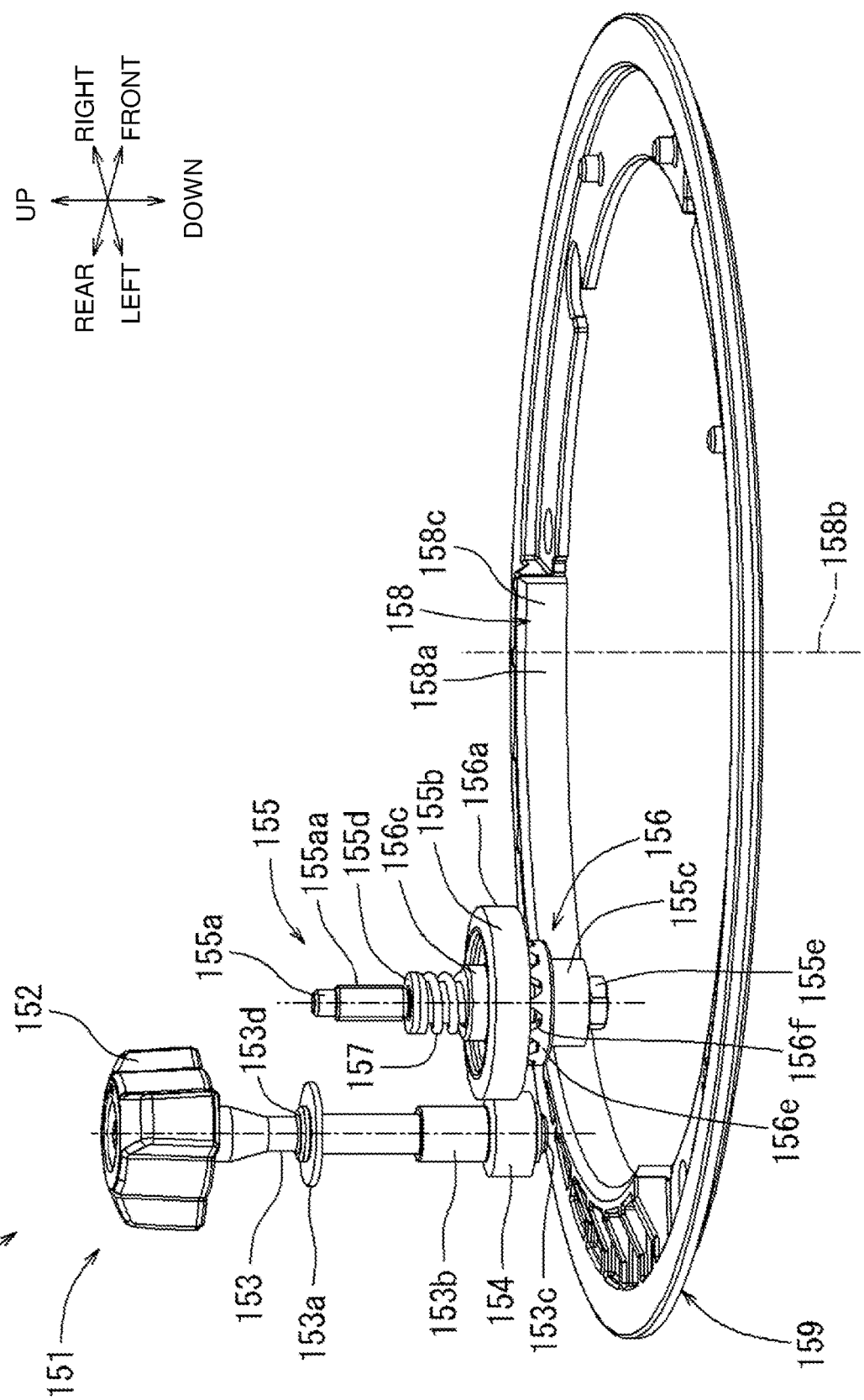
FIG. 49 is a perspective view of the fine angle adjuster and the rack with the clutch mechanism in operation.

For example, when the unlock lever 160 shown in FIG. 45 is at the lock position, the turntable 50 (refer to FIG. 45) is prevented from moving with respect to the base 2. The second pinion 155*c* shown in FIG. 49 thus does not move along the upper base part 159. When the operation part 152 is rotated in this state, the upper clutch part 156*a* engaged with the first pinion 154 receives a predetermined torque or greater. The torque causes the first cam 156*b* (refer to FIG. 47) to move over the second cam 156*f* and to the upper release position against the urging force applied from the compression spring 157. The first cam 156*b* at the release position is disengaged from the second cam 156*f*. The power transmission from the upper clutch part 156*a* to the lower clutch part 156*e* is thus disabled. The first pinion 154 remains engaged with the pinion engagement gear 155*b* although the upper clutch part 156*a* is at the release position.

As shown in FIG. 46, the fine angle adjuster 151 includes the clutch mechanism 156. The clutch mechanism 156 disables the transmission of power for rotating the turntable 50 (refer to FIG. 45) with respect to the base 2 when receiving a predetermined torque or greater.

For example, the fine angle adjuster 151 is operated while the unlock lever 160 is at the lock position and the turntable 50 is locked to the base 2. When the turntable 50 is immovable, the second pinion 155*c* engaged with the rack 158 is prevented from rotating. Thus, the clutch mechanism 156 receives a predetermined torque or greater and is actuated. Once the clutch mechanism 156 is actuated, the fine angle adjuster 151 rotates without power transmission, and thus without applying an extra force to the rack 158, the second pinion 155*c*, and other components. This prevents the rack 158, the second pinion 155*c*, and other components from being damaged. Also, the user can easily find the turntable 50 locked to the base 2 when the fine angle adjuster 151 rotates without power transmission.

As shown in FIG. 47, the reduction mechanism 155 includes the rotational shaft 153 rotatable integrally with the operation part 152, and the reduction shaft 155*a* rotatable at a lower speed than the rotational shaft 153. The clutch mechanism 156 is located on the reduction shaft 155*a*.

The reduction shaft 155*a* receives a greater torque than the rotational shaft 153 when the fine angle adjuster 151 is operated. The clutch mechanism 156 on the reduction shaft 155*a* thus receives a greater torque than when the clutch mechanism 156 is located on the rotational shaft 153. For the clutch mechanism 156 located on the reduction shaft 155*a*, the predetermined torque for actuating the clutch mechanism 156 can be selected from a wide range of toques. This clutch mechanism 156 thus has an increased design freedom. For example, the urging force for urging the upper clutch part 156*a* with the compression spring 157 can be set easily. The inclinations of the lead surfaces of the first cam 156*b* and the second cam 156*f* can be set easily. The set predetermined toque can then be retained with no fine adjustment. The predetermined torque may be relatively large. Thus, the user can operate the fine angle adjuster 151 without finely adjusting the operation force. The fine angle adjuster 151 is thus easy to operate.

As shown in FIG. 47, the clutch mechanism 156 includes the first cam 156*b* and the second cam 156*f* engageable with each other to enable power transmission. The power transmission is disabled when the first cam 156*b* and the second cam 156*f* are disengaged from each other. The second cam 156*f* is integral with the second pinion 155*c*, which is directly engageable with the rack 158. The fine angle adjuster 151 thus includes fewer components and is small.

The cutting machines 1, 110, and 150 according to the above embodiments may be modified variously. In one example, a cutting machine may include a plurality of fine angle adjusters 80 shown in FIG. 35 circumferentially along the rack body 86*a*. In another example, a cutting machine may include either the right fine angle adjuster 111A or the left fine angle adjuster 111B shown in FIG. 39. In still another example, a cutting machine may include both the fine angle adjuster 80 shown in FIG. 35 and the fine angle adjuster 111 shown in FIG. 39. In place of the fine angle adjuster 80 shown in FIG. 35, a cutting machine may include a fine angle adjuster in which the first pinion 83 is moved to the engagement position and is directly engaged with the rack 86.

In place of the rack 86 along the inner peripheral wall 2*e* and the reduction shaft 85 shown in FIG. 35, a cutting machine may include a rack along the outer peripheral wall at the rear of the base 2. In place of the reduction shaft 85, a cutting machine may include a planetary gear as a reduction mechanism located between the first pinion 83 and the rack 86. In place of the compression spring 84 shown in FIG. 37, a cutting machine may include a rubber elastic member to urge the first pinion 83 to the release position. In one example, a cutting machine may include an urging member for urging the first pinion 116*b* and the second pinion 117*b* shown in FIG. 39 to the release position (radially outward).

In another example, the clutch mechanism 156 may be located in the rotational shaft 153. In place of the fine angle adjuster 151, a cutting machine may include a fine angle adjuster that finely adjusts the position of the turntable 50 through rotation of a screw. The fine angle adjuster may include a clutch mechanism.

REFERENCE SIGNS LIST 1 cutting machine (tabletop cutting machine)
2 base
2a rotation support shaft
2e inner peripheral wall
3 auxiliary table
10 cutting machine body
10a vertical swing support shaft
11 cutting blade
12 stationary cover (cutting blade cover)
12a shaft hole
12b to 12e fastening screw
12f fastening screw
13 movable cover
14 fixing screw
15 outer flange
16 dust collection guide
20 motor housing
20a inlet
20b protrusion
20c screw hole
20d side surface
20e fastening screw
20g to 20j through-hole
21 blocking part (first ventilation part, positioning mechanism)
21a first ventilation hole
22 positioning unit
22a rail
25 motor
25a motor shaft
25b stator
25c rotor
25d sensor board
26 motor fan
30 adapter (first adapter)
30a body holder
30b screw hole
30g fastening screw
30c first surface
30d second surface
30e body engagement surface
30f bottom surface
31 positioning unit
31a rail
31b engagement part
31c flat surface
31d standing portion
31e extension
32 battery holder (first battery holder)
32a rail
33 ventilation part (second ventilation part, positioning mechanism)
33a second ventilation hole
33b cutout
34 lead wire
35 controller
36 right exhaust air window
37 left exhaust air window
38 terminal unit
38a terminal base
38b, 38c power terminal
38d signal terminal
40 battery
40a disengagement button
40b engagement tab
40c rail
40d connector terminal
41 communication adapter
45a main handle
45b lock-off button
45c switch lever
45d carrying handle
45e switch (for a laser illuminator for guideline alignment)
45f switch (for turning on an illuminator)
46 right handle part
46a, 46b fitting hole
46c through-hole
47 left handle part
48 illuminator
49 laser illuminator
50 turntable
51 table body
52 outer peripheral table wall
53 table extension
53a screw hole
53b front support
53c rear support
54 throat plate
55 slot
56 positioning fence
56a positioning surface
57 adjustment bolt
58 miter scale plate
58a fixing screw
58b positioning recess
60 table positioning mechanism
61 grip
62 fixing rod
62a threaded shaft part
63 protection plate
65 positive locking mechanism
66 unlock lever
66a rear end
66b compression spring
66c operation part
66d swing shaft
67 positioning pin
67a rear end
68 engagement pin
69 operation knob
69a leaf spring
70 body support
70a lateral tilt support shaft
71 slide bar
80 fine angle adjuster
81 operation part
82 rotational shaft
83 first pinion
84 compression spring
85 reduction shaft (reduction mechanism)
85a pinion engagement gear
85b second pinion
86 rack
86a rack body
86b arc center axis 86c tooth
101 adapter (second adapter)
102 positioning unit
103 battery holder (second battery holder)
103a rail
105 battery (second battery)
105a disengagement button
110 cutting machine (tabletop cutting machine)
111 fine angle adjuster
111A right fine angle adjuster
111B left fine angle adjuster
112 base
112a rotation support shaft
112b rack support
112c positioning recess
113 turntable
114 table body
115 outer peripheral table wall
115a right front wall
115b left front wall
116 first operation part
116a first pinion shaft
116b first pinion
117 second operation part
117a second pinion shaft
117b second pinion
118 rack
118a rack body
118b tooth
121 fine angle adjuster
122 base
122b rack support
127 second operation part
127a second pinion shaft
127b second pinion
128 rack
128a rack body
128b tooth
131 fine angle adjuster
132 base
132b rack support
137 second operation part
137a second pinion shaft
137b second pinion
138 rack
138a rack body
138b tooth
141 fine angle adjuster
142 base
142b rack support
147 second operation part
147a second pinion shaft
147b second pinion
148 rack
148a rack body
148b tooth
150 cutting machine (tabletop cutting machine)
151 fine angle adjuster
152 operation part
153 rotational shaft (first shaft)
153a washer
153b sleeve
153c slip prevention member
153d flange
154 first pinion
155 reduction mechanism
155a reduction shaft (second shaft)
155aa threaded part
155b pinion engagement gear
155c second pinion
155d spring holder
155e clutch support
156 clutch mechanism
156a upper clutch part
156b first cam
156c spring receiver
156d shaft hole
156e lower clutch part
156f second cam
157 compression spring
158 rack
158a rack body
158b arc center axis
158c tooth
159 upper base part
160 unlock lever

What is claimed is:

1. A cutting machine, comprising:
a base;
a rotation support shaft;
a turntable (i) supported in a manner rotatable horizontally to the base around the rotation support shaft and (ii) including
a substantially disk-shaped table body configured to receive a workpiece, and
a table extension protruding forward from the table body;
a cutting machine body above the turntable and connected in a manner swingable vertically to the turntable; and
a fine angle adjuster configured to adjust a rotation angle of the turntable with respect to the base, the fine angle adjuster including
a rack on the base,
a pinion that (i) overlaps the table body as viewed from above and (ii) is configured to engage the rack, and
a rotational shaft (i) including an operation part that is configured to rotate the pinion and (ii) extending parallel to the rotation support shaft,
wherein the pinion is coaxial with the rotational shaft.

2. The cutting machine according to claim 1, wherein the pinion is configured to move in an extending direction of a rotation axis of the pinion between an engagement position at which the pinion is engaged with the rack and a release position at which the pinion is disengaged from the rack.

3. The cutting machine according to claim 1, wherein the rack includes
an arc-shaped rack body, and
a plurality of teeth (i) protruding from the rack body toward a radial center of the rack body and (ii) spaced circumferentially along the rack body, and
the pinion has a rotation axis parallel to the radial center of the rack body.

4. The cutting machine according to claim 2, further comprising:
a spring configured to urge the pinion from the engagement position toward the release position.

5. The cutting machine according to claim 1, wherein the pinion and the operation part are above a rear area and at an outer periphery of the table body.

6. The cutting machine according to claim 1, wherein the table body includes
a right front wall rightward from the table extension and standing vertically along an outer peripheral edge of the table body, and a left front wall leftward from the table extension and standing vertically along the outer peripheral edge of the table body, and the operation part protrudes radially outward from at least one of the right front wall or the left front wall.

7. The cutting machine according to claim 6, wherein the operation part includes a first operation part protruding radially outward from the right front wall, and a second operation part protruding radially outward from the left front wall, and the pinion includes a first pinion rotatable integrally with the first operation part, and a second pinion rotatable integrally with the second operation part.

8. The cutting machine according to claim 6, wherein the rack includes an arc-shaped rack body facing upward or downward, and a plurality of teeth protruding upward or downward from the rack body and spaced along the rack body, the plurality of teeth and the pinion are bevel gears, and the pinion is radially movable from the rack to be disengaged from the rack.

9. The cutting machine according to claim 6, wherein the pinion and the operation part are integral with each other to rotate integrally.

10. The cutting machine according to claim 1, further comprising:

a reduction mechanism (i) between the pinion and the rack and (ii) configured to reduce a rotational speed of the pinion for transmitting rotation of the pinion to the rack.

11. The cutting machine according to claim 1, wherein the fine angle adjuster includes a clutch mechanism configured to disable transmission of power for rotating the turntable with respect to the base when receiving a predetermined torque or greater.

12. The cutting machine according to claim 10, wherein the fine angle adjuster includes a clutch mechanism configured to disable transmission of power for rotating the turntable with respect to the base when receiving a predetermined torque or greater, the reduction mechanism includes a first shaft rotatable integrally with the operation part, and a second shaft configured to rotate at a lower speed than the first shaft, and the clutch mechanism is in the second shaft.

13. The cutting machine according to claim 12, wherein the clutch mechanism includes a first cam and a second cam engageable with each other to enable power transmission and disengageable from each other to disable power transmission, and the second cam is integral with the pinion engageable directly with the rack.

14. The cutting machine according to claim 2, wherein the rack includes an arc-shaped rack body, and a plurality of teeth (i) protruding from the rack body toward a radial center of the rack body and (ii) spaced circumferentially along the rack body, and the pinion has a rotation axis parallel to the radial center of the rack body.

15. The cutting machine according to claim 3, further comprising:

a spring configured to urge the pinion from the engagement position toward the release position.

16. The cutting machine according to claim 2, wherein the pinion and the operation part are above a rear area and at an outer periphery of the table body.

17. The cutting machine according to claim 3, wherein the pinion and the operation part are above a rear area and at an outer periphery of the table body.

18. The cutting machine according to claim 4, wherein the pinion and the operation part are above a rear area and at an outer periphery of the table body.

19. The cutting machine according to claim 2, wherein the table body includes a right front wall rightward from the table extension and standing vertically along an outer peripheral edge of the table body, and a left front wall leftward from the table extension and standing vertically along the outer peripheral edge of the table body, and the operation part protrudes radially outward from at least one of the right front wall or the left front wall.

\* \* \* \* \*